United States Patent
Hashimoto et al.

(10) Patent No.: US 6,283,866 B1
(45) Date of Patent: Sep. 4, 2001

(54) DAMPENING DISK ASSEMBLY

(75) Inventors: Hideki Hashimoto, Katano; Takashi Harada; Keisuke Fujioka, both of Shijonawate, all of (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/457,300

(22) Filed: Dec. 9, 1999

(30) Foreign Application Priority Data

Dec. 18, 1998 (JP) .................................................. 10-361400

(51) Int. Cl.$^7$ ....................................................... F16D 3/14
(52) U.S. Cl. ........................................ 464/68; 192/213.12
(58) Field of Search ......................... 464/68; 192/213.12, 192/213.22

(56) References Cited

U.S. PATENT DOCUMENTS

| | | |
|---|---|---|
| 4,560,054 | 12/1985 | Kayanoki et al. . |
| 4,577,742 | 3/1986 | Saida . |
| 4,585,428 | 4/1986 | Asada . |
| 4,586,595 | 5/1986 | Hartig et al. . |
| 4,643,288 | 2/1987 | Tomm et al. . |
| 4,669,595 | 6/1987 | Fischer et al. . |
| 4,684,007 | 8/1987 | Maucher . |
| 4,966,269 | 10/1990 | Raab et al. . |
| 4,998,608 | 3/1991 | Raab et al. . |
| 5,238,096 | 8/1993 | Ament et al. . |
| 5,246,398 | 9/1993 | Birk et al. . |
| 5,893,446 | 4/1999 | Honjo et al. . |
| 5,988,343 | * 11/1999 | Kleifges et al. ................. 192/213.12 |
| 6,016,899 | * 1/2000 | Ament .............................. 192/213.12 |
| 6,056,103 | 5/2000 | Hashimoto et al. . |
| 6,227,977 | * 5/2001 | Tanaka et al. .......................... 464/68 |

* cited by examiner

Primary Examiner—Lynne H. Browne
Assistant Examiner—Greg Binda
(74) Attorney, Agent, or Firm—Shinjyu Global IP Counselors, LLP

(57) ABSTRACT

A dampening disk assembly 1 is provided in a clutch assembly 1 to make it possible to easily change the level of hysteresis torque when small torsion vibrations are generated. Thus, the level of hysteresis torque can easily be changed to accommodate a wide variety of vehicles. In the dampening disk assembly 1, a friction washer 48 is disposed between an input plate 32 and a hub flange 18. The friction washer 48 is engaged with the input plate 32, so that torque may be transferred from the input plate 32 to the hub flange 18. A cone spring 49 is disposed between the friction washer 48 and the input plate 32 in an axial direction to give resiliency to both members in the axial direction. A fixing plate 20 contacts the friction washer 48 in the axial direction. A spacer 80 is disposed between the fixing plate 20 and the hub flange 18 in the axial direction so as to transmit torque. A first gap is formed either between the spacer 80 and the fixing plate 20 in a rotational direction or between the spacer 80 and the hub flange 18 in the rotational direction.

18 Claims, 40 Drawing Sheets

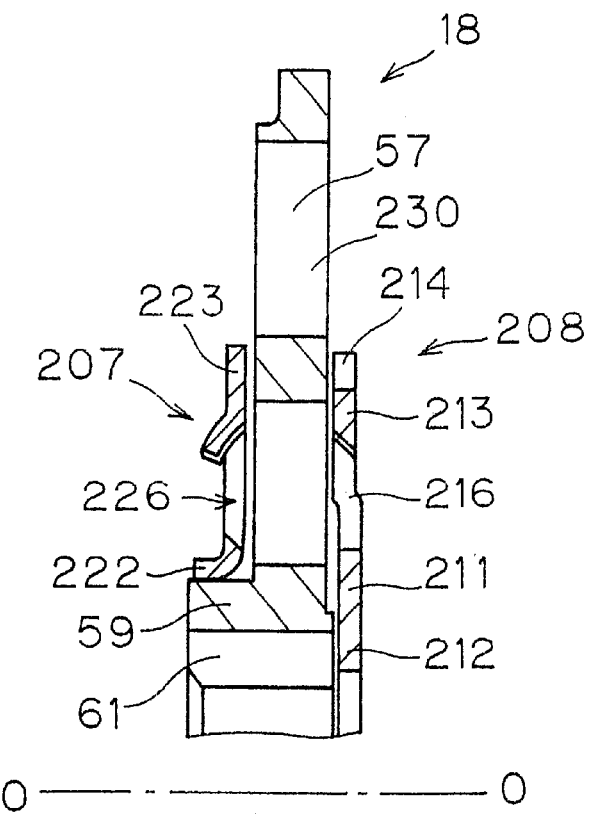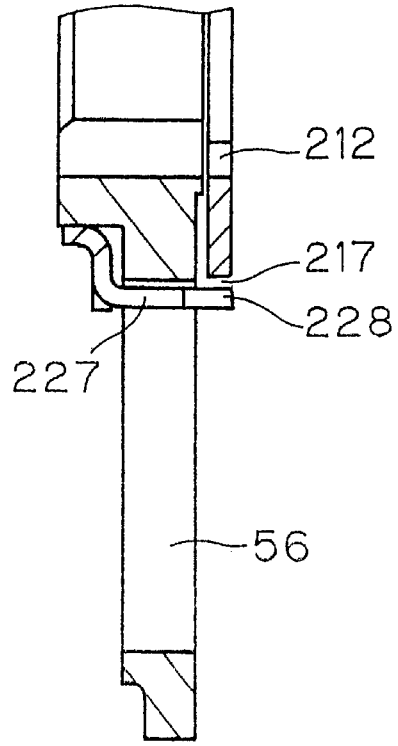
Fig. 43

DAMPENING DISK ASSEMBLY

BACKGROUND OF THE INVENTION

1. Field of the Invention

This invention generally relates to a dampening disk assembly. More specifically, the present invention relates to a dampening disk assembly having circumferential gaps for preventing a predetermined friction mechanism from operating when small vibrations occur in a greater torsion angular range of the torsion characteristics.

2. Background Information

A clutch disk assembly or dampening disk assembly is often used in a clutch of a vehicle. The clutch or dampening disk assembly has a clutch function for coupling and/or uncoupling a flywheel of the engine to the transmission shaft, and a dampening function for absorbing and dampening torsion vibrations transmitted from the flywheel. Generally, vibrations of a vehicle include rattling during idling, rattling during driving (due to acceleration and deceleration), and tip-in/tip-out (low frequency vibrations). The dampening function of a clutch or dampening disk assembly eliminates these rattling and vibrations.

Rattling during idling is a rattling noise from the transmission that occurs while the vehicle is for instance waiting for the signal, the gear is in neutral and the clutch pedal is let free. The rattling occurs because engine torque is small during idling, and combustion of the engine generates a relatively large torque. As a result, an input gear of the transmission and a counter gear collide into each other, and generate rattling noises.

Tip-in/tip-out rattling (low frequency vibrations) is a back and forth movement of a vehicle that occurs when the driver pushes or let go of the acceleration pedal suddenly. Tip-in/tip-out rattling occurs when the rigidity of the drive transmission is low. A torque transmitted to tires is transmitted back from the tires, and then the torque is retransmitted to the tires. As a result, the vehicle temporarily moves back and forth.

Rattling during idling also occurs when a torque transmitted in the clutch disk assembly is almost zero. To prevent this type of rattling during idling, the torsion rigidity of the clutch disk assembly should be low for such torque. On the other hand, the clutch disk assembly should have a higher rigidity to prevent tip-in/tip-out rattling.

In view of the aforementioned problems, there has been known a clutch or dampening disk assembly, which utilizes two kinds of springs to obtain two levels of torsion characteristics. In the lower torsion angular range, the clutch or dampening disk assembly has low torsion rigidity and low hysteresis torque, such that rattling during idling can be prevented. In the higher torsion angular range, the clutch or dampening disk assembly has high torsion rigidity and high hysteresis torque, such that front and back movements during tip-in/tip-out rattlings are sufficiently dampened.

There has also been known a dampening mechanism in which a friction mechanism is prevented from operating when small vibrations from fluctuations in engine combustion are transmitted in a higher torsion angular range, even though the friction mechanism is adapted to function in the higher torsion angular range. In this manner, the clutch disk assembly dampens small vibrations by generating small hysteresis torque.

In a conventional clutch disk assembly, a resin-made friction member is coupled to, for instance, a retaining plate, such that the friction member and the retaining plate are rotatable to each other within a predetermined angular range. Therefore, when small vibrations occur in the higher torsion angular range of the torsion characteristics, a cone spring slides against the retaining plate. Since the cone spring and the retaining plate are both made of metals, hysteresis torque generated in this case is not adjustable. As a result, hysteresis torque of certain types of vehicles is not adjusted to an adequate level for small vibrations.

In view of the above, there exists a need for a clutch or dampening disk assembly which overcomes the above mentioned problems in the prior art. This invention addresses this need in the prior art as well as other needs, which will become apparent to those skilled in the art from this disclosure.

SUMMARY OF THE INVENTION

It is an object of the present invention to provide a clutch or dampening disk assembly which allows an easy adjustment of the level of hysteresis torque generated during small vibrations.

In accordance with one aspect of the present invention, the dampening disk assembly comprises first and second input disk plate members, a hub, an intermediate disk plate member, a friction member, an urging member, intermediate mechanisms, a first elastic member and a second elastic member. The first and second input disk plate members are fixed to each other and are disposed in an axial direction with a gap there between. The hub is disposed on an inner circumferential side of the first and second input disk plate members. The intermediate disk plate member is disposed on an outer circumferential side of the hub and between the first and second input disk plate members in the axial direction. The friction member is disposed between the second input disk plate member and the intermediate disk plate member, and the friction member engages with the second input disk plate member, movably in the axial direction, so that torque may be input from the second input disk plate member. The urging member is disposed between the friction member and the second input disk plate member in the axial direction, and the urging member gives the friction member and the second input disk plate member resiliency in the axial direction. The first elastic member elastically couples the intermediate mechanisms with the hub in the rotational direction. The first elastic member is a member, which brings about low rigidity within a lower torsion angular range of torsion characteristics. The second elastic member elastically couples the first and second input disk plate members with the intermediate disk plate member in the rotational direction. The second elastic member is a member, which brings about high rigidity within a higher torsion angular range of torsion characteristics.

The intermediate mechanisms comprise a first intermediate member and a second intermediate member. The first intermediate member is disposed so as to contact the friction member from the axial direction. The second intermediate member is disposed between the first intermediate member and the intermediate disk plate member in the axial direction so as to transmit torque between the first intermediate member and the intermediate disk plate member. A predetermined gap, which prevents the friction member and the intermediate mechanisms from sliding against small torsion vibration within the higher torsion angular range, is provided with at least one of between the first intermediate member and the second intermediate member in the rotational direction and between the second intermediate member and the intermediate disk plate member in the rotational direction.

According to the dampening disk assembly as set forth above, when torque is input to the first and second input disk plate members, the torque is transmitted from the input disk plate members to the second elastic member, the intermediate disk plate member, the intermediate mechanisms, the first elastic member, and the hub in that order. Also, when torsion vibration is generated in the dampening disk assembly, the first and second input disk plate members rotate relatively to each other and the first and the second elastic members are compressed in the rotational direction between the input disk plate members. In this manner, various torsion vibrations is effectively absorbed and dampened.

The torsion characteristic of the dampening disk assembly will be explained using operation in which the hub is rotated in one direction relative to the first and second input disk plate members, which are fixed to other members. Within the lower torsion angular range, the first elastic member is compressed in the rotational direction and a low rigidity characteristic is obtained. When the torsion angle increases and enters the higher torsion angular range, the second elastic member is compressed and a high rigidity characteristic is obtained. In the higher torsion angular range, relatively large friction is generated when the friction member slides against the intermediate mechanisms in the rotational direction.

When a vehicle is running at normal speed (the torsion angle of the first and second input disk plate members relative to the hub is in the higher torsion angular range), if, for instance, small torsion vibration is generated due to torque change of the engine, the friction member does not rotate relatively against the intermediate mechanisms, despite the fact that the torsion angle is in the higher torsion angular range, provided that the torsion vibration is within a torsion angular range of a predetermined gap. Accordingly, no sliding is generated between the friction member and the intermediate mechanisms. As a result, relatively large friction due to the friction member is not generated and, hence, the small torsion vibration may be effectively absorbed and dampened.

Since the intermediate mechanisms are comprised of the first intermediate member and the second intermediate member and the predetermined gap is provided with at least one of between the first intermediate member and the second intermediate member in the rotational direction and between the second intermediate member and the intermediate disk plate member in the rotational direction, it is possible, by selecting the location of the gap, to change the member against which the second intermediate member slides when small torsion vibration is generated. As a result, hysteresis torque of different levels may be obtained when respective friction coefficients between the second intermediate member and a respective member are different. Consequently, an appropriate characteristic may be obtained in accordance with the types of vehicles. In particular, since it is possible to select a member against which the second intermediate member slides by altering the second intermediate member, the object may be readily achieved.

Preferably, the dampening disk assembly as set forth above has the friction coefficient between the first intermediate member and the second intermediate member being different from the friction coefficient between the intermediate disk plate member and the second intermediate member. The second intermediate member is preferably made of resin.

The dampening disk assembly of the present invention is designed so that modification of the design of the second intermediate member can be easily accomplished.

According to the dampening disk assembly of the present invention, a predetermined gap, which prevents the friction member and the intermediate mechanisms from sliding against small torsion vibration within the higher torsion angular range, is provided with both between the first intermediate member and the second intermediate member in the rotational direction and between the second intermediate member and the intermediate disk plate member in the rotational direction. Since the gaps are formed in a series in the rotational direction, the start of hysteresis torque can be smoothen.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 43 is a partial cross sectional view of a hub flange and first and second sub plates to show an engagement therebetween;

DETAILED DESCRIPTION OF THE PREFERRED EMBODIMENTS

Figure 1:
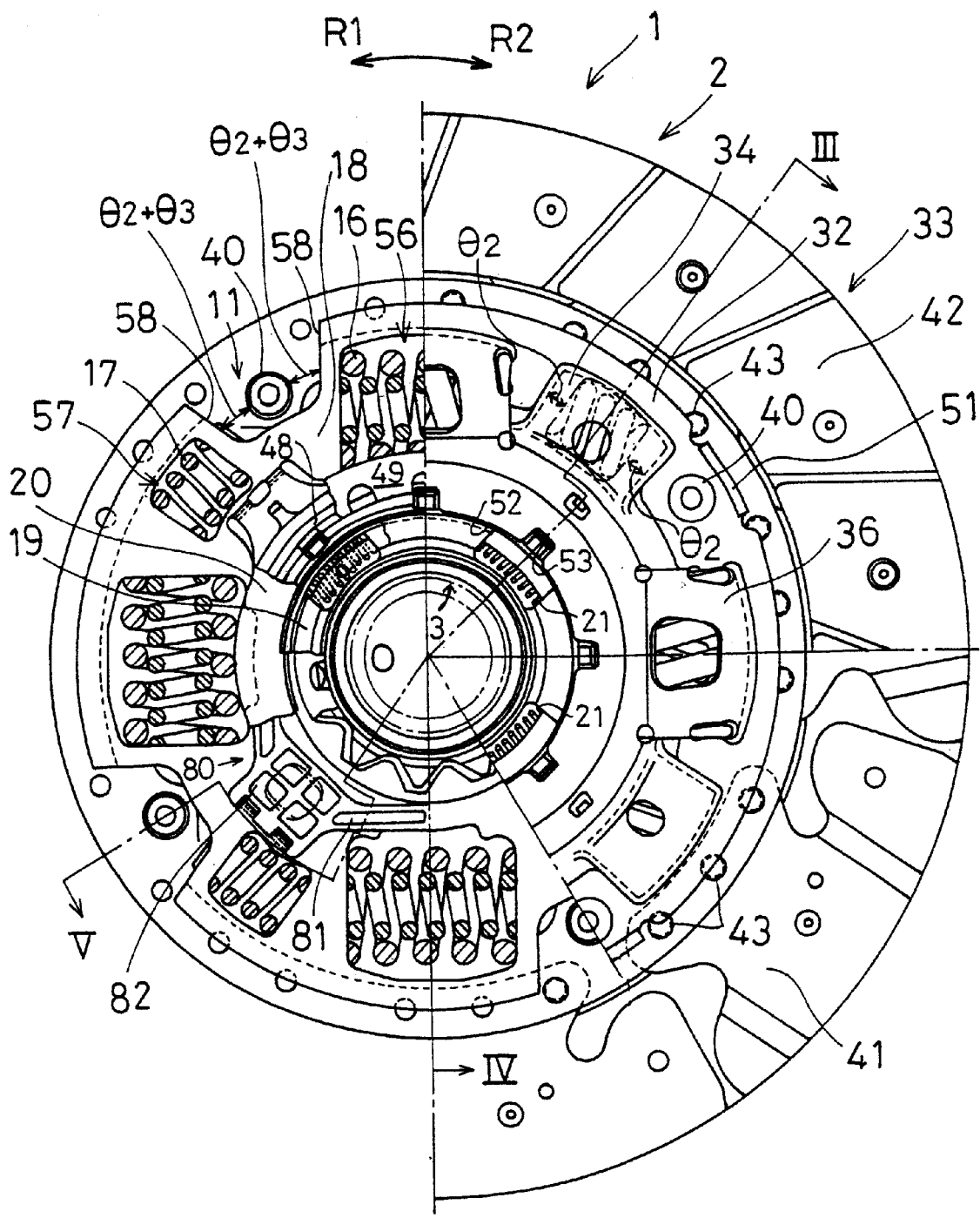
FIG. 1 is a partial side elevational view of a clutch or dampening disk assembly in accordance with an embodiment of the present invention with portions broken away for purposes of illustration.
Figure 2:
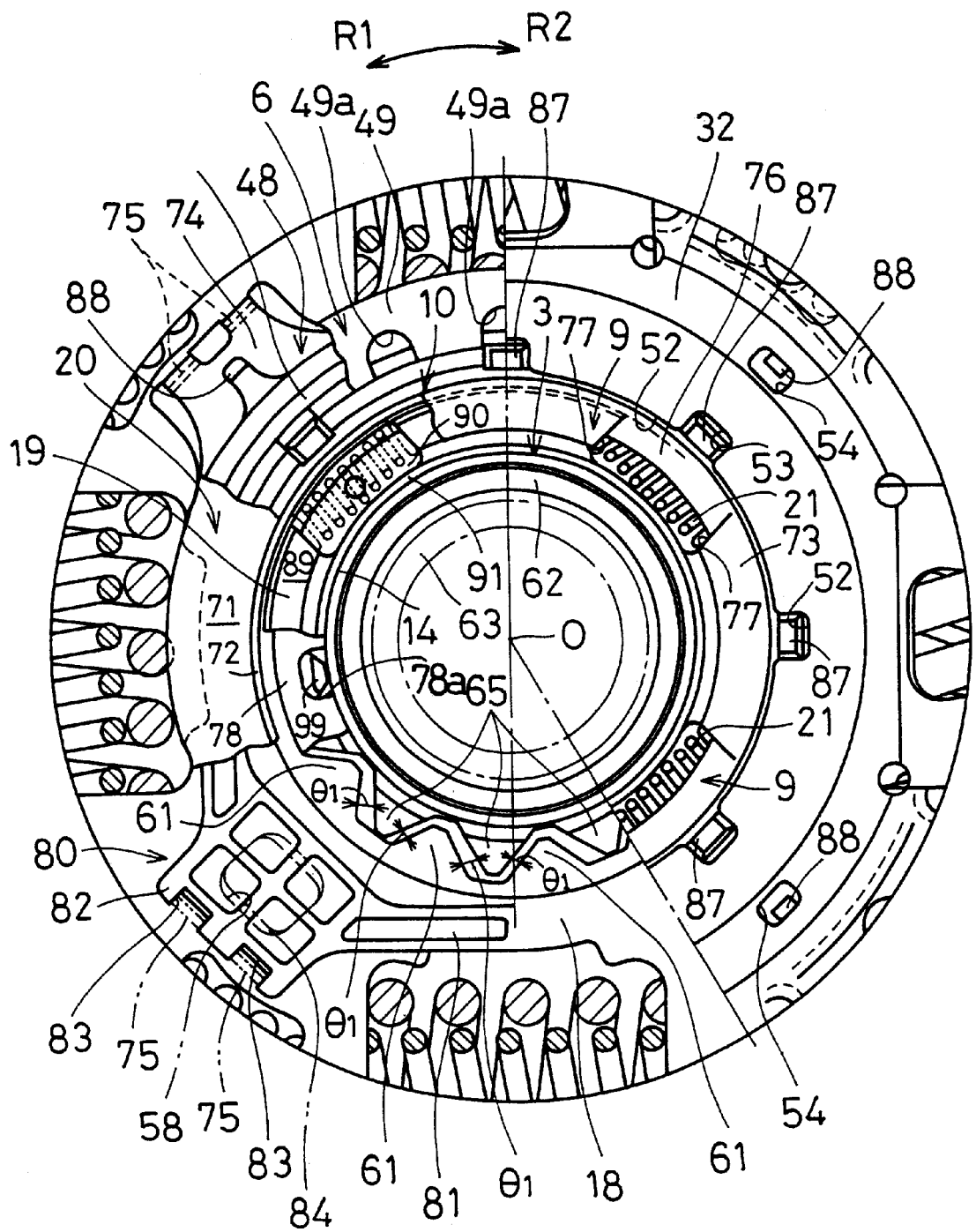
FIG. 2 is an enlarged, partial side elevational view of a part of the clutch or dampening disk assembly illustrated in FIG. 1 with portions broken away for purposes of illustration.
Figure 3:
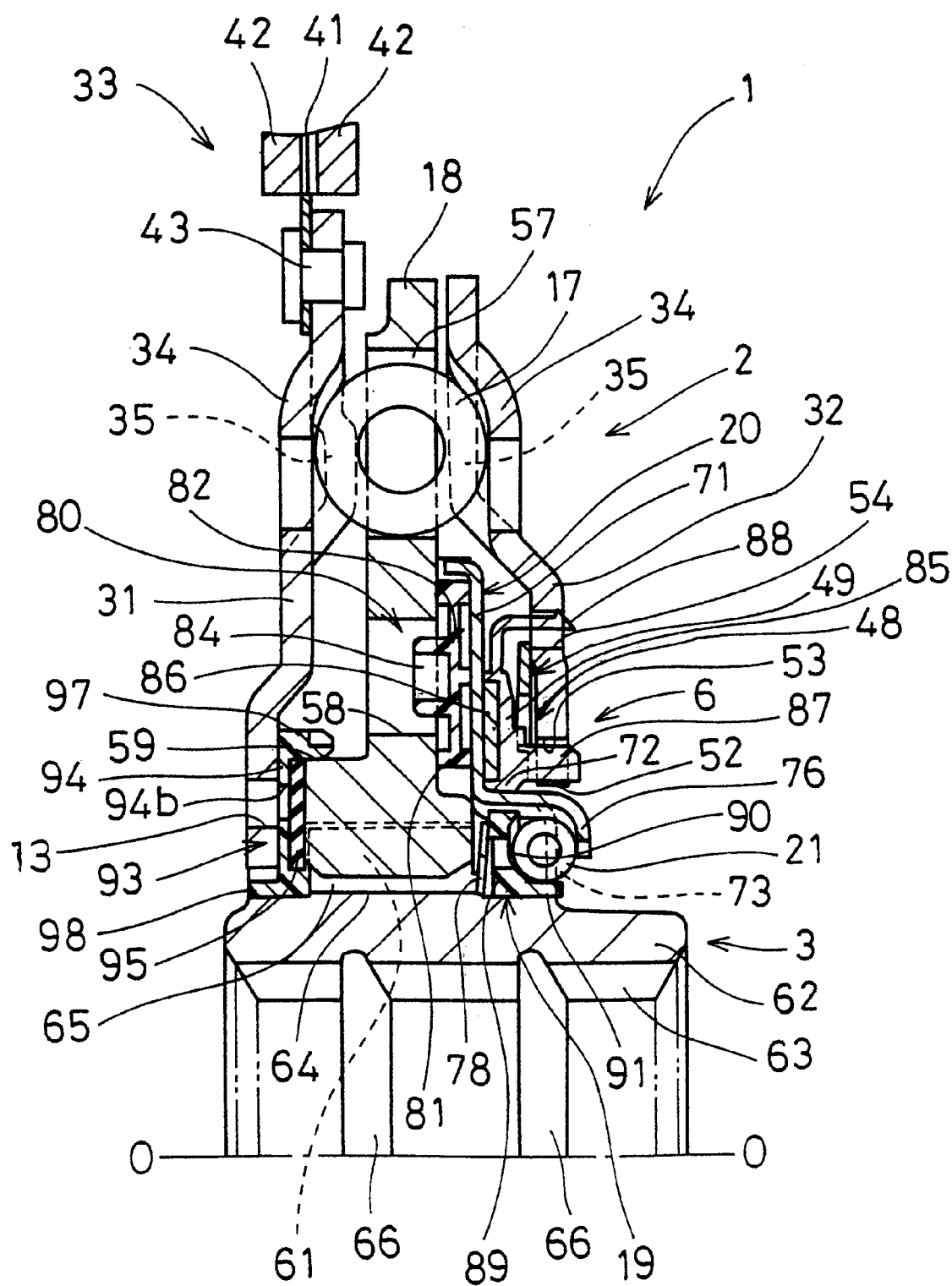
FIG. 3 is an enlarged, partial cross sectional view of a part of the clutch or dampening disk assembly illustrated in FIGS. 1 and 2 as viewed along section line O-III of FIG. 1.
Figure 4:
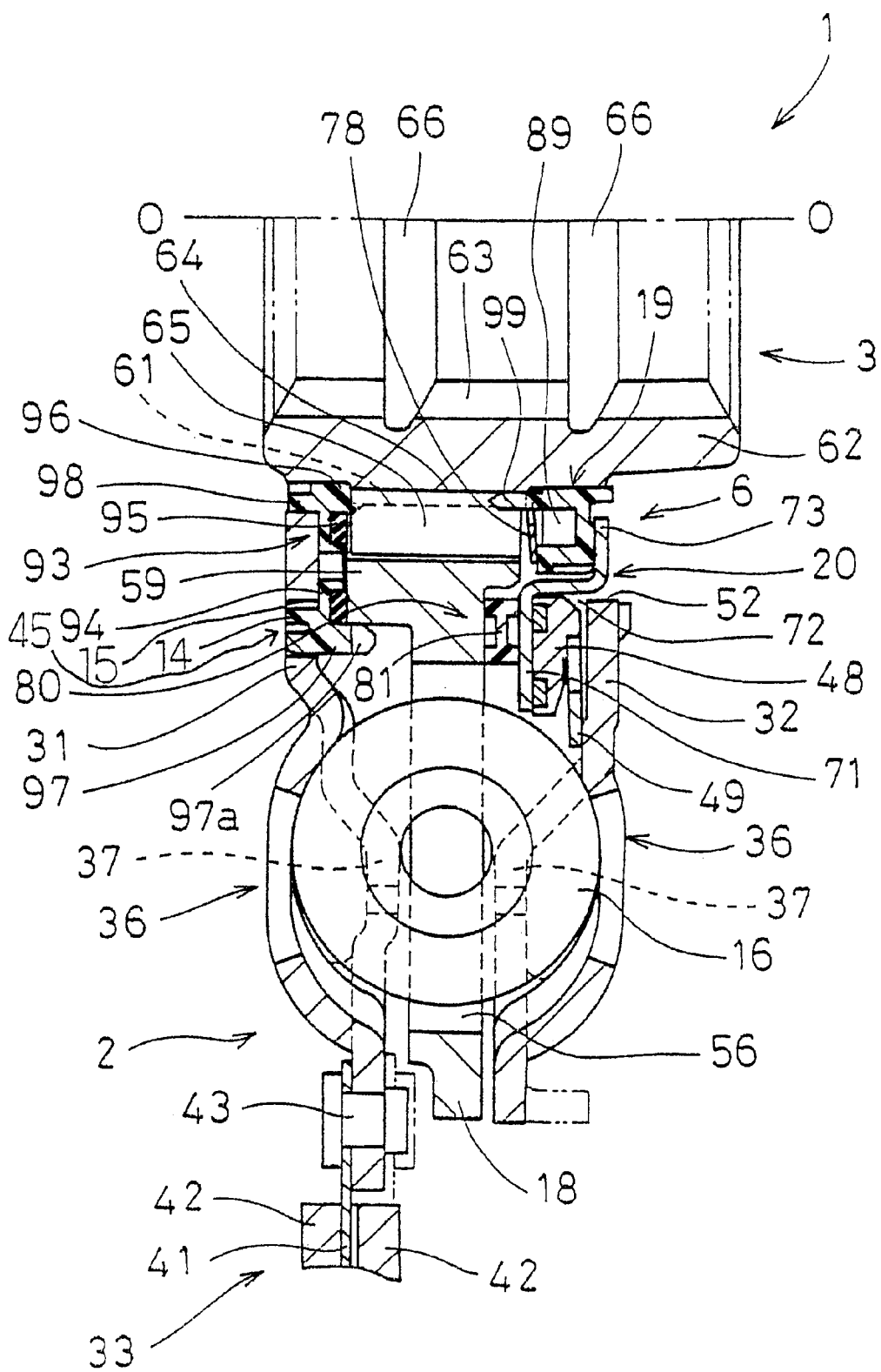
FIG. 4 is an enlarged, partial cross sectional view of a part of the clutch or dampening disk assembly illustrated in FIGS. 1–3 as viewed along section line O-IV of FIG. 1.
Figure 5:
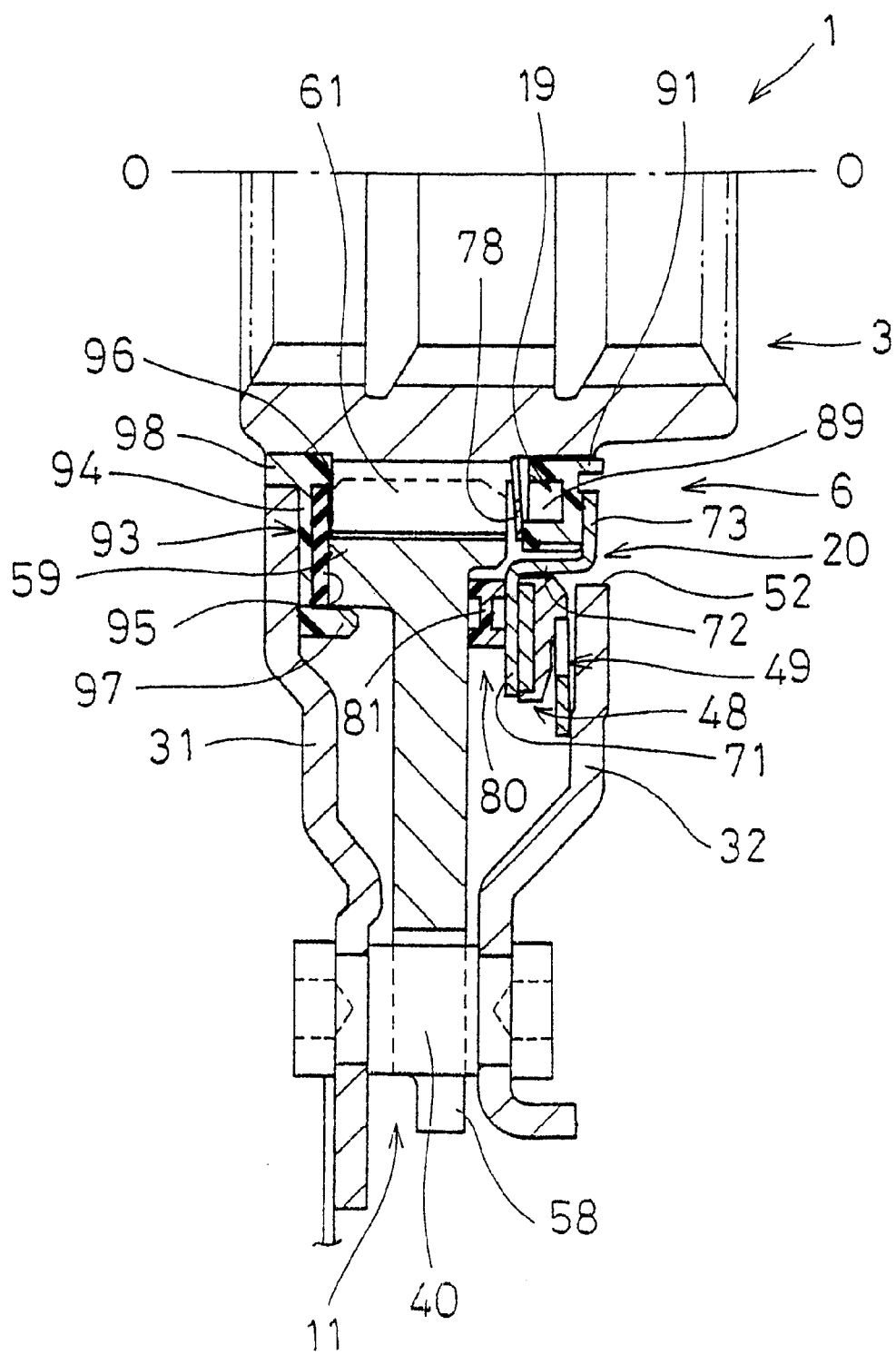
FIG. 5 is an enlarged, partial cross sectional view of a part of the clutch or dampening disk assembly illustrated in FIGS. 1–4 as viewed along section line O-V of FIG. 1.

Referring to FIGS. 1 to 5, a clutch or dampening disk assembly 1 is illustrated in accordance with a first embodiment of the present invention. The clutch or dampening disk assembly 1 is used for a clutch of a car or other motorized vehicle. On the left side of the clutch disk assembly as viewed in FIGS. 3 to 5, an engine and a flywheel (not shown in Figures) are located, and on the right side as viewed in FIGS. 3 to 5, a transmission (not shown in Figures) is located. Hereafter, the left side as viewed in FIGS. 3 to 5 is referred to as a first axial side (engine side), and the right side as viewed in FIGS. 3 to 5 is referred to as a second axial side (transmission side). The centerline O—O in each of the drawings represents an axis of rotation or a center of rotation of the clutch disk assembly 1. As shown in FIGS. 1 and 2, an arrow R1 indicates a first rotational direction (positive direction) of the flywheel and the clutch disk assembly 1, while an arrow R2 indicates its opposite rotational direction (negative direction) thereof.

Figure 7:
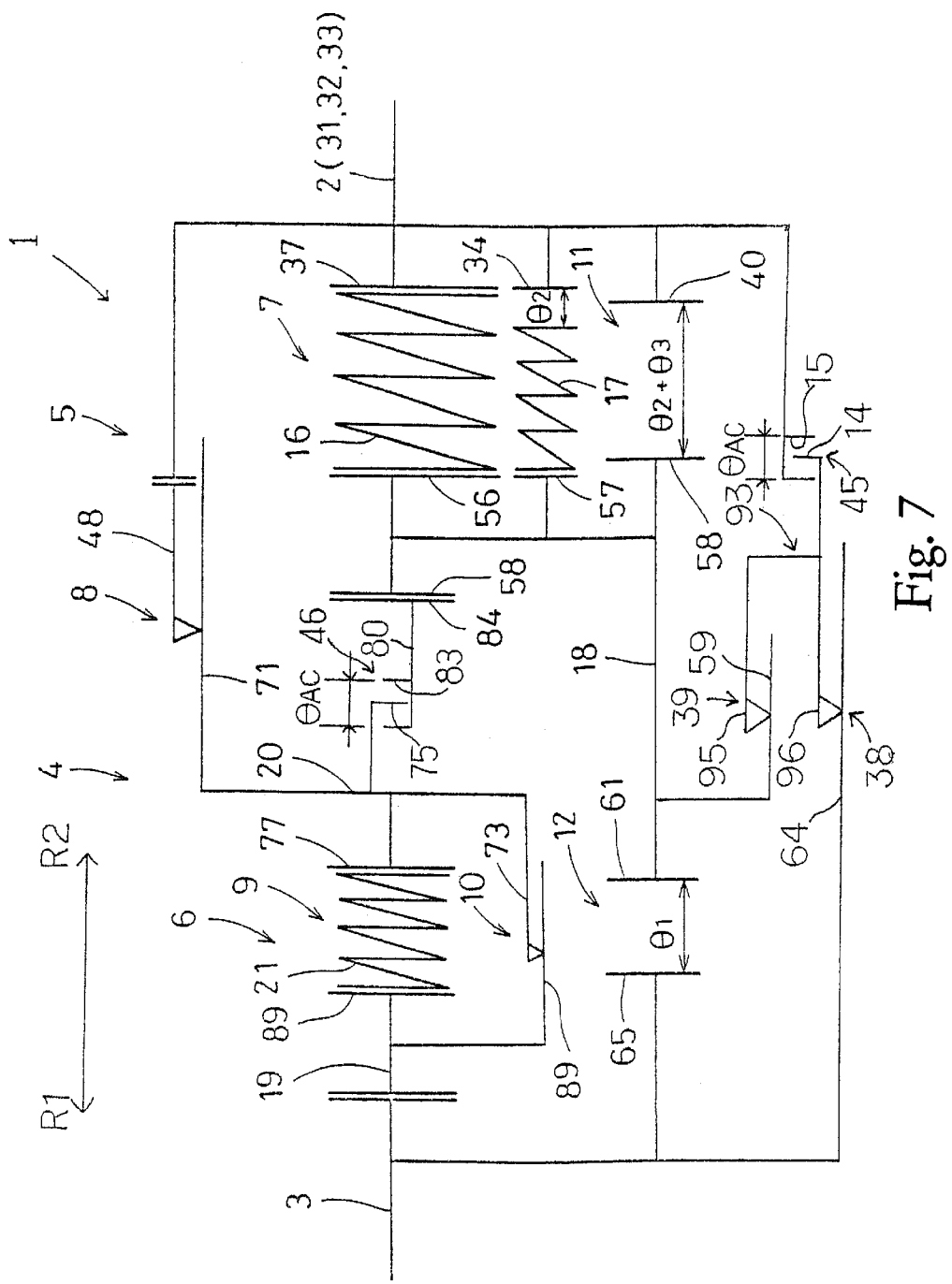
FIG. 7 is a diagrammatic machine circuit drawing of a dampening mechanism utilizing the clutch or dampening disk assembly illustrated in FIGS. 1–5 in accordance with the present invention.

The clutch or dampening disk assembly 1, as shown in a machine circuit diagram of FIG. 7, mainly includes an input rotary portion 2, a hub or output rotary portion 3, and a dampening mechanism 4 disposed between the input rotary portion 2 and the hub 3. The dampening mechanism 4 includes a first dampening mechanism 5 that functions in a first range of a torsion angle of a second step, and a second dampening mechanism 6 that functions in a second range of a torsion angle of a first step. The first dampening mechanism 5 provides a high rigidity in a higher torsion angular range, whereas the second dampening mechanism 6 provides a lower rigidity in a lower torsion angular range. The first dampening mechanism 5 and the second dampening mechanism 6 are disposed between the input rotary portion 2 and hub 3 so as to operate in series via a hub flange or intermediate plate 18.

Still referring to FIG. 7, the first dampening mechanism 5 basically includes a first elastic mechanism 7, a first friction mechanism 8 and a first stopper 11. The first elastic mechanism 7 has two sets of first springs 16 and springs 17 as seen in FIG. 1. The first friction mechanism 8 generates friction when the hub flange 18 rotates relatively against the input rotary portion 2. The first stopper 11 is a mechanism that controls a relative turning angle between the hub flange 18 and the input rotary portion 2. The first stopper 11 allows the input rotary portion 2 and the hub flange 18 to rotate relatively to each other within a range of a torsion angle of $\theta_2 + \theta_3$. The first elastic mechanism 7 (springs 16 and 17), the first friction mechanism 8 and the first stopper 11 are disposed between the hub flange 18 and the input rotary portion 2 so as to operate in parallel.

The second dampening mechanism 6 mainly includes a second elastic mechanism 9, a second friction mechanism 10 and a second stopper 12. The second elastic mechanism 9 is formed of a plurality of second springs 21. Each second spring 21 of the second elastic mechanism 9 has a spring constant, which is set to be smaller than each of the first springs 16 and 17 of the first elastic mechanism 7. The second friction mechanism 10 is set so as to generate a friction smaller than the friction generated by the first friction mechanism 8. The second stopper 12 is a mechanism that controls relative rotation between the hub 3 and the hub flange 18 and permits the hub 3 and the hub flange 18 to rotate relatively within a range of a torsion angle $\theta_1$. The second elastic mechanism 9, the second friction mechanism 10 and the second stopper 12 are disposed between the hub 3 and the hub flange 18 so as to operate in parallel.

The structure of the clutch disk assembly 1 will now be described in more detail with reference to FIG. 3. The input rotary portion 2 includes a clutch plate 31, a retaining plate 32 and a clutch disk 33. The clutch plate 31 and the retaining plate 32 are disk-shaped members which form annular plate portions that are disposed axially apart from each other by a predetermined distance. The clutch plate 31 is disposed on the first axial side, and the retaining plate 32 is disposed on the second axial side. The outer circumferential parts of the clutch plate 31 and the retaining plate 32 are fixedly coupled to each other by a plurality of stop pins 40 disposed side by side in a circular direction as seen in FIGS. 1 and 5. Consequently, the axial distance between the clutch plate 31 and the retaining plate 32 is determined by the length of the plurality of pins 40. The pins 40 also allow the plates 31 and 32 to rotate together. A cushioning plate 41 of the clutch disk 33 is fixedly coupled to the outer circumferential part of the clutch plate 31 by a plurality of rivets 43 as seen in FIGS. 1, 3 and 4. An annular friction facing 42 is fixedly coupled to both sides of the cushioning plate 41.

As seen in FIG. 3, several first receptacles 34 are formed in each of the clutch plate 31 and the retaining plate 32 at equal intervals in a circular direction. The first receptacle 34 swells slightly in an axial direction. Each of the first receptacles 34 has first supporting portions 35 on both circular sides thereof. As seen in FIG. 4, several second receptacles 36 are formed in each of the clutch plate 31 and the retaining plate 32 at equal intervals in a circular direction. As shown in FIG. 1, the second receptacles 36 are disposed adjacent to the R1 side of each of the first receptacles 34. Each of the second receptacles 36 has second supporting portions 37 on both sides in a circular direction. As seen in FIG. 1, each second receptacle 36 is greater than the first receptacle 34 in both radial and circular directions.

As seen in FIGS. 3–5, the hub flange 18 is disposed axially between the clutch plate 31 and the retaining plate 32. The hub flange 18 operates as an intermediate portion between the input rotary portion 2 and the hub 3. The hub flange 18 is a disk-shaped member or annular portion that is thicker than the plates 31 and 32. In the hub flange 18, several first window bores 57 are formed corresponding to the first receptacles 34. The first window bores 57 are formed corresponding to the first receptacles 34. The circular angle of each of the first window bores 57 is smaller than a circular angle between two first supporting portions 35 of the first receptacles 34. A circumferential center of the first window bore 57 coincides approximately with that of the first receptacle 34. Therefore, as seen in FIG. 1, a gap of a torsion angle $\theta_2$ is formed between the circular end of the first window bore 57 and the first supporting portion 35 of the first receptacle 34 at both circular ends of the first window bore 57. The springs 17 are installed within the first window bores 57. The springs 17 are coil springs with their circular ends touching the circular ends of the first window bores 57. In this condition, there is a gap of a torsion angle $\theta_2$ between both circular ends of the springs 17 and the first supporting parts 35 of the first receptacles 34 as seen in FIG. 1.

As seen in FIG. 4, at the hub flange 18, the second window bores 56 are formed at positions corresponding to the second receptacles 36. The radial and circular lengths of the second window bores 56 are approximately the same as the lengths of the second receptacles 36. The first springs 16 are disposed within the second window bores 56. The first springs 16 form an elastic portion that includes two kinds of coil springs. The circular ends of first springs 16 touch both circular ends of the second window bores 56. In addition, both circular ends of the first springs 16 touch the second supporting portions 37 of the second receptacle 36.

As seen in FIGS. 3 and 4, a cylindrical portion 59, which extends in axially both directions, is formed at the inner circumferential part of the hub flange 18. The cylindrical portion 59 has a plurality of internal teeth 61 formed thereon as seen in FIG. 2. These internal teeth 61 extend radially inward from the cylindrical portion 59.

The hub 3 is a cylindrical member, which is disposed on the inner circumferential side of the plates 31 and 32 as well as on the inner circumferential side of the hub flange 18. In other words, the hub 3 is located within a center bore of each of these members. The hub 3 mainly includes a cylindrical boss 62. The hub 3 has a plurality of splines 63 formed at a center bore of the boss 62. Since the splines 63 are connected with the splines of a shaft extending from the transmission, it is possible to output a torque from the hub 3 to the transmission shaft. A flange 64 extends radially outwardly from the boss 62 of hub 3. In this embodiment, the radial width of the flange 64 is small. The flange 64 of hub 3 has a plurality of external teeth 65 extending radially outward therefrom. The external teeth 65 form a part of the flange 64 that extends radially outwardly from the boss 62. The external teeth 65 have a radial length corresponding to the cylindrical portion 59 of the hub flange 18. The external teeth 65 extend within circumferential gaps between the internal teeth 61. Gaps of a predetermined torsion angle $\theta_1$ are formed circularly between the external teeth 65. The torsion angle $\theta_1$ on the R$_2$ side of the external teeth 65 is set to be slightly larger than the torsion angle $\theta_1$ on the R$_1$ side. The circular width of either the internal tooth 61 or the external tooth 65 becomes smaller as it approaches the free end of the tooth in the radial direction.

The second dampening mechanism 6 will now be described as follows with particular reference to FIGS. 3–5 and 8–11. The second dampening mechanism 6 not only transmits a torque between the hub 3 and the hub flange 18, but also absorbs and dampens torsion vibrations. The second elastic mechanism 9 of the second dampening mechanism 6 mainly includes the second spring 21. The second friction mechanism 10 of the second dampening mechanism 6 includes a bushing 19, a fixing plate 20 and a second cone spring 78.

The fixing plate 20 operates as an input portion in the second dampening mechanism 6. In other words, the fixing plate 20 is a portion into which a torque is inputted from the hub flange 18. The fixing plate 20 is a thin metal plate portion disposed between the inner circumference of the hub flange 18 and the inner circumference of the retaining plate 32. As shown in FIGS. 8 to 11, the fixing plate 20 includes a first disk-shaped portion 71, a cylindrical or tubular portion 72, and the second disk-shaped portion 73. As shown in FIG. 3, the cylindrical portion 72 extends from the inner circumferential edge of the first disk-shaped portion 71 toward the second axial side (the transmission side). The second disk-shaped portion 73 extends radially inward from the cylindrical portion 72.

As seen in FIGS. 2–5, a spacer 80 is disposed between the first disk-shaped portion 71 of the fixing plate 20 and the hub flange 18. The spacer 80 connects the fixing plate 20 with the hub flange 18 in a rotary direction, and also transmits a force, which is applied from the fixing plate 20 to the hub flange 18. The spacer 80 is an annular resin member. The spacer 80 includes an annular portion 8 1and a plurality of protrusions 82 projecting radially outward from the annular portion 81 as seen in FIG. 2. Two cutouts 83 are formed at the outer circumferential edge of each of the protrusions 82. As seen in FIG. 3, a projection 84 extends from each of the protrusions 82 toward the first axial side. Projections 84 are inserted in connecting bores 58, which are formed in the hub flange 18. The projections 84 are coupled to the connecting bores 58 so as to be slightly movable in the radial direction but relatively unmovable in the rotary direction.

Figure 8:
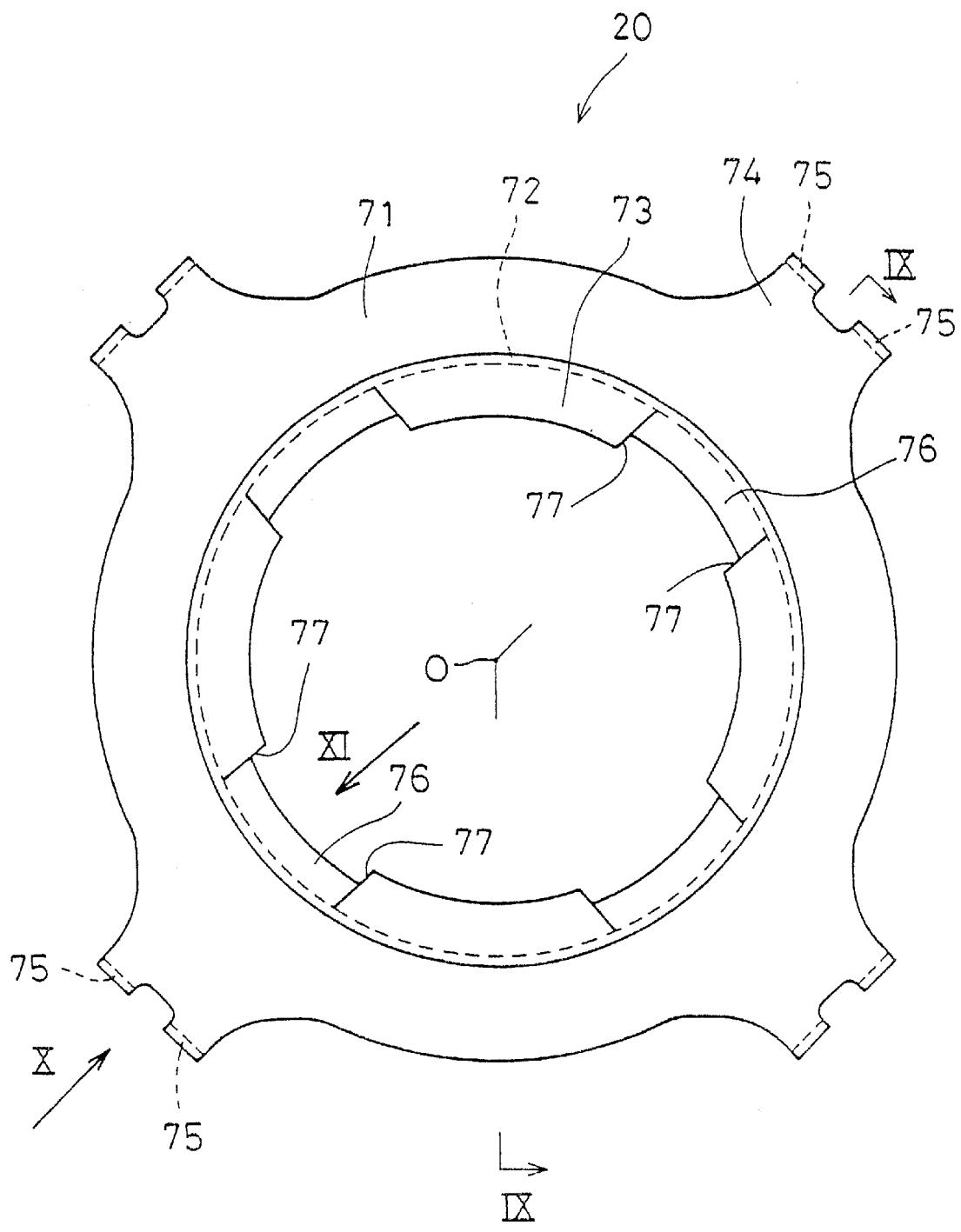
FIG. 8 is a side elevational view of a fixing plate utilized with the clutch or dampening disk assembly illustrated in FIGS. 1–5 in accordance with the present invention.
Figure 9:
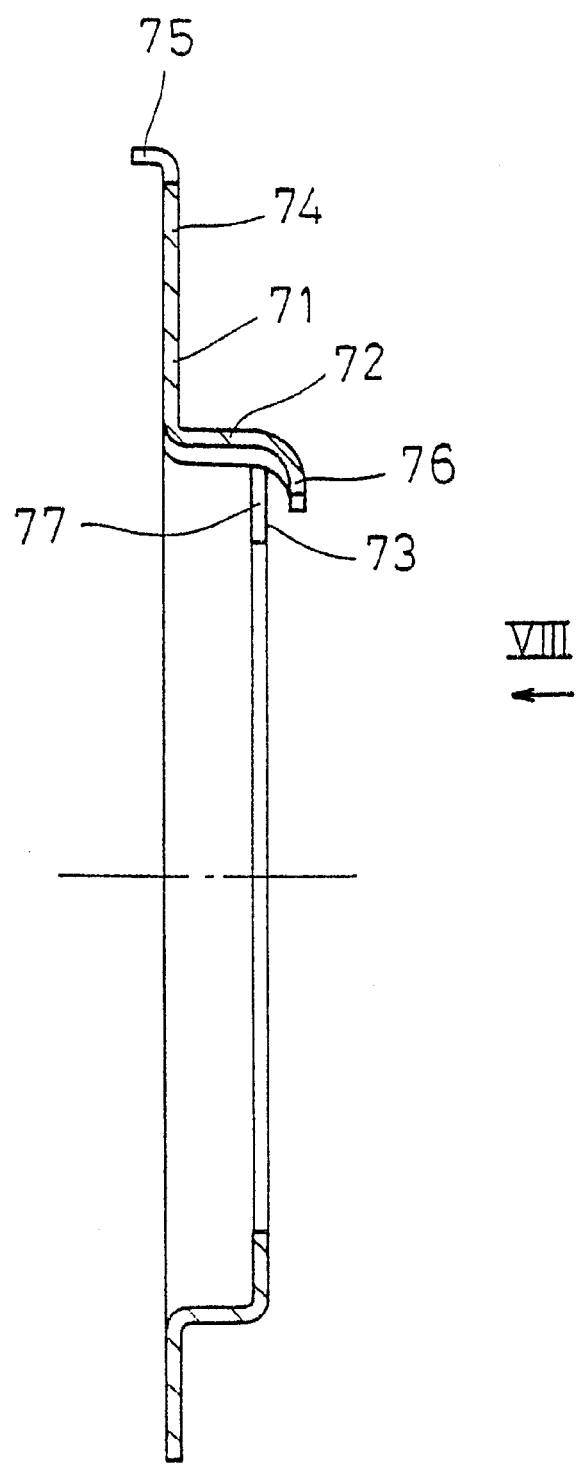
FIG. 9 is a cross sectional view the fixing plate illustrated in FIG. 8 as viewed along section line IX—IX of FIG. 8.
Figure 10:
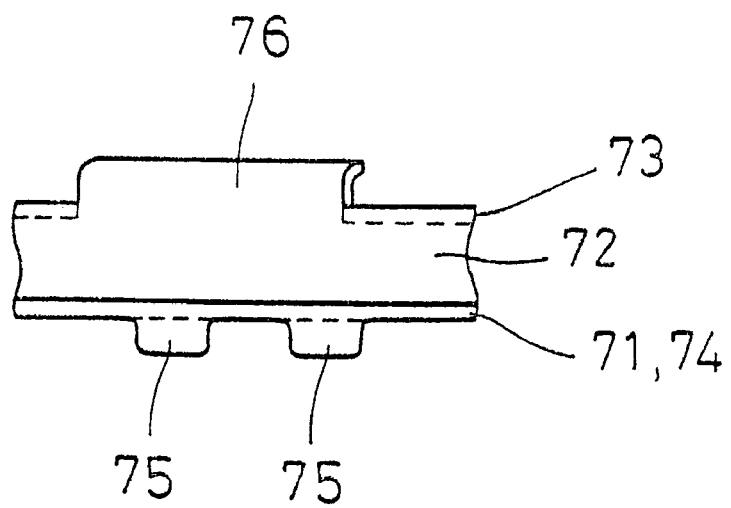
FIG. 10 is a partial edge elevational view of a part of the fixing plate illustrated in FIG. 8 as viewed along an arrow X of FIG. 8.
Figure 11:
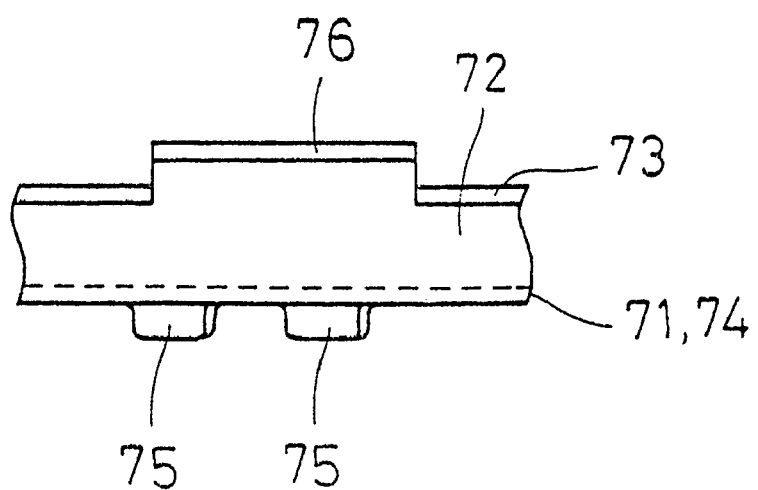
FIG. 11 is a partial edge elevational view of a part of the fixing plate illustrated in FIG. 8 as viewed along an arrow XI of FIG. 8.
Figure 12:
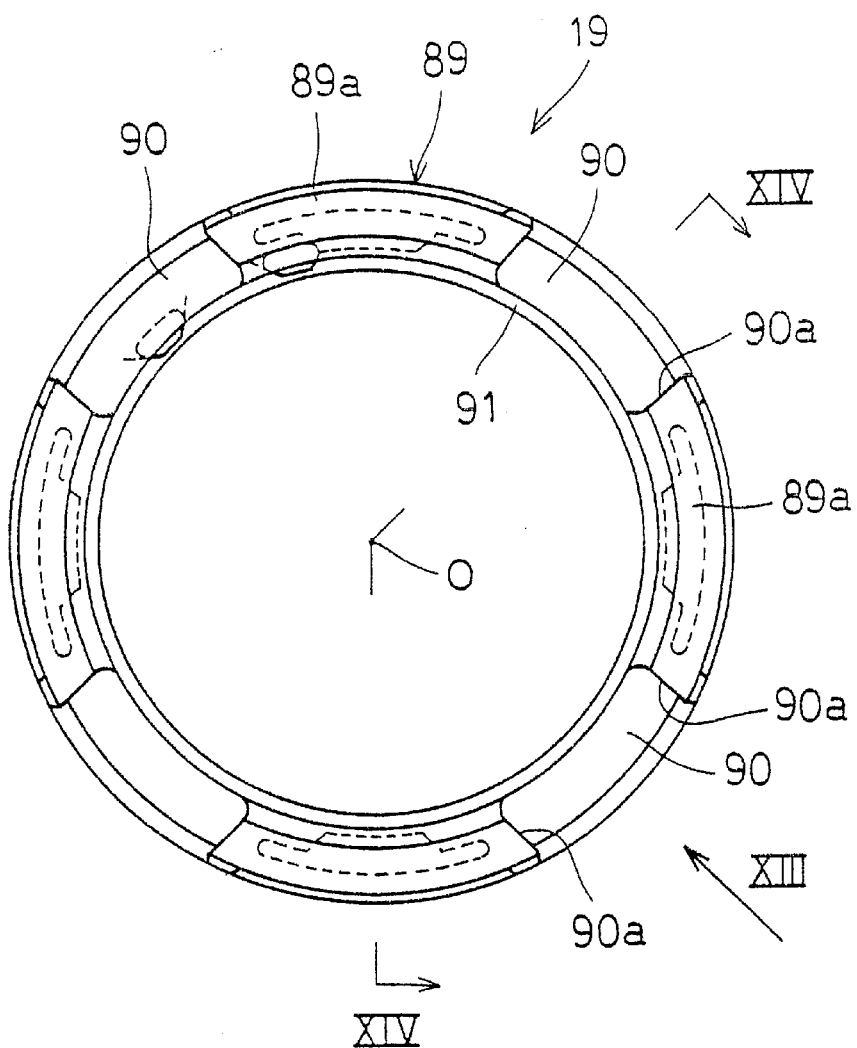
FIG. 12 is a front side elevational view of a bushing utilized with the clutch or dampening disk assembly illustrated in FIGS. 1–5 in accordance with the present invention.
Figure 13:
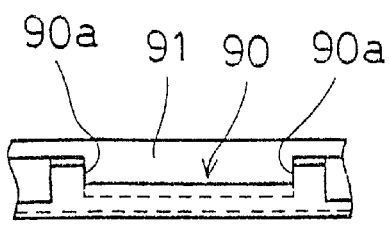
FIG. 13 is a partial edge elevational view of a part of the bushing illustrated in FIG. 12 as viewed along an arrow XIII of FIG. 12.

As seen in FIGS. 2 and 8, the fixing plate 20 has four protrusions 74. Protrusions 74 are formed at equal intervals around the first disk-shaped portion 71 of the fixing plate 20, and project radially outward therefrom. Each of the protrusions 74 is formed corresponding to the protrusions 82 of the spacer 80. The protrusions 74 include nails or tabs 75 to be coupled into the cutouts 83 formed at the ends of the protrusions 82 of the spacer 80. In the aforementioned structure, the fixing plate 20 is fixedly connected with the hub flange 18 via the spacer 80 to be unrotatable relative to the hub flange 18. In other words, the fixing plate 20 is connected to hub flange 18 such that a torque can be transmitted from the hub flange 18 to fixing plate 20. In addition, the hub flange 18 supports the first axial side of the fixing plate 20 with the spacer 80 therebetween. The fixing plate 20 is movable toward the second axial side, away from the spacer 80 and the hub flange 18.

Figure 6:
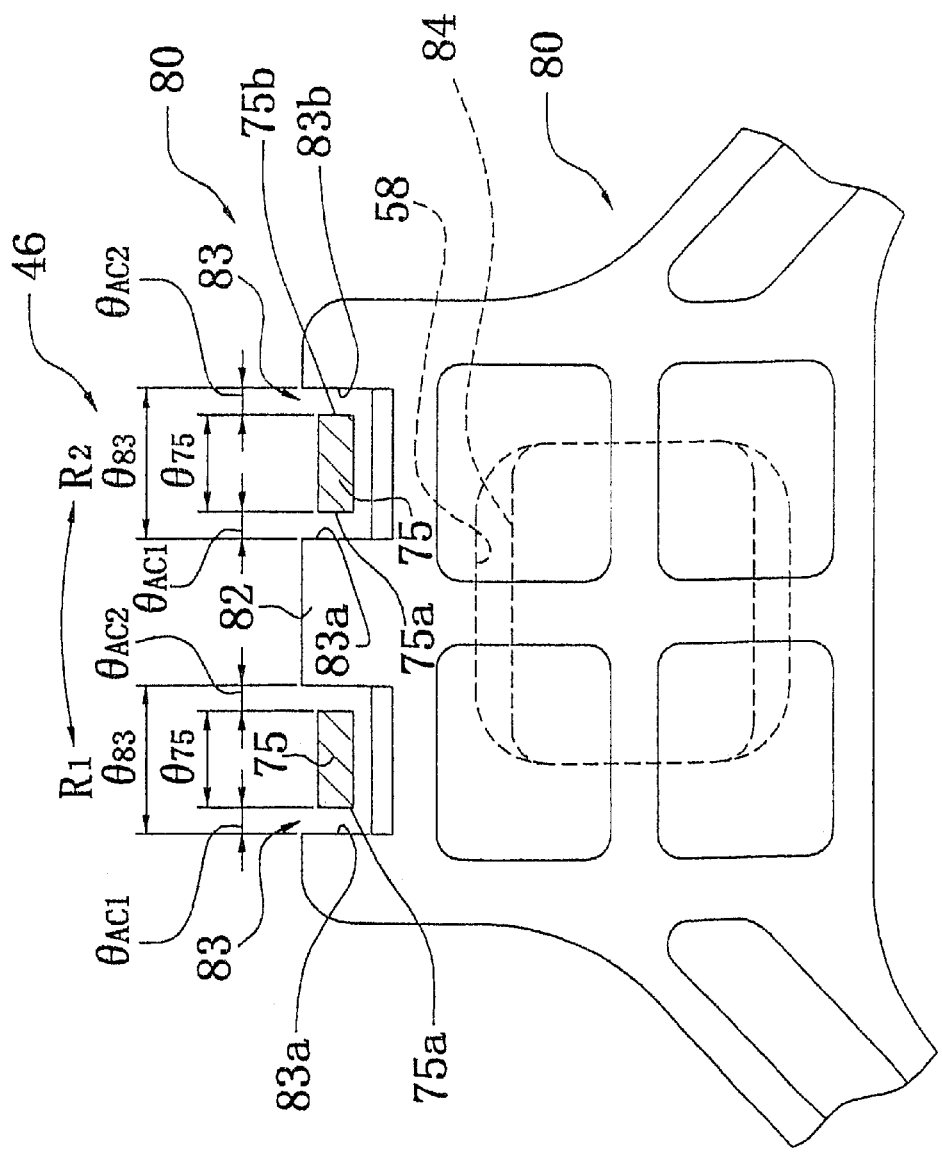
FIG. 6 is an enlarged, partial side elevational view of the spacer for the clutch or dampening disk assembly illustrated in FIGS. 1–5 for explaining a second gap mechanism.

Referring to FIG. 6, a second gap mechanism 46 will now be described in more detail. In the second gap mechanism 46, the nails 75 engage the cutouts 83. The rotational angle $\theta_{75}$ of each of the nails 75 is smaller than the rotation angle $\theta_{83}$ of each of the cutout 83 by an angular gap $\theta_{AC}$. For instance, gap $\theta_{AC}$ can be between about two and about four degrees. Gap $\theta_{AC}$ is an angular gap that is formed between the fixed plate 20 and the spacer 80 in the rotational direction. In other words, gap $\theta_{AC}$ is effectively an angular gap between the first spring 16 and the second spring 21 in the rotational direction. More specifically, gap $\theta_{AC}$ is operatively disposed between the fixed plate 20 and the input rotary portion 2 so as to operate in series with the first springs 16 and in parallel with the first friction mechanism 8. The gap $\theta_{AC}$ prevents the first friction mechanism 8 from operating, upon receiving torsional vibrations while the first springs 16 are compressed. In other words, the gap $\theta_{AC}$ prevents generation of high hysteresis torque in the higher torsion angular range. Since the spacer 80 is made of a resin, the sliding between the fixed plate 20 and the spacer 80 does not generate much friction, unlike sliding between two metal members.

In FIG. 6, a gap $\theta_{AC1}$ is formed between a first end 75a of the nail 75 and a first end 83a of the cutout 83. A gap $\theta_{AC2}$ is also formed between a second end 75b of the nail 75 and a second end 83b of the cutout 83. The sum of gap $\theta_{AC1}$ and gap $\theta_{AC2}$ is equal to gap $\theta_{AC}$. The number of the nail and cutout combinations is two in this embodiment. However, there can be more than three or only one combinations of the nail and the cutout.

Referring to FIGS. 1–5, the first friction mechanism 8 that is formed between the fixing plate 20 and the retaining plate 32 will now be described in more detail. The first friction mechanism 8 includes a first friction washer 48 and a first cone spring 49. The first friction washer 48 is connected to the retaining plate 32 so as to be relatively non-rotatable, but axially movable relative to each other. The friction washer 48 generates friction by sliding against the fixing plate 20. The first friction washer 48 includes mainly an annular resin portion. Particularly, the first friction washer 48 includes an annular portion 85.

A friction portion 86 is molded to or bonded to the annular portion 85 on a side facing the fixing plate 20. The friction portion 86 is a portion that is designed to increase a friction coefficient between the first friction washer 48 and the fixing plate 20. The friction portion 86 has an annular or disk-like shape. The annular portion 85 has a plurality of rotational connecting portions 87 extending toward the second axial side. The rotational connecting portions 87 are formed at an inner circumference of the annular portion 85. The rotational connecting portions 87 engage the plurality of cutouts 53 formed in the center bore 52 (inner circumferential edge) of the retaining plate 32. In this way, the first friction washer 48 engages the retaining plate 32 in a relatively non-rotatable, but axially movable manner. The annular portion 85 further includes connecting portion 88s. The connecting portions 88 extend radially outward from the outer circumferential edge of the annular portion 85, and then extend toward the second axial side. The connecting portions 88 are relatively thin members. Each of the connecting portions 88 has a nail or detent at the end thereof. The connecting portions 88 are inserted into bores 54 formed on the retaining plate 32, such that the nail portions of the connecting portions 88 engage the retaining plate 32. The connecting portion 88 urges itself in a radially outward direction while it engages the retaining plate 32, so as to apply pressure on the bore 54. Therefore, the first friction washer 48 does not fall off from the retaining plate 32 easily after the clutch disk assembly is partially assembled (sub-assembling). In this way, the first friction washer 48 has two separate connecting portions: the rotational connecting portions 87 for transmitting a torque; and the connecting portions 88 for temporarily stopping members relative to the retaining plate 32. The connecting portions 88 are thin and bendable. Since the connecting portions 88 have a low rigidity, they are less likely to break during sub-assembling. On the other hand, the rotational connecting portions 87 are not likely to receive a stress during sub-assembling. Therefore, the rotational connecting portions 88 are less likely to break than in the case of a conventional resin friction washer having a nail part at a radially connecting portion that engages the retaining plate. In addition, since the present invention does not require a press fitting machine during sub-assembling, an equipment cost cart be reduced.

The first cone spring 49 is disposed between the first friction washer 48 and the inner circumference of the retaining plate 32. The first cone spring 49 is compressed in an axial direction between the retaining plate 32 and the first friction washer 48. The outer circumferential edge of the first cone spring 49 is supported by the retaining plate 32, while the inner circumferential edge of the first cone spring 49 contacts the annular portion 85 of the first friction washer 48. As seen in FIG. 2, the first cone spring 49 has a plurality of cutouts 49a formed on its inner circumferential side thereof. In other words, the cutouts 49a at the inner circumferential edges of the first cone spring 49 form a plurality of projections. Projections formed on the outer circumferential side of the rotational connecting portions 87 of the first friction washer 48 engage the cutouts 49a. In this way, the first cone spring 49 engages the first friction washer 48 in a relatively non-rotatable manner.

Referring to FIGS. 8–11, the second disk-shaped portion 73 of the fixing plate 20 includes several cut-and-lift parts 76 formed at equal intervals in a circular direction. Cutting the inner circumferential side of the second disk-shaped portion 73, and lifting the cut portion therefrom forms the cut-and-lift parts 76. The cut-and-lift parts 76 are disposed closer to the second axial side relative to other members of the second disk-shaped portion 73. At portions of the second disk-shaped portion 73 where the cut-and-lift parts 76 are formed, cutout parts are formed as seen in FIG. 8. Supporting parts 77 are formed at both circular ends of the cutout part.

Figure 14:
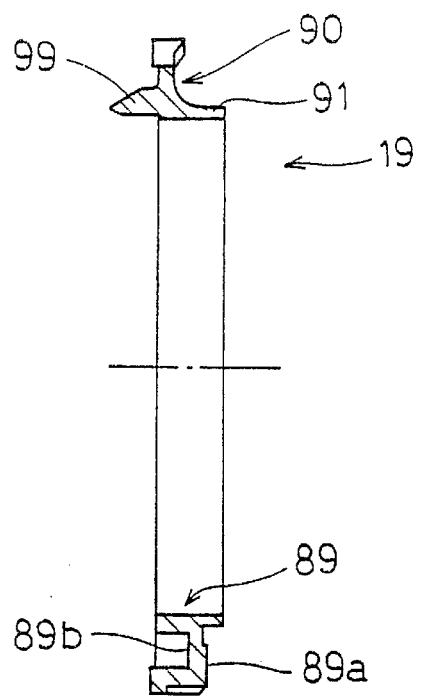
FIG. 14 is a cross sectional view of the bushing illustrated in FIGS. 12 and 13 as viewed along section line XIV—XIV of FIG. 12.
Figure 15:
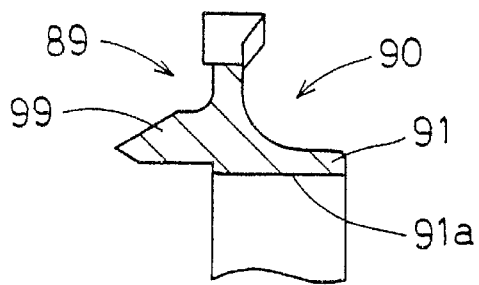
FIG. 15 is an enlarged, partial cross sectional view of a part the bushing illustrated in FIGS. 12–14.

A bushing 19 operates as an output portion in the second dampening mechanism 6. The bushing 19 is connected with the hub 3 so as to be non-rotatable relative to each other. The bushing 19 is an annular resin portion. The bushing 19 is disposed on the second axial side with respect to both the internal teeth 61 of the hub flange 18 and the external teeth 65 of the hub 3. The bushing 19 is also located on the inner circumference of the cylindrical portion 72 of the fixing plate 20, and in a space on the outer circumferential side of the second axial side part of the boss 62. As shown in FIGS. 12–19 the bushing 19 includes mainly an annular portion 89 with a plurality of spring receptacles 90, as shown in FIGS. 12 to 19. The spring receptacles 90 are formed at equal intervals in a circular direction on the second axial side face of the annular portion 89. The spring receptacles 90 are formed at locations corresponding to the cut-and-lift parts 76 or the cutout parts of the fixing plate 20. The spring receptacles 90 are concave parts that are formed on the second axial side face of the bushing 19. As shown in FIGS. 14 and 15, the concave parts are formed smoothly so that its cross section forms a part of a circle. In addition, a bore is formed at the radial and circular center of each of the spring receptacles 90 such that the bore penetrates the spring receptacle 90 in the axial direction. At the inner circumference of the annular portion 89, an inner circumferential supporting part 91 is formed. The inner circumferential supporting part 91 has a cylindrical shape. The supporting part 91 extends toward the second axial side from the annular portion 89. The inner circumferential supporting part 91 forms an inner circumferential face 91a of the bushing 19. This inner face 91 a touches or is adjacent to the outer circumferential face of the boss 62. The second axial side of the annular portion 89 of the bushing 19 forms a side face 89a. This side face 89a touches the first axial side face of the second disk-shaped portion 73 of the fixing plate 20.

In this embodiment, the annular portion 89 of the bush 19 and the second disk-shaped portion 73 of the fixed plate 20 form a second friction mechanism 10. The second springs 21 are disposed within each of the spring receptacles 90. The second springs 21 are preferably coil springs that are smaller than the first spring 16 or the spring 17. The second spring 21 also has spring constants that are smaller than the first spring 16 or the spring 17. The second springs 21 are disposed within the spring receptacles 90 such that the circular ends of the second springs 21 touch or are adjacent to both circular ends of the spring receptacle 90. The bushing 19 supports the first axial side and the inner circumferential side of the second springs 21 within the spring receptacle 90.

The supporting parts 77 of the fixing plate 20 are connected in a rotary direction with both of the circular ends of the second springs 21. In this way, a torque is transmitted from the fixing plate 20 to the bushing 19 via the second springs 21. The circular ends of the spring receptacles 90 support the circular ends of the second springs 21 from the first axial side. The circular end faces of the second springs 21 are also supported by supporting parts 77. Thus, the second springs 21 have a large connecting margin at both circular ends. In other words, a larger area of the circular ends of the second springs 21 is supported at both circular ends. This arrangement is made possible by disposing the second springs 21 at a location axially offset from the conventional location, which is between the hub and the hub flange. Consequently, a spring sheet is not needed anymore, resulting in the reduced number of parts.

The cut-and-lift parts 76 are disposed so as to support the second axial side of the second springs 21. Thus, the outer circumferential side and the second axial side of the second springs 21 are supported by the fixing plate 20.

Figure 16:
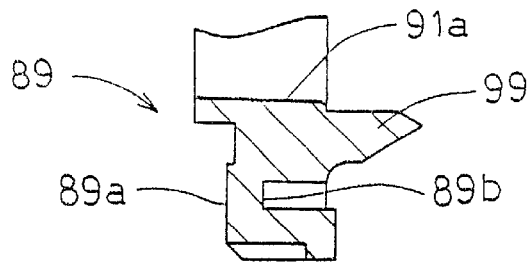
FIG. 16 is an enlarged, partial cross sectional view of a part the bushing illustrated in FIGS. 12–15 as viewed along section line XVI—XVI of FIG. 17.
Figure 17:
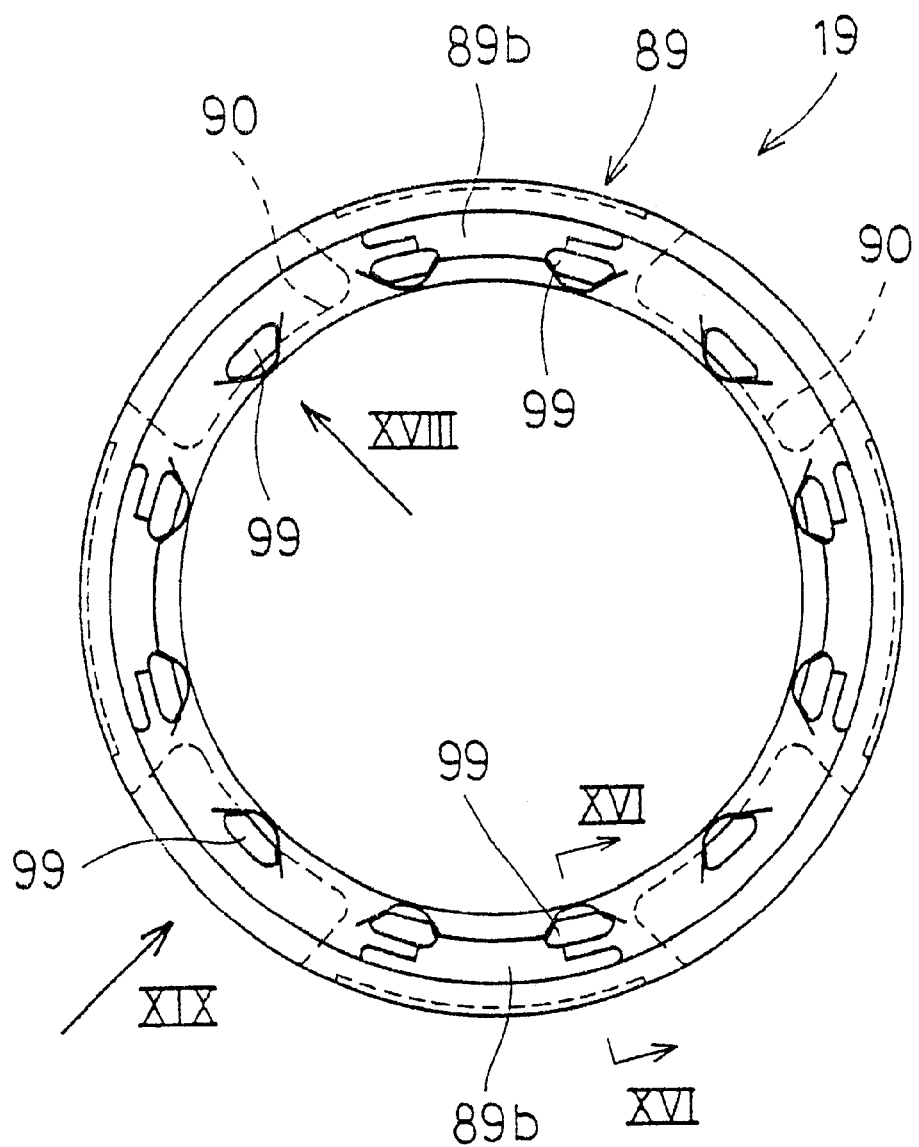
FIG. 17 is a back side elevational view of the bushing illustrated in FIGS. 12–16 for use with the clutch or dampening disk assembly illustrated in FIG. 1 in accordance with the present invention.
Figure 18:
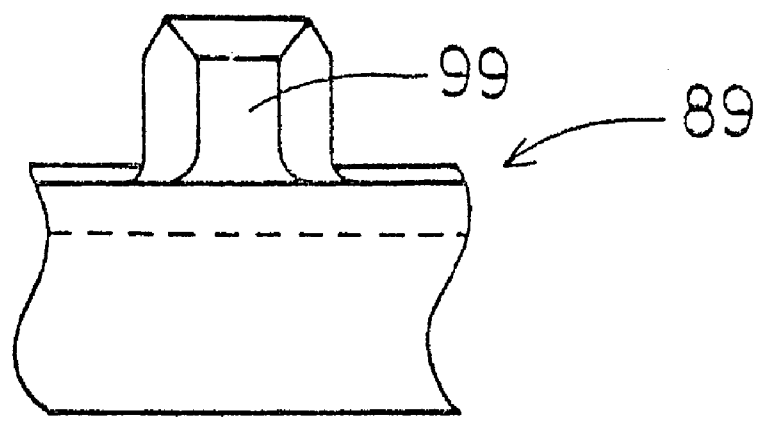
FIG. 18 is an enlarged, partial cross sectional view of a part the bushing illustrated in FIGS. 12–17 as viewed along an arrow XVIII of FIG. 17.
Figure 19:
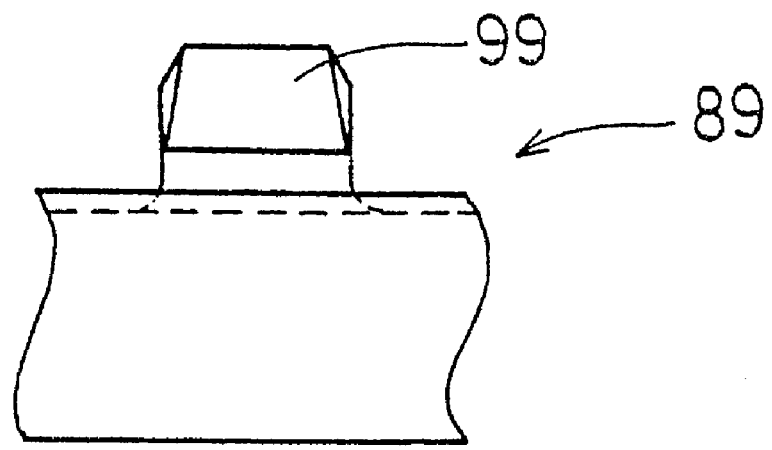
FIG. 19 is an enlarged, partial cross sectional view of a part the bushing illustrated in FIGS. 12–18 as viewed along an arrow XIX in FIG. 17.

As seen in FIGS. 4, 16 and 17, several connecting parts 99 are formed at the bushing 19 that extend from the annular portion 89 toward the first axial side. The connecting parts 99 are projections that extend toward the first axial side for transmitting a torque from the bushing 19 to the hub 3. The connecting parts 99 have a shape that fits into gaps between the external teeth 65. The connecting parts 99 are inserted between the external teeth 65 of the hub 3. Thus, the connecting parts 99 are connected with the external teeth 65 in a relatively unrotatable manner.

A second cone spring 78 is an urging portion in the second friction mechanism 10 which urges the second disk-shaped portion 73 and the annular portion 89 towards each other in an axial direction. The second cone spring 78 is disposed axially between the bushing 19 and the external teeth 65 of the hub 3, and between the bushing 19 and the internal teeth 61 of the flange 18. The inner circumference of the second cone spring 78 is supported by the flange 64 of the hub 3, while the outer circumference of the second cone spring 78 touches the annular portion 89 of the bushing 19. The second cone spring 78 is compressed in the axial direction, and urges the bushing 19 toward the second axial side. As the result, the second axial side face 89a of the annular portion 89 of the bushing 19 and the first axial side face of the second disk-shaped portion 73 of the fixing plate 20 are urged axially towards each other by a predetermined force. The second cone spring 78 has smaller inner and outer diameters than those of the first cone spring 49. The second cone spring 78 is also much thinner than the first cone spring 49. Thus, an urging force of the second cone spring 78 is much smaller than that of the first cone spring 49. The second cone spring 78 has a plurality of cutouts formed at an inner circumferential edge thereof. In other words, the cutouts of the second cone spring 78 form a plurality of projections at the inner circumferential edge of the second cone spring 78. The connecting parts 99 mentioned above extend within the cutouts of the cone spring 78.

As described above, the fixing plate 20 functions as an input member of the second friction mechanism 10 which engages the second springs 21 in the second dampening mechanism 6, and also as a member of the first large friction mechanism 8. Since the fixed plate 20 has multiple functions, the number of parts in the clutch disk assembly can be reduced. For instance, the fixed plate 20 also supports the second axial side of the second springs 21. The fixed plate 20 also functions as a friction surface both for the first large friction mechanism 8 and the second friction mechanism 10, where the first large friction mechanism 8 functions in a higher torsion angular range and the second small friction mechanism 10 functions in a lower torsion angular range. By using one member as friction surfaces of both of the friction mechanisms, it is easy to adjust and control frictional characteristics of the friction surfaces. More specifically, the sliding faces of the hub flange and the flange of the boss do not need to be controlled separately as has been the case in a conventional dampening mechanism. Particularly, since the fixing plate 20 is a small member having a simple structure, unlike the hub or the hub flange, it is easy to control the friction face of a fixed plate. Furthermore, since the aforementioned fixing plate 20 is made of a metal plate, it is easy to obtain a desired shape by a press working. Therefore, it is inexpensive to manufacture a fixing plate.

An advantage of the bushing 19 will now described. Since the bushing 19 is made of a resin, it is easy to obtain a bushing of a desired shape. Particularly, a resin-made bushing 19 can have connecting parts 99 formed integrally therewith, which makes it even easier to manufacture a bushing 19. Since the connecting parts 99 engage the external teeth 65 of the hub 3 in a circular direction, the connecting parts 99 do not need to have a special bore or concave for engaging the hub 3. Consequently, there is no need for an additional production process in manufacturing a hub 3. The bushing 19 operates as an output portion of the second dampening mechanism 6. The bushing 19 also functions as a member of the second friction mechanism 10 by engaging both circular ends of the second springs 21. Since, a single portion, namely the bushing 19, performs both torque transmission and friction generation, the clutch disk assembly needs fewer number of parts.

Figure 20:
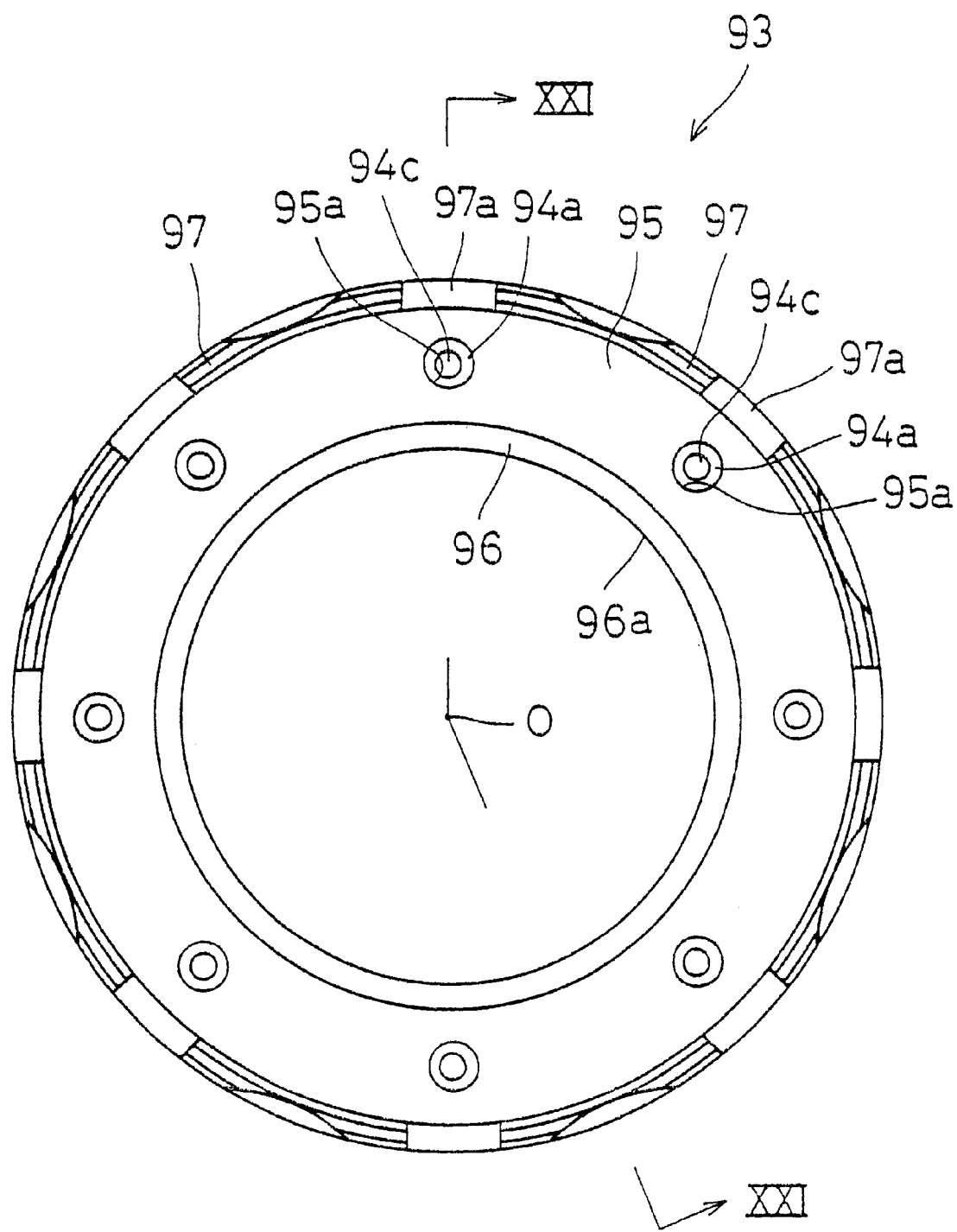
FIG. 20 is a front side elevational view of a friction bushing for use with the clutch or dampening disk assembly illustrated in FIGS. 1–5 in accordance with the present invention.
Figure 21:
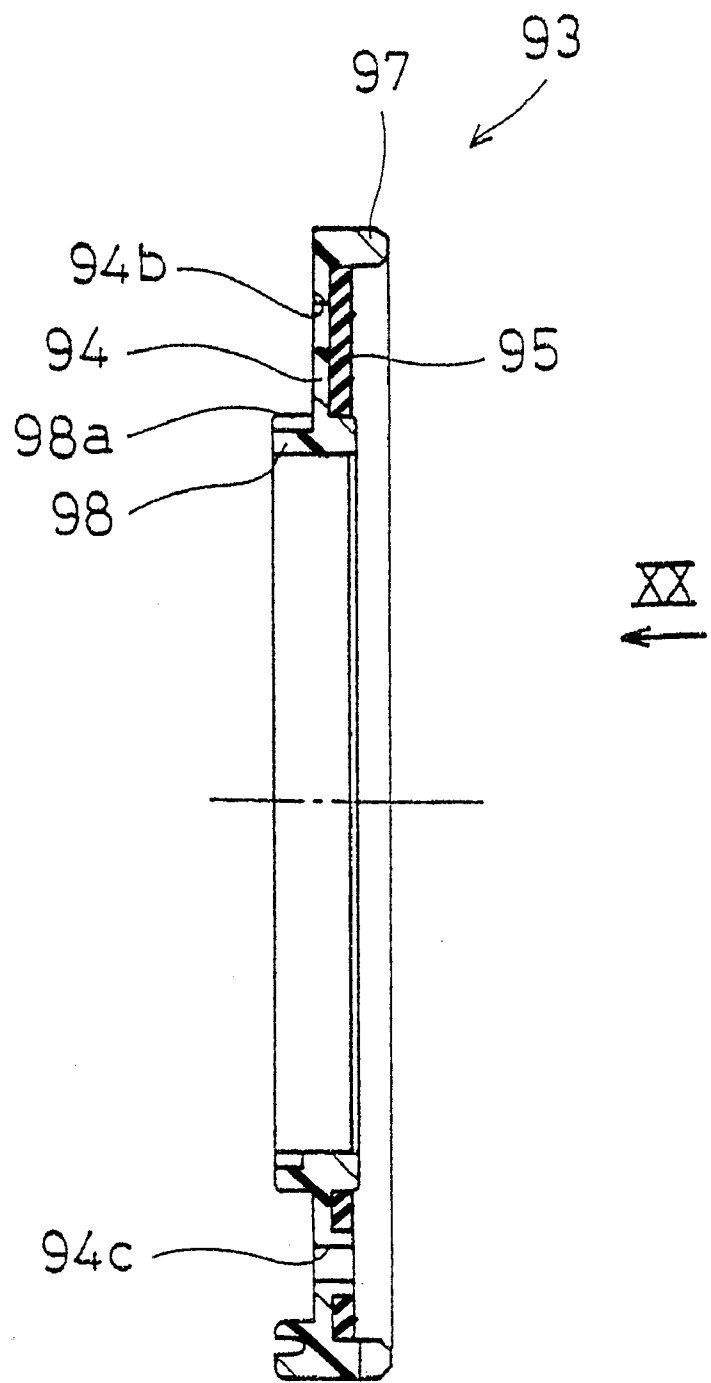
FIG. 21 is a cross sectional view of the friction bushing illustrated in FIG. 20 as viewed along section line XXI—XXI of FIG. 20.
Figure 22:
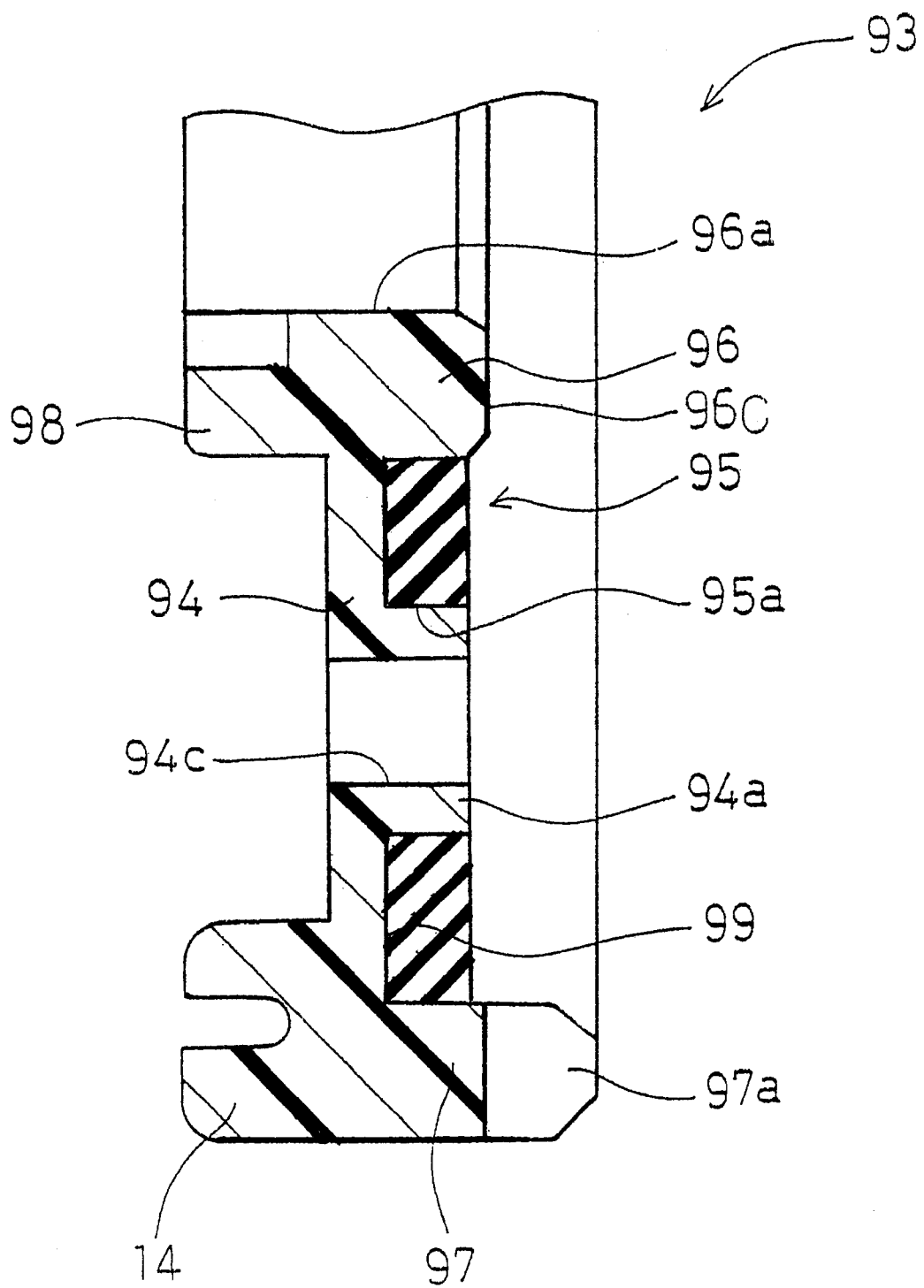
FIG. 22 is an enlarged, partial cross sectional view of a part the friction bushing illustrated in FIGS. 20 and 21.

Referring to FIGS. 3–5 and 20–22, a bushing 93 will now be described in more detail. The bushing 93 is disposed at the inner circumference of the clutch plate 31 and touches the outer circumferential face of the hub 3, the end face of the flange 64, the external teeth 65, the cylindrical portion 59 of the hub flange 18 and the internal teeth 61. Functions of the bushing 93 includes dampening vibrations in a rotary direction by generating a friction, determining radial position of the clutch plate 31 with respect to the hub 3, and determining radial position of the hub flange 18 with respect to the hub 3. The bushing 93, as shown in FIGS. 20–22, includes mainly an annular resin portion 94. The annular portion 94 is a disk-shaped portion having a predetermined width in a radial direction and a small thickness in an axial direction. The annular portion 94 is disposed axially between the inner circumference of the clutch plate 31 and that of the hub flange 18. An annular friction portion 95 is molded to, bonded to, or simply disposed on the second axial side of the annular portion 94. The friction portion 95 is a disk-shaped portion having an annular shape, a predetermined width in a radial direction and a small thickness in an axial direction. The friction portion 95 is made of a material with a high friction coefficient, for example, a rubber type material, a glass type mixed fiber spinning or impregnated compact or a ceramic. The friction portion 95 gives a characteristic of a high friction coefficient to the bushing 93. The magnitude of its friction of the friction portion 95 can be adjusted by selecting material having desired friction coefficient.

As shown in a plan view of FIG. 20, the inner and outer diameters of the annular portion 94 and the friction portion 95 are circular. The friction portion 95 is disposed so as to touch the second axial side face of the annular portion 94. In other words, the friction portion 95 is disposed within a channel formed on the second axial side of the annular portion 94. A cylindrical portion 96 is formed at the inner circumferential edge of the annular portion 94. The cylindrical portion 96 extends toward the second axial side. A cylindrical portion is formed at its outer circumferential edge of the annular portion 94. The cylindrical portion 97 extends toward the second axial side. An annular space surrounded by the cylindrical portions 96 and 97 forms a channel of the annular portion 94. An inner and outer diameters of the channel are circular. The friction portion 95 is disposed within the channel.

The cylindrical portion 96, i.e., the bushing 93, touches the side face of the flange 64 of the hub 3 on the first axial side as seen in FIG. 4. The second axial side surface 96c of the cylindrical portion 96 and the flange 64 slide against each other within the lower torsion angle range. The friction portion 95 touches the cylindrical portion 59 of the hub flange 18 and a first axial side end face of the internal teeth 61. The friction member 95 slides against the first axial side end face of the internal teeth 61 within the higher torsion angle range. There is a small gap secured between the friction portion 95 and the first axial side face of the external teeth 65 of the hub 3. The cylindrical portion 59 of the hub flange 18 and the first axial side end face of the internal teeth 61 touch only the friction portion 95 in the axial direction.

The friction portion 95 includes several holes 95a formed thereon side by side in a circular direction. Projections 94a of the annular portion 94 are inserted in the holes 95a. In this way, the annular portion 94 and the friction portion 95 do not rotate relative to each other. Particularly, since the friction portion 95 has a circular shape, it is important to prevent such rotation. A conventional friction portion has always had a problem regarding the strength. Even if a friction portion is adhered to a backboard made of SPCC, as long as the friction portion is circular, there is a possibility of a problem, such as a friction portion peeling off from the backboard. Therefore in the prior arts, the relative rotation has been prevented by using a friction portion having a square shape. The friction portion 95 in accordance with the present invention has a simple structure with a circular shape, while avoiding a problem such as peeling. It is also easy to manufacture the holes 95a of the friction portion 95 and the projections 94a of the annular resin portion 94, resulting in a reduction of a cost.

In the present embodiment, the friction portion 95 is not fixedly coupled to the annular portion 94. Therefore, the friction portion 95 can come off in the axial direction. Therefore, processes such as bonding the friction portion 95 are not necessary, although the friction portion 95 can be bonded to the annual portion 94.

The annular portion 94 has several bores 94b formed thereon side by side in the circular direction. The bores 94b extend in the axial direction. The bores 94b connect the first axial side and second axial side of the annular portion 94, such that portions of the first axial side face of the friction portion 95 are exposed through the bores 94. As seen in FIG. 3, the clutch plate 31 includes bores 13 formed at the inner circumference thereof. The bores 13 correspond to the bores 94b. The bores 13 have a diameter larger than that of the bores 94b, and expand beyond the circumference of the bores 94b. Thus, a part of the friction portion 95 is exposed to the outside of the clutch disk assembly 1 through the bores 94b and the bores 13, which are disposed at identical positions. Therefore, the friction portion 95 is cooled sufficiently. In other words, the friction portion 95 radiates a heat to an outer atmosphere on the clutch plate 31 side, whereby the friction characteristic does not change due to a friction heat of the friction portion 95. Moreover, the friction portion 95 increases its resistance against wear. In addition, bores 94c are formed on the projections 94a so as to extend in an axial direction and penetrate the projections 94a. The bores 94c connect the first and second axial sides of the annular portion 94. The bores 94b and 94c reduce the total volume of the bushing 93. As a result, the amount of resin used is reduced, and therefore cost of production is reduced.

The annular portion 94 has a cylindrical part 98 formed at the inner circumferential edge thereof. The cylindrical part 98 extends towards the first axial side. The inner circumferential faces of the cylindrical portions 96 and 98 touch the outer circumferential face of the boss 62. In this way, the clutch plate 31 and the retaining plate 32 are radially aligned (centered) relative to the hub 3.

The cylindrical portion 97 includes a plurality of cutouts 97a. The radially inner surface of the cylindrical portion 97 is in contact with the outer peripheral portion of the first axial side surface of the cylindrical portion 59. In this way, the cylindrical portion 97 of the bushing 93 radially aligns the hub 3, clutch plate 31, and the retaining plate 32 with respect to the hub flange 18.

The annular portion 94 includes a plurality of connecting parts 14 formed at the outer circumferential edge thereof. The connecting parts 14 extend toward the first axial side. The connecting parts 14 are formed side by side at equal intervals in the circular direction. The connecting parts 14 have nail like shapes, for engaging bores 15 formed on the clutch plate 31 as seen in FIG. 4.

Figure 23:
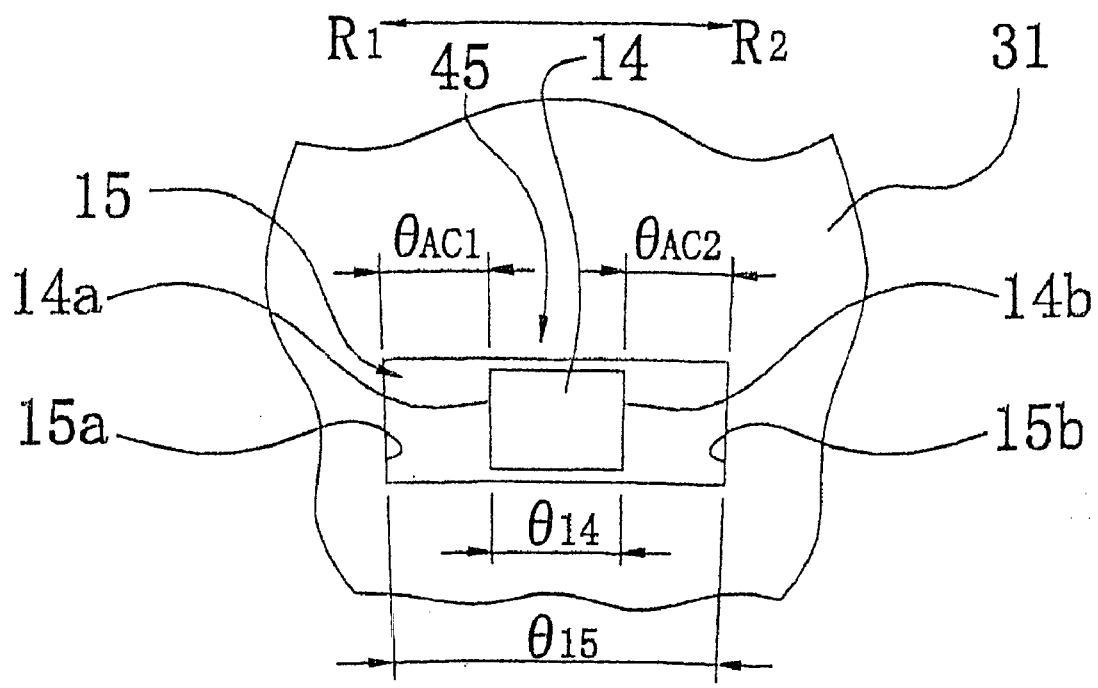
FIG. 23 is an enlarged, side elevational view of the clutch plate for the clutch or dampening disk assembly illustrated in FIGS. 1–5 for explaining a first gap mechanism.

Referring to FIG. 23, a first gap mechanism 45 will be now described. The first gap mechanism 45 is formed between the clutch plate 31 and the bushing 93, and includes the connecting parts 14 of the bushing and the bores 15 of the clutch plate 31. The connecting parts 14 and the bores 15 are in a relationship similar to the aforementioned relationship between the nails 75 and the cutouts 83. In other words, rotational angle $\theta_{14}$ of each connecting part 14 is smaller than the rotational angle $\theta_{15}$ of each bore 15. The difference between the rotational angle $\theta_{14}$ of connecting parts 14 and the rotational angle $\theta_{15}$ is the first gap mechanism 45, which forms a gap $\theta_{AC}$ (about 2–4 degrees). The first gap mechanism 45 is a rotational angular gap between the clutch plate 31 and the bushing 93. The first gap mechanism 45 also effectively forms a rotational angular gap between the first springs; 16 and the second springs 21. More specifically, the first gap mechanism 45 functions between the hub flange 18 and the input rotary body 2, in series with the first springs 16. The first gap mechanism 45 prevents the second large friction mechanism 39 from operating when the first springs 16 are compressed in the higher torsion angular range of torsion characteristics, and when torsion vibrations are within the rotational angular gap $\theta_{AC}$. In other words, the first gap mechanism 45 prevents a high hysteresis torque from being generated.

As shown in FIG. 23, a first end 14a of the connecting part 14 and a first end 15a form gap $\theta_{AC1}$, while a second end 14b of the connecting part 14 and a second end 15b form gap $\theta_{AC2}$. Gap $\theta_{AC}$ is a sum of gap $\theta_{AC1}$ and gap $\theta_{AC2}$.

Referring to FIGS. 20–22, the bushing 93 (friction washer) includes the cylindrical portion 96 and the friction portion 95. The cylindrical portion 96 includes an inner peripheral surface 96a and an end surface 96c. The inner peripheral surface 96a is supported by the outer peripheral surface of the boss 62 of the hub so as to allow a relative rotation therebetween. The end surface 96c forms a first friction surface that is adapted to frictionally slide against the hub 3 in the rotational direction. The friction portion 95 has a second friction surface that is adapted to frictionally slide against the hub 3 in the rotational direction. The second friction surface has a higher friction coefficient that the first friction surface. The bushing 93 has four functions. First, bushing 93 aligns the clutch plate 31 and the retaining plate 32 relative to the hub 3. Second, bushing 93 generates small friction in the lower torsion angular range. Third, bushing 93 generates large friction in the higher torsion angular range. Fourth, bushing 93 functions as the first gap mechanism 45 to prevent large friction from being generated in the higher torsion angular range when torsion vibrations are within the angular range of gap $\theta_{AC}$. Since the bushing 93 has multiple functions, the clutch disk assembly 1 needs fewer number of parts. Also, it becomes easier to assemble the clutch disk assembly 1.

Referring to a machine circuit in FIG. 7, each of the friction mechanisms in the damper mechanisms 4 will now be described. The second small friction mechanism 10 includes the second disk portion 73 and the annular portion 89. The second small friction mechanism 10 generates friction when the second springs 21 are compressed due to relative rotations between the bushing 19 and the fixed plate 20. The first small friction mechanism 38 includes the flange 64 and the cylindrical portion 96. The first small friction mechanism 38 generates friction when the hub and the bush 93 rotate relative to each other. The second large friction mechanism 39 includes the cylindrical portion 59 and the friction portion 95. The second large friction mechanism 39 generates friction when the hub flange 18 and the input rotary body 2 rotate relative to each other. The first large friction mechanism 8 includes the first disk portion 71 and the first friction washer 48. The first large friction mechanism 8 generates friction when the fixed plate 20 and the input rotary body 2 rotate relative to each other. The first and second large friction mechanisms can generate much larger friction (hysteresis torque) than the first and second small friction mechanisms.

The second small friction mechanism 10 generates friction only when the hub 3 rotates relative to the fixed plate 20 and the hub flange 18. Once the second stop mechanism 12 operates, the second small friction mechanism 10 no longer generates friction even though a larger torsion angle is transmitted. The first small friction mechanism 38 always generates friction when the hub flange 18 and the input rotary body 2 rotate relative to each other. The second large friction mechanism 39 generates friction when the hub flange 18 and the input rotary body 2 rotate relative to each other. The first large fiction mechanism 8 generates friction when the fixed plate 20 and the input rotary body 2 rotate relative to each other. When vibrations within the angular range of the gap $\theta_{AC}$ are transmitted in the higher torsion angular range, the second large friction mechanism 39 does not generate friction because of the first gap mechanism 45, and the first large friction mechanism 8 does not generate friction because of the second gap mechanism 46. In other words, each of the large friction mechanisms that generate friction in the higher torsion angular range has a gap mechanism. The clutch plate 31 and the retaining plate 32 both have its own large friction mechanism, each of which having a gap mechanism.

When the clutch disk 33 of the input rotary portion 2 is pressed against a flywheel (not shown in the Figures), a torque is inputted to the clutch disk assembly 1. The torque is then transmitted from the clutch plate 31 and the retaining plate 32 to the first springs 16, the hub flange 18, the spacers 80, the fixed plate 20, the second springs 21 and to the bushing 19 in this order. Finally, the torque is outputted from the hub 3 to the transmission shaft (not shown in the Figures).

When a torque fluctuation from an engine is inputted to the clutch disk assembly 1, torsion vibrations, in other words relative rotations occur between the input rotary portion 2 and the hub 3. As a result, the first springs 16, the springs 17 and the second springs 21 are compressed in the rotary direction.

Figure 24:
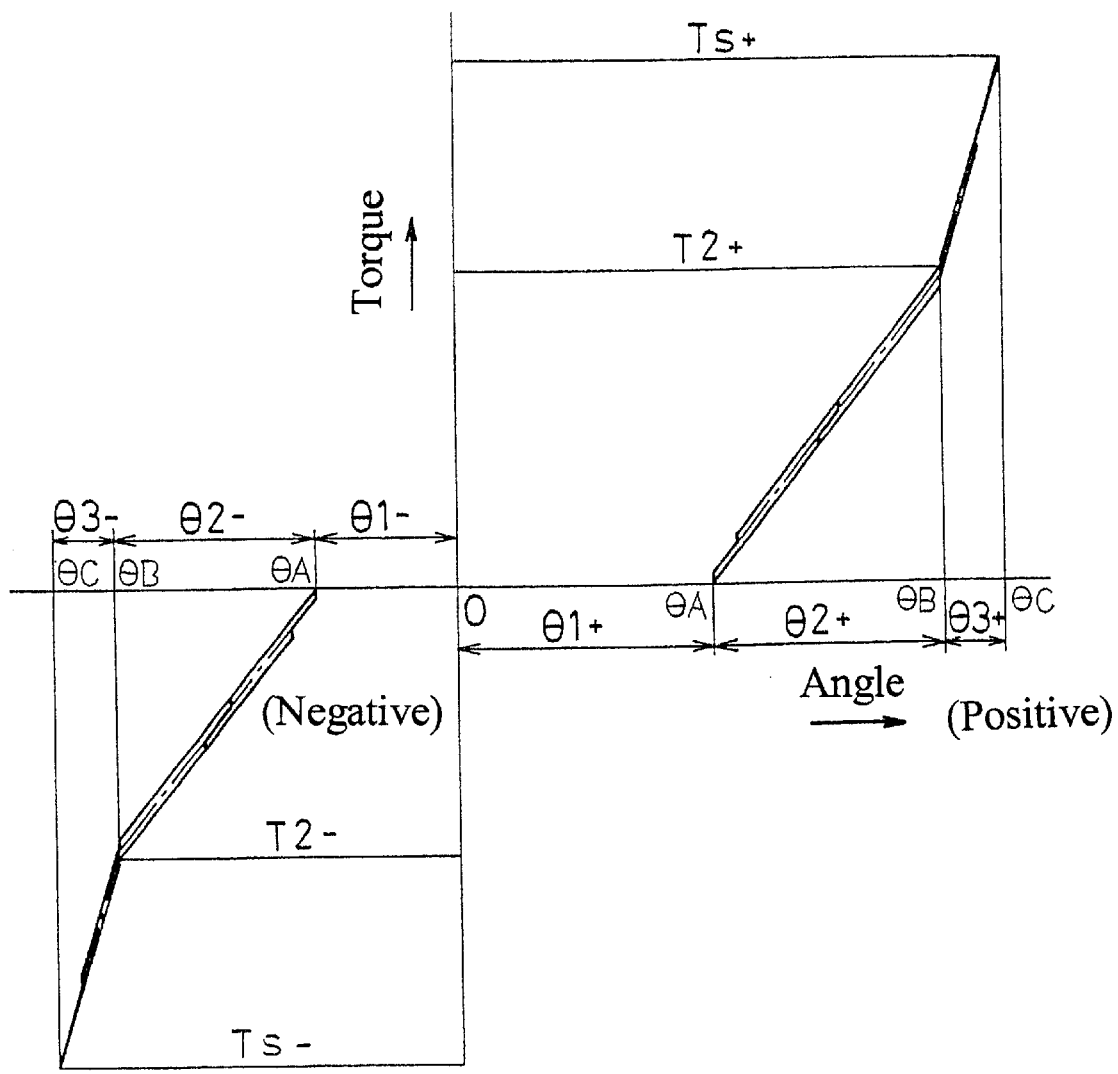
FIG. 24 shows a torsion characteristic curve of the clutch or damper disk assembly in accordance with the present invention.

Referring to a machine circuit in FIG. 7 and torsion characteristic curves in FIGS. 24 and 25, an operation of the clutch disk assembly 1 as a dampening mechanism will now be described in more detail. The torsion characteristic curves in FIGS. 24 and 25 the relationship between torsion angle and torsion torque when the hub 3 rotates relative to the input rotary body 2 from maximum torsion angle in one direction to the maximum torsion angle in the other direction, and rotates back to the maximum torsion angle in the first direction. In FIG. 24, the lower torsion angular range of the clutch disk assembly 1 is the first range between negative angle θA and the positive angle θA. The higher torsion angular range is the second and third ranges above angle θA.

As the hub 3 rotates relative to the input rotary body 2 in the $R_2$ direction, in other words as the input rotary body 2 rotates relative to the hub 3 in the $R_1$ direction, the second dampening mechanism 6 mainly operates within a torsion angular range up to $θ_1$. In other words, as the second springs 21 are compressed in the rotary direction. the second friction mechanism 10 and the first small friction mechanism 38 generate friction. Since the first friction mechanism 8 and the second friction mechanism 38 do not generate friction, the second damper mechanism 6 does not achieve the torsion characteristics of high hysteresis torque. In this way, the clutch disk assembly 1 achieves the torsion characteristics of low rigidity and low hysteresis torque.

When the torsion angle exceeds the torsion angle θA, the second stopper 12 stops a relative rotation between the hub 3 and the hub flange 18. In other words, the second dampening mechanism 6 does not operate when the torsion angle exceeds angle θA. Since the second springs 21 are not compressed beyond angle θA, the second springs 21 are less likely to break. As a result, it becomes easier to design second springs 21, because it is no longer necessary to consider the strengths of the second springs 21. The first dampening mechanism 5 operates in the higher torsion angular range. In other words, as the first springs 16 are compressed in the rotary direction between the hub flange 18 and the input rotary portion 2, the first large friction mechanism 8 and the second large friction mechanism 38 generate friction. As a result, the first damper mechanism 5 achieves a torsion characteristic of high rigidity and high hysteresis torque.

Figure 25:
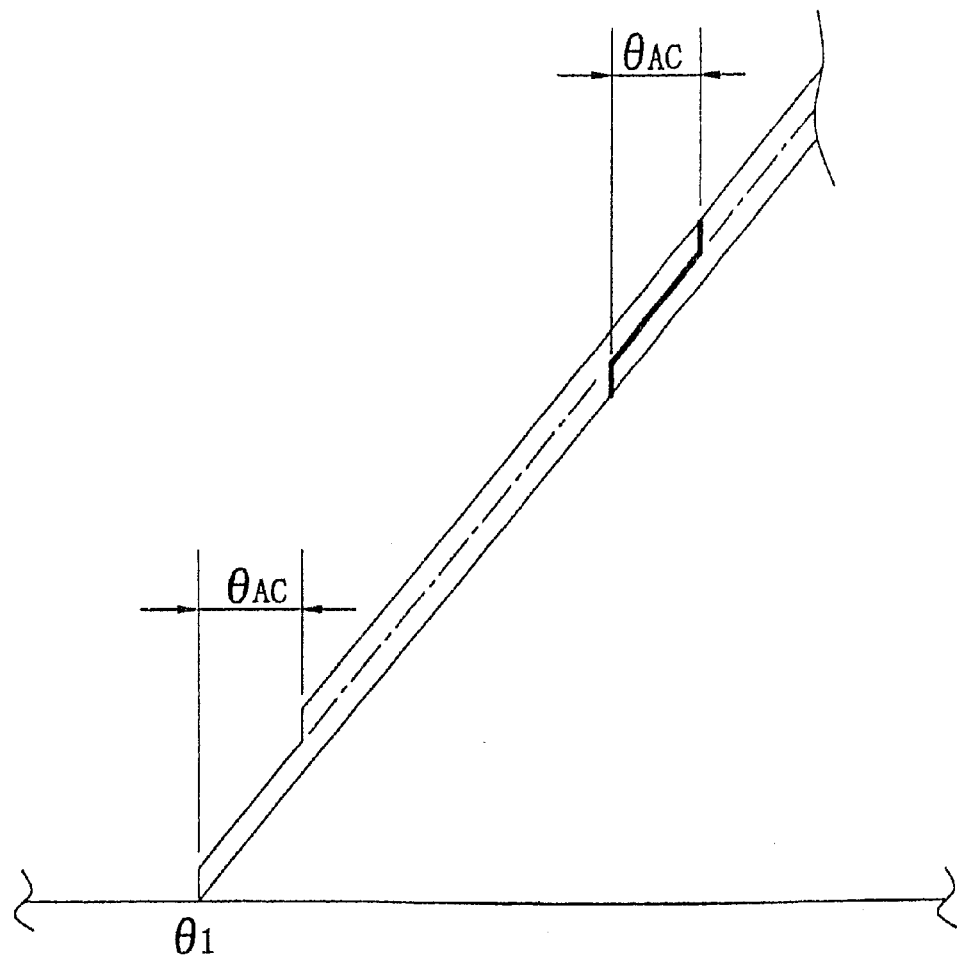
FIG. 25 is a partial enlarged section of the torsion characteristic curve illustrated in FIG. 24 for the clutch or dampening disk assembly in accordance with the present invention.

As the arrows in FIG. 25 indicate, in the torsion angular ranges gap $θ_{AC}$ beyond angle θA, the first gap mechanism 45 and the second gap mechanism 46 prevent the first large friction mechanism 8 and the second friction mechanism 38 from generating friction. In the torsion characteristic curve of FIG. 25, the hub 3 is already rotated in the $R_1$ direction relative to the input rotary body 2. Therefore at $θ_1$, the projections 75 are on $R_1$ ends of the cutouts 83, not in the middle of the cutouts 83 as shown in FIG. 6.

When the torsion angle exceeds angle θB ($θ_1+θ_2$), the circular ends of the springs 17 touch the second supporting part 37 of the second receptacle 36. In other words, in the second dampening mechanism 6, the first springs 16 and the springs 17 are compressed in parallel. As a result, the rigidity in the third torsion angular range is higher than that in the second torsion angular range. When the torsion angle reaches angle θC ($θ_1+θ_2+θ_3$), the first stopper 11 stops relative rotations between the input rotary portion 2 and the hub 3.

For instance, small vibrations from the engine combustion are transmitted to the clutch disk assembly 1 during normal driving. The hub 3 and the input rotary body 2 can rotate relative to each other in the higher torsion angular range within the gap $θ_{AC}$ (see arrows in FIG. 25) without making the first large friction mechanism 8 and the second large friction mechanism 39 generate friction. In other words, in the gap $θ_{AC}$ in the higher torsion angular range, only the first springs 16 function, and the first small friction mechanism 38 generates friction. As a result, small vibrations that cause rattling during driving are absorbed effectively.

Referring to FIG. 7, the first springs 16 repeat compression and extension while in a compressed state. It assumes here that the second stopper 12 is already stopping relative rotations between the hub 3 and the hub flange 18. The first springs 16 rotate the hub flange 18, but not the fixed plate 20 within gap $θ_{AC}$. Therefore, the first large friction mechanism 8 does not generate friction. Also since the bushing 93 rotates relative to the input rotary body 2 within gap $θ_{AC}$, the second large friction mechanism 39 does not generate friction either.

Similar characteristics are obtained in a negative side of a torsion angle, although a magnitude of each of the predetermined torsion angles ($θ_1$, $θ_2$, and $θ_3$) is different.

Second Embodiment

Figure 26:
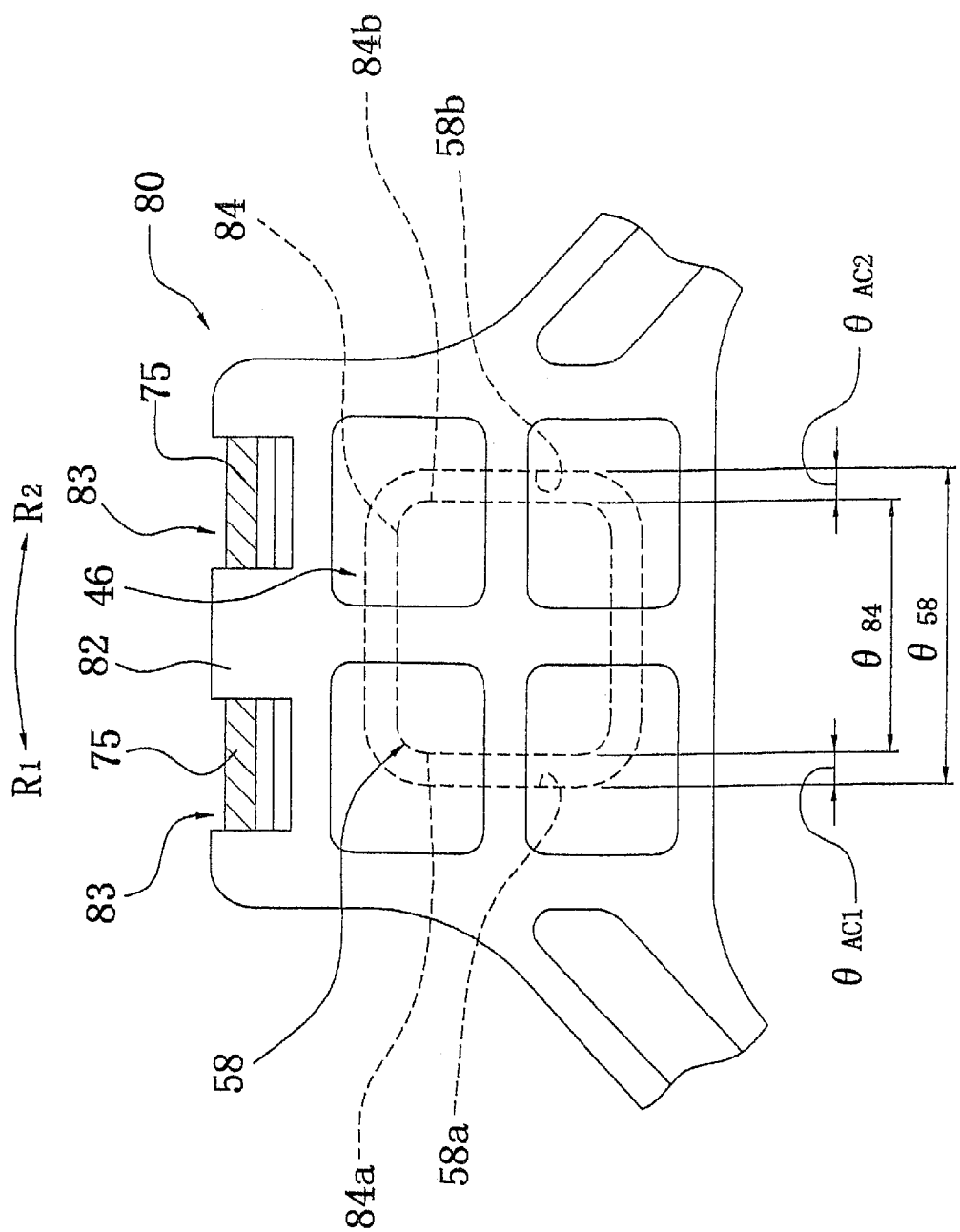
FIG. 26 is an enlarged, partial side elevational view of a spacer for explaining a gap mechanism in accordance with a second embodiment of the present invention.
Figure 27:
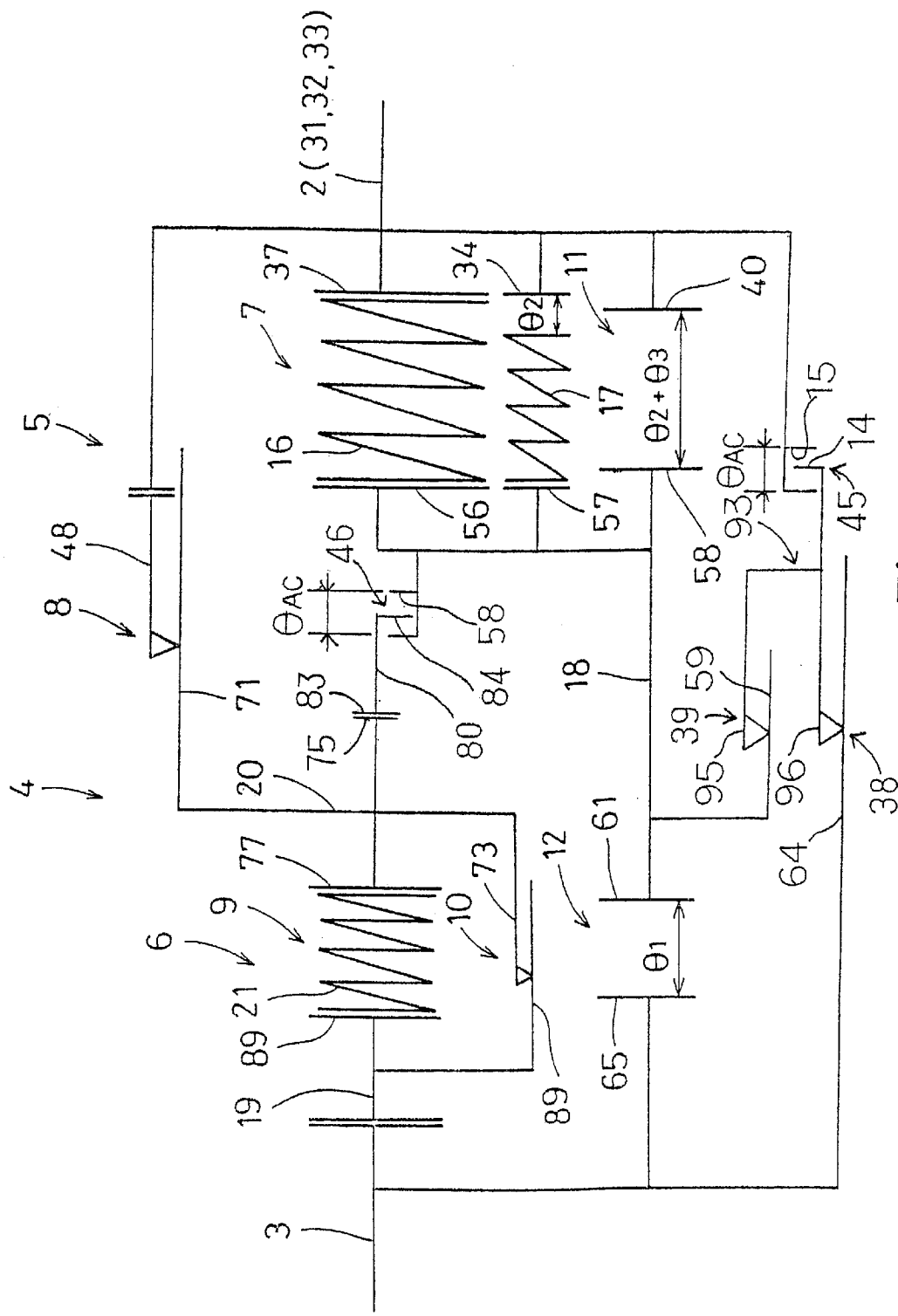
FIG. 27 is a diagrammatic machine circuit drawing of a dampening mechanism utilizing the clutch or dampening disk assembly in accordance with the second embodiment of the present invention.

Referring now to FIGS. 26 and 27, a modified clutch disk assembly is in accordance with the second embodiment of the present invention. This clutch disk assembly 1 of this embodiment has a similar structure as the aforementioned structure of the first embodiment, except for the position of the second gap mechanism 46. Accordingly, only differences from the first embodiment are described below in explaining this embodiment.

The second gap mechanism 46 prevents the first large mechanism 8 from generating friction when small vibrations are transmitted in the higher torsion angular range. As shown in FIG. 27, the second gap mechanism 46 is disposed on a torque transmission path between the spacer 80 and the hub flange 18. More specifically, referring to FIG. 26, the rotational angle $θ_{84}$ of the projection 84 of the spacer 80 is smaller than the rotational angle $θ_{58}$ of the bore 58 in the hub flange 18. The difference between these two rotational angles, the gap $θ_{AC}$, forms the second gap mechanism 46. The gap $θ_{AC}$ is about 2–4 degree. Referring to FIG. 26, the $R_1$ end 84a of each projection 84 and the $R_1$ end 58b of each bore 58 form a gap $θ_{AC1}$, whereas the $R_2$ end 84b of each projection 84 and the R1 end 58a of each bore 58 form a gap $θ_{AC2}$. Gap $θ_{AC}$ is equal to the sum of gap $θ_{AC1}$ and gap $θ_{AC2}$.

Third Embodiment

Figure 28:
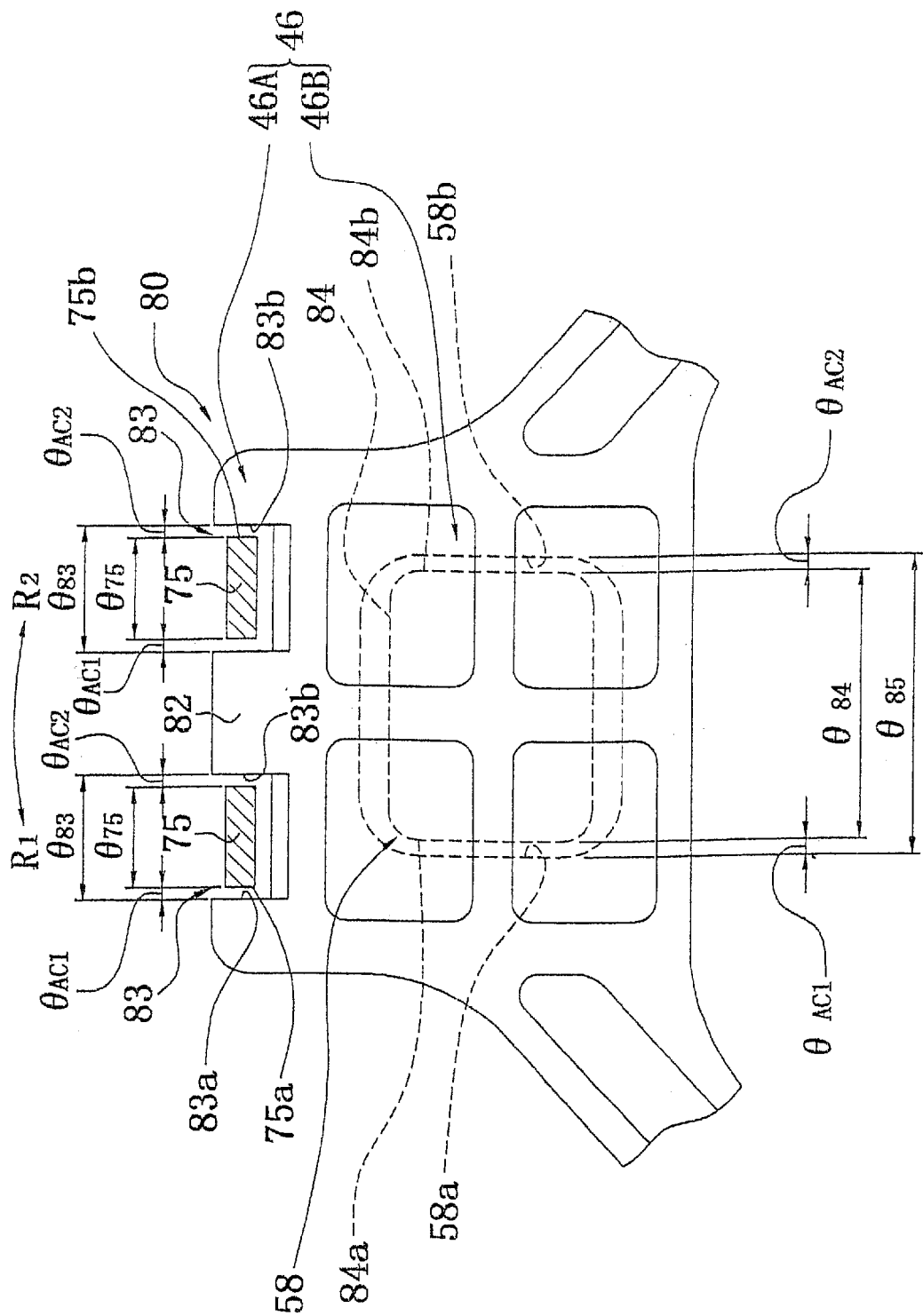
FIG. 28 is an enlarged, partial side elevational view of a spacer for explaining a gap mechanism in accordance with a third embodiment of the present invention.
Figure 29:
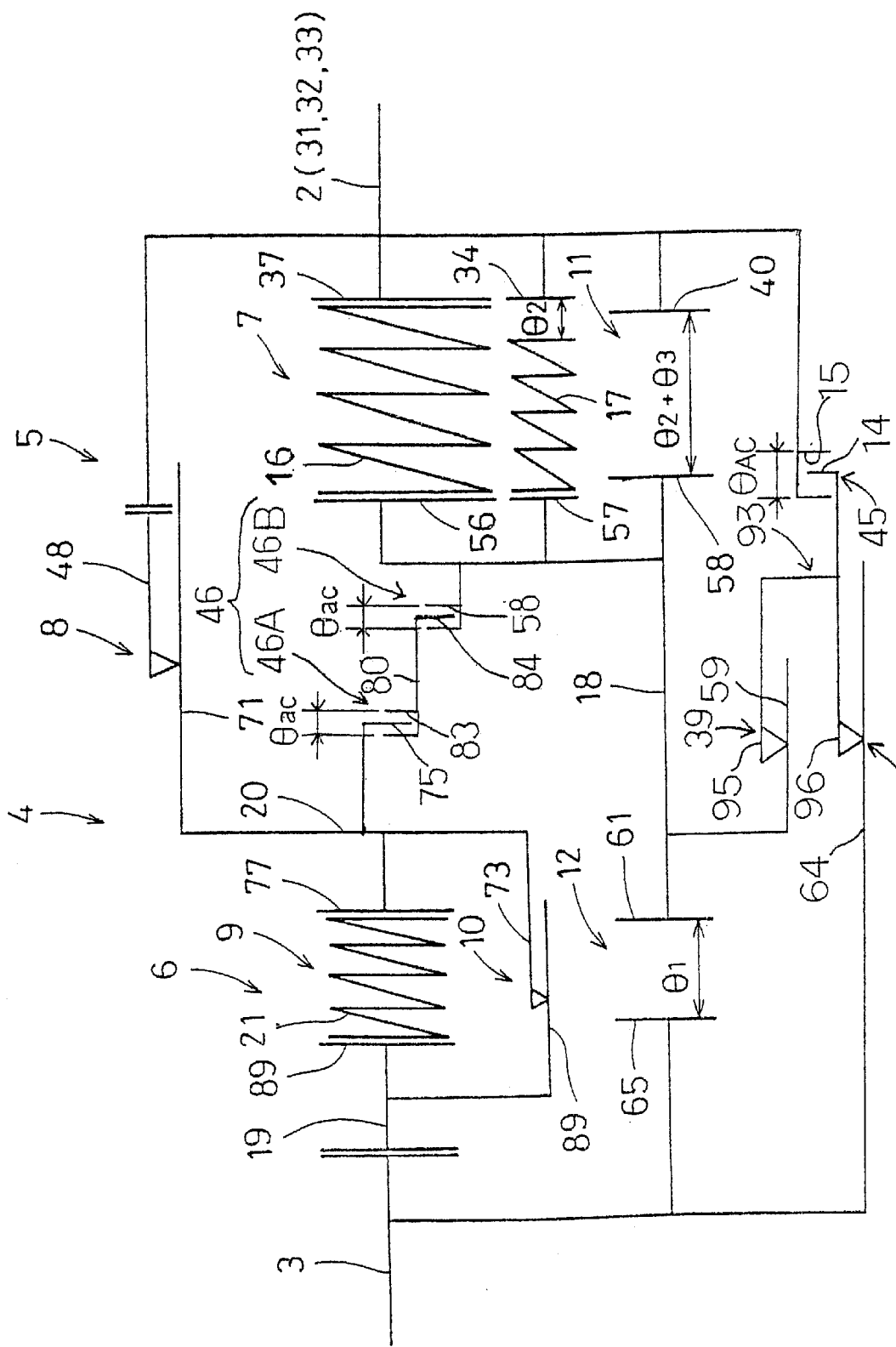
FIG. 29 is a diagrammatic machine circuit drawing of a dampening mechanism utilizing the clutch or dampening disk assembly in accordance with the third embodiment of the present invention.

Referring to FIGS. 28 and 29, a clutch disk assembly 1 according to the third embodiment will be described. The basic structure of the clutch disk assembly 1 is almost the same as the one in the first embodiment described above. They differ in the position of the second gap mechanism 46 which prevents the first large mechanism 8 from operating against small torsion vibration in the higher torsion angular range. As shown in FIGS. 28 and 29, the second gap mechanism 46 comprises a gap mechanism 46A which is disposed on a torque transmission path between the fixing plate 20 and the spacer 80, and a gap mechanism 46B which is disposed on a torque transmission path between the spacer 80 and the hub flange 18. In other words, two gap mechanisms are disposed on torque transmission paths between both rotational sides of the spacer 80 and other members, respectively, and the two gap mechanisms are arranged in series with respect to the entire damper mechanism 4.

As aforementioned, since the two gap mechanisms 46A and 46B are arranged in series, it becomes possible to more precisely control hysteresis torque as compared with the first and the second embodiments. Accordingly, the start of hysteresis torque can be smoothen.

The rotation angle $\theta_{75}$ of each of the nails 75 is smaller than the rotation angle $\theta_{83}$ of each of the cutout 83 by an angular gap $\theta_{ac}$. The angular gap $\theta_{ac}$ is a gap between the fixing plate 20 and the spacer 80 in the rotational direction. Referring to FIG. 28, a gap $\theta_{AC1}$ is secured between $R_1$ end 75a of each of the nails 75 and $R_1$ end 83a of the cutouts 83. Similarly, a gap $\theta_{AC2}$ is secured between $R_2$ end 75b of each of the nails 75 and R2 end 83b of the cutouts 83. The sum of gap $\theta_{AC1}$ and gap $\theta_{AC2}$ is equal to gap $\theta_{ac}$.

Within the torsion angular range of gap θac of the second gap mechanism 46, the spacer 80 slides against the fixing plate 20 and the hub flange 18 repeatedly. The friction generated, however, is not much since the spacer 80 is made of resin and the others are made of a metal.

Advantages of having the second gap mechanism 46 in an intermediate mechanism comprising the hub flange 18, the spacer 80 and the fixing plate 20 in the first, second and third embodiments will be described hereinafter. Unlike prior art, it is not necessary to provide the second gap mechanism between the first friction washer 48 and the retaining plate 32. Accordingly, the rotational connecting portions 87 contact the cutouts of the retaining plate 32 without any gap therebetween in the rotational direction. As a result, the first cone spring 49 does not rotate relatively against the retaining plate 32 when small torsion vibration is generated. Hence, different from the prior art, no friction is generated by the retaining plate 32.

The spacer 80 contacts the hub flange 18 in the axial direction. The fixing plate 20 is disposed between the spacer 80 and the first friction washer 48 in the axial direction. Both the spacer 80 and the fixing plate 20 are annular member having a predetermined width in the radius direction. Accordingly, the annular portion of the spacer 80 and that of the fixing plate 20 contact each other in the axial direction, and their contacting area is relatively large. Therefore, the spacer 80 and members on both sides of the spacer 80 in the axial direction bear relatively small stress, and, hence, abrasion of each member is not much when small torsion vibration is generated and the spacer 80 slides against the member.

Advantages of constituting the second gap mechanism 46 using the spacer 80 in the first, second and third embodiments will be described. The spacer 80 is an intermediate member disposed on a torque transmission path between the fixing plate 20 and the hub flange 18. Also, the spacer 80 is disposed between the fixing plate 20 and the hub flange in the axial direction. In the first, second and third embodiments, the second gap mechanism 46 is provided using the spacer 80. In the first embodiment, the second gap mechanism 46 is disposed on a torque transmission path between the spacer 80 and the fixing plate 20. In the second embodiment, the second gap mechanism 46 is disposed on a torque transmission path between the spacer 80 and the hub flange 18. In the third embodiment, the second gap mechanism 46 is disposed on a torque transmission path between the spacer 80 and the fixing plate 20, and between the spacer 80 and the hub flange 18. By changing the position of the second gap mechanism 46, the place where friction is generated when torsion vibration is caused within the range of gap $\theta_{AC}$ or gap θac is altered. Accordingly, the level of the friction generated is also altered. In the above-mentioned embodiments, since, for instance, the surface of the hub flange 18 is more coarse than that of the fixing plate 20, larger friction is generated against small torsion vibration in the second embodiment as compared with the first embodiment. In an alternative embodiment, the friction coefficient of the fixing plate 20 may be larger than that of the hub flange 18. Also, the friction coefficient on both sides of the spacer 80 with respect to the axial direction may be differed by, for instance, a coating treatment.

The position of the second gap mechanism 46 may be changed relatively easily according to the shape of the spacer 80. This is because the spacer 80 is made of resin and easily produced or processed. As a result, an appropriate level of hysteresis torque is generated against small vibration of a vehicle in which the clutch disk assembly 1 is mounted, and sound or vibration is effectively absorbed or damped.

Factors such as shape, number, and members formed in relation to the nails, projections and cutouts comprising the second gap mechanism 46 are not limited to those described in the aforementioned embodiments.

Fourth Embodiment

Figure 30:
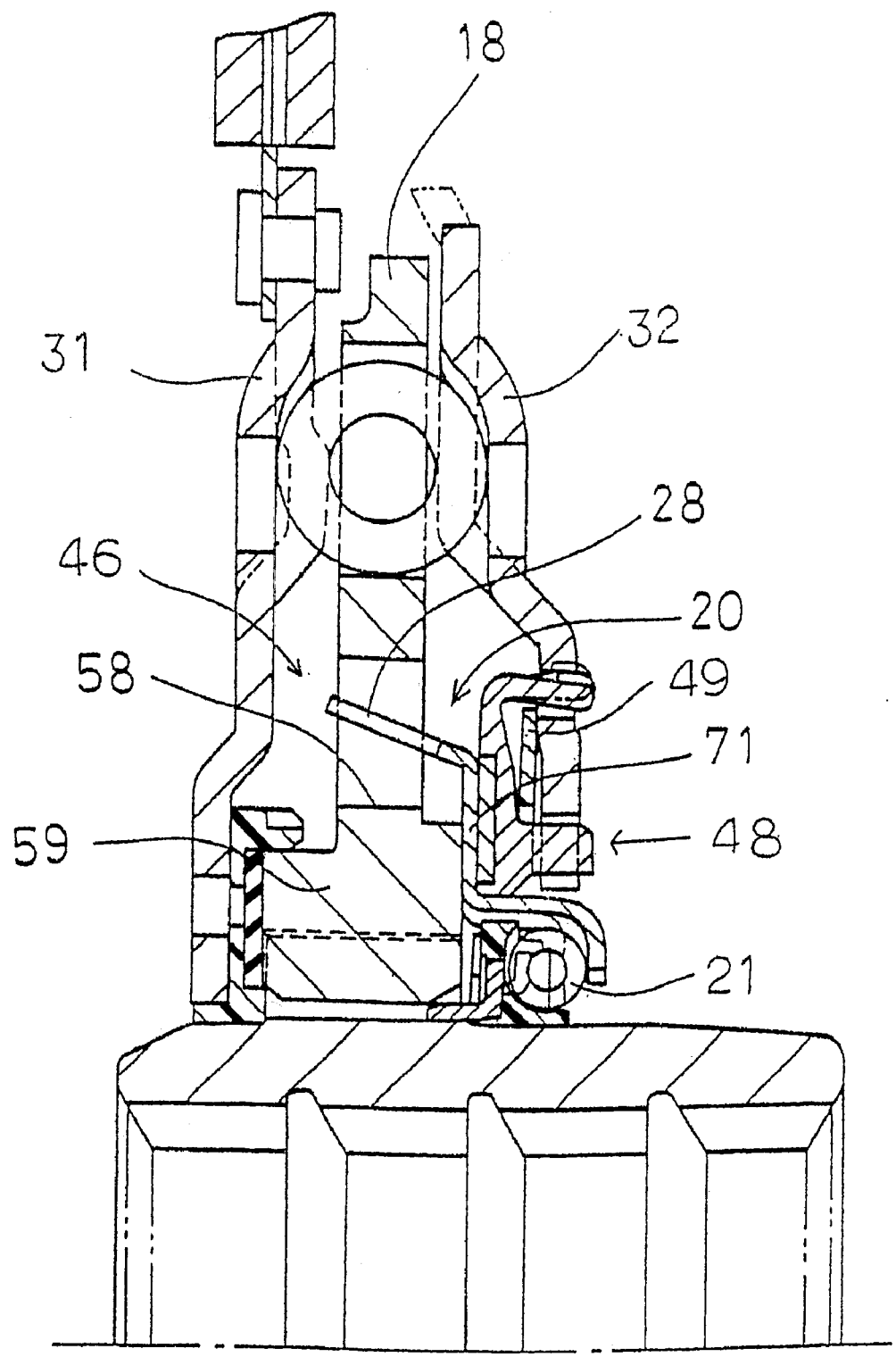
FIG. 30 is a partial cross sectional view, similar to FIG. 3, of a part of a clutch or dampening disk assembly in accordance with another embodiment of the present invention.
Figure 31:
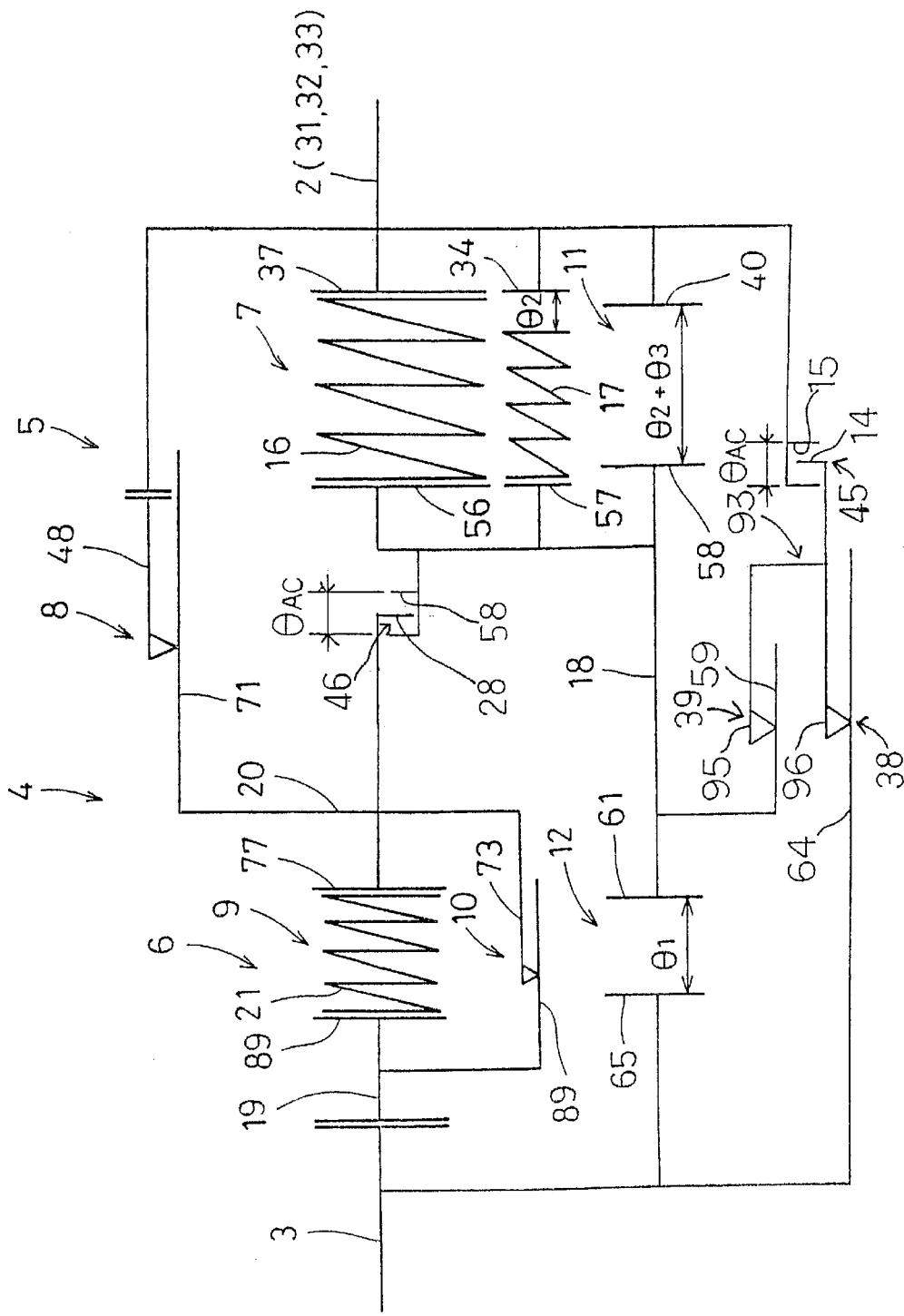
FIG. 31 is a diagrammatic machine circuit drawing of a dampening mechanism utilizing the clutch or dampening disk assembly in accordance with the fourth embodiment of the present invention.
Figure 32:
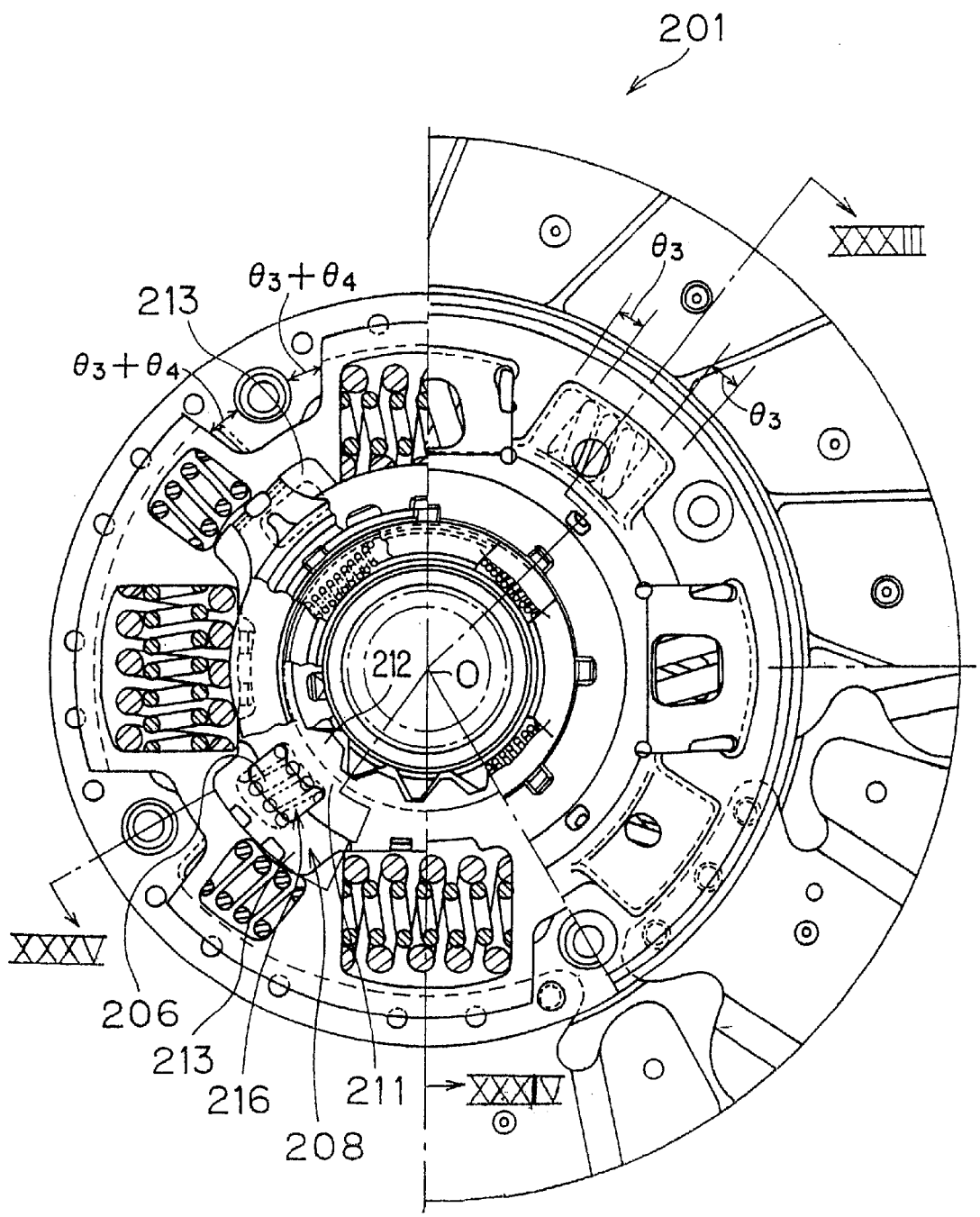
FIG. 32 is a plan view of a clutch or dampening disk assembly according to a fifth embodiment of the present invention.

Referring to FIGS. 30 and 31, the fourth embodiment according to the present invention will be described. As shown in FIG. 30, it is possible to directly couple the fixing plate 20 to the hub flange 18 without using the spacer described in the previous embodiments. The first disk-shaped portion 71 of the fixing plate 20 is directly supported by the cylindrical portion 59 of the hub flange 18. Also, a connecting nail 28 extends towards the bore 58 of the hub flange 18 from the circumference of the first disk-shaped portion 71. In this configuration, it is not necessary to use a spacer and the number of parts is reduced.

Referring to FIG. 31, the second gap mechanism 46 is disposed between the fixing plate 20 and the hub flange 18 in this embodiment. The effect of obtained by the second gap mechanism 46 is similar to those obtained in the first to third embodiments.

In this embodiment, since both of the bore 58 of the hub flange 18 and the connecting nail 28 of the fixing plate 20, which function as a stopper in the second gap mechanism 46, are made of metals, they are not significantly deformed under high temperature condition. Accordingly, the size of gap $\theta_{AC}$ of the second gap mechanism 46 is stabilized.

Fifth Embodiment

In the fifth embodiment of the present invention, as seen in FIGS. 32–46, the basic structure of a clutch disk assembly 201 shown in FIGS. 32 through 46 is similar to the one described in the first embodiment. Thus, features different from those of the first embodiment will be described in detail.

The clutch disk assembly 201 in the fifth embodiment has a fourth-step characteristic, and is different from the clutch disk assembly 1 in the first embodiment which has a third-step characteristic. More specifically, as shown in a machine circuit diagram of FIG. 45, sub-plates 207 and 208 and a spring 206 are disposed, instead of the spacer 80 used in the first embodiment, on a torque transmission path between the fixing plate 20 and the hub flange 18. Torque is input to the sub-plates 207 and 208 from the fixing plate 20. The spring 206 elastically couples the sub-plates 207 and 208 to the hub flange 18 in a rotational direction. Each of the sub-plates 207 and 208 may rotate relatively against the hub 3 in both rotational directions by angle $\theta_1$. Also, the hub flange 18 may rotate relatively against the hub 3 in both rotational directions by $\theta_1+\theta_2$. Here, $\theta_1+\theta_2$ responds to angle $\theta_1$ in the first embodiment. That is, a second-step characteristic in which the spring 206 functions is provided within the angle $\theta A$ (i.e., the lower torsion angular range) in the first embodiment.

Moreover, the machine circuit diagram is a diagram for explaining the relationship among each member in the rotational direction, and the members which operate together in the rotational direction may be considered as one member. More specifically, in the rotational direction, the hub 3 and the bushing 19 together constitutes a first rotary portion 250. The fixing plate 20 and the sub-plates 207 and 208 function as a first intermediate portion 251 which operates between the second spring 21 and the spring 206. The second small friction mechanism 10 is formed between the first intermediate portion 251 and the first rotary portion 250, and the first large friction mechanism 8 is formed between the first intermediate portion 251 and the input rotary body 2. Also, a friction mechanism 241 is formed between the first intermediate portion 251 and the hub flange 18. Moreover, a stopper mechanism having a gap angle $\theta_1$ is formed between the first intermediate portion 251 and the hub 3. The input rotary body 2 rotates together with the first friction washer 48 and the bushing 93 so as to form a second rotary body 252.

Figure 45:
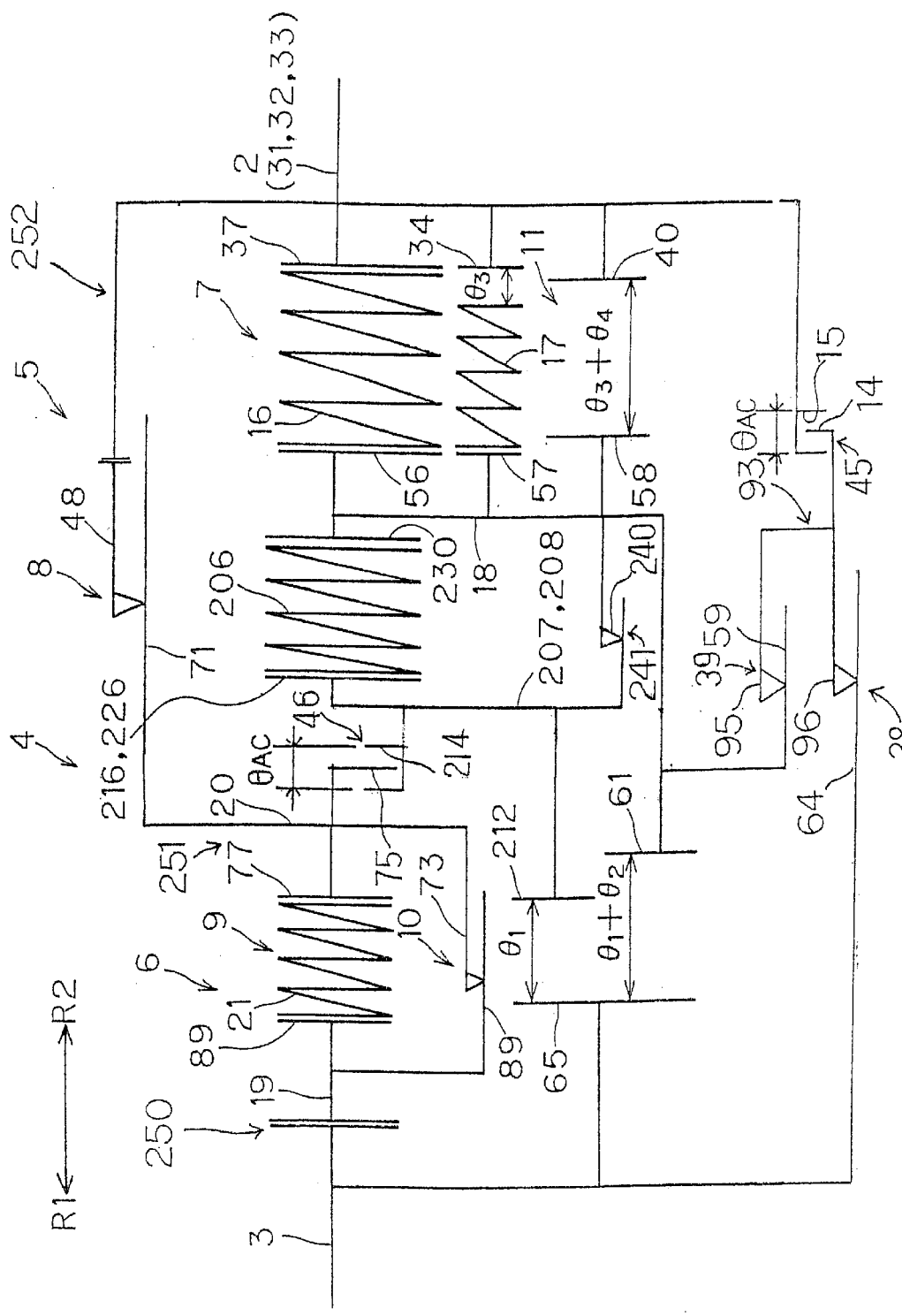
FIG. 45 is a diagrammatic machine circuit drawing of a clutch or dampening disk assembly in accordance with the present invention.

Referring to FIG. 45, the spring 206 functions as a spring or an elastic member which is compressed within the higher torsion angular range of the damper mechanism that realizes the fourth-step characteristic. The spring 206 is arranged in series with the second spring 21, which is compressed within the first-step range, and with the first spring 16 which is compressed within the third-step range. The spring 206 is coupled with the second spring 21 in the rotational direction via the fixing plate 20 and the first and the second sub-plates 207 and 208. The spring 206 is also coupled to the first spring 16 in the rotational direction via the hub flange 18. The rigidity of the spring 206 is significantly higher than that of the second spring 21 and, hence, the spring 206 is little compressed in the first-step range.

Although the rigidity of the spring 206 is lower than that of the first spring 16, the difference between them is not much. Accordingly, when the spring 206 is compressed to a certain degree, the spring 206 can generate torque exceeding the sum of the initial torque of the first spring 16 and the hysteresis torque (i.e., torque based on the resistant force which is generated at friction portions when a load is applied to the first spring 16 by the spring 206.)

The friction mechanism 241, on the other hand, is arranged in a line with the spring 206, and generates friction only when the spring 206 is actuated. Also, the friction mechanism 241 is arranged in series with the second friction mechanism 39 which is arranged in a line with the first spring 16.

The first sub-plate 207 is disposed on the engine side of the hub flange 18 and the second sub-plate 208 is disposed on the transmission side of the hub flange 18. The sub-plates 207 and 208 are coupled to each other so as to rotate together. As shown in FIG. 45, the sub-plates 207 and 208, together with the fixing plate 20, function as an intermediate member which couples the second spring 21 to the spring 206 in the rotational direction. Also, the second sub-plate 208 and internal teeth 212 constitute, together with the external teeth 65 of the hub 3, the aforementioned stopper mechanism. This stopper mechanism prevents the second spring 21 from being compressed if the torsion angular range exceeds angle $\theta A$.

Figure 38:
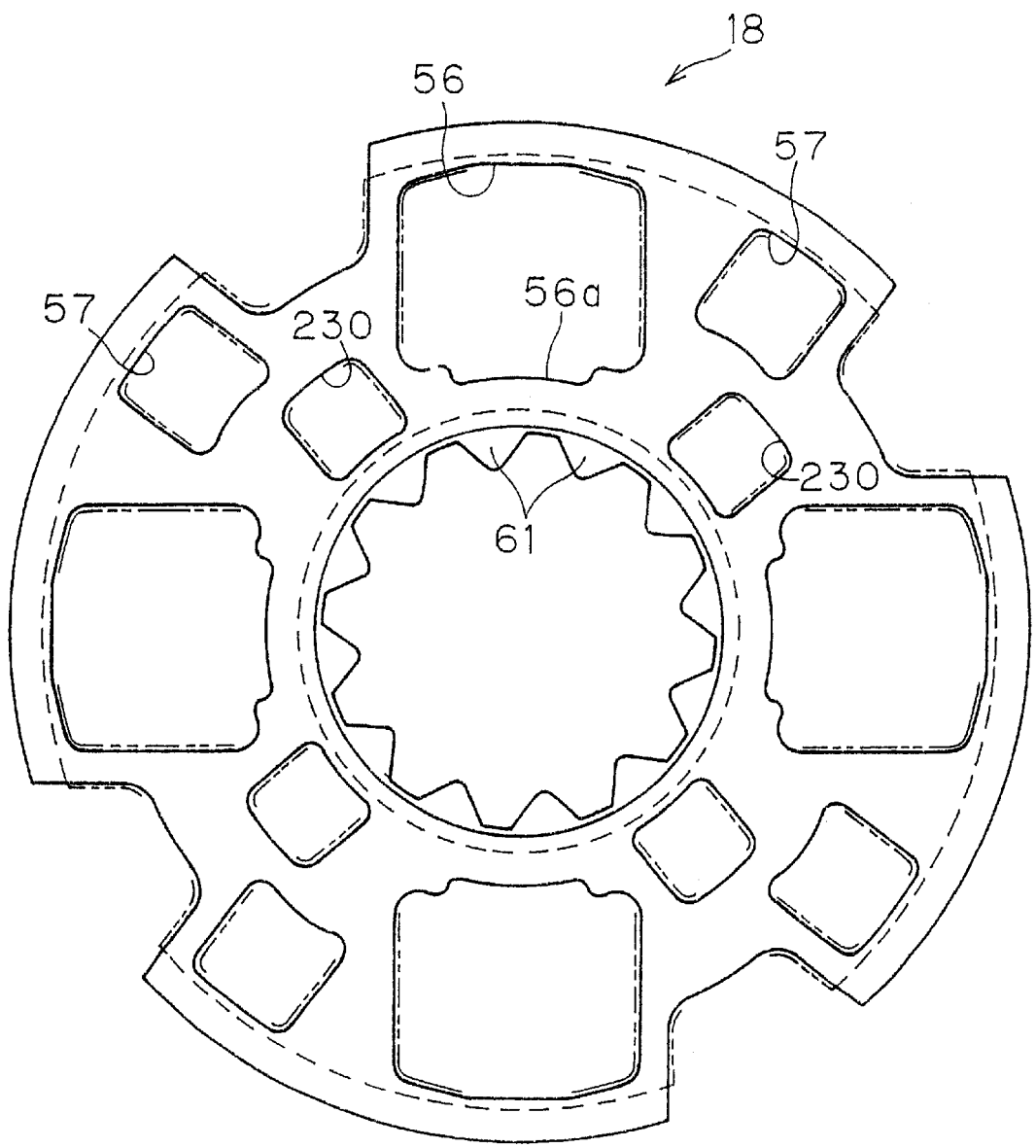
FIG. 38 is a side elevational view of a hub flange in accordance with the present invention.

Referring to FIG. 38, a plurality of third window bores 230 are formed in the hub flange 18. There are four third window bores 230 and they are arranged in equal distance from each other in the rotational direction. The length of the third window bore 230 in the radius direction or the rotational direction is shorter than that of the second window bore 56 or the first window bore 57. Also, each of the third window bore 230 is formed at the innermost of the hub flange 18. The spring 206 is disposed inside the third window bore 230. The spring 206 is a coiled spring and extends in the rotational direction. Each end of the spring 206 contacts or is in proximity to the respective end of the third window bore 230.

Figure 40:
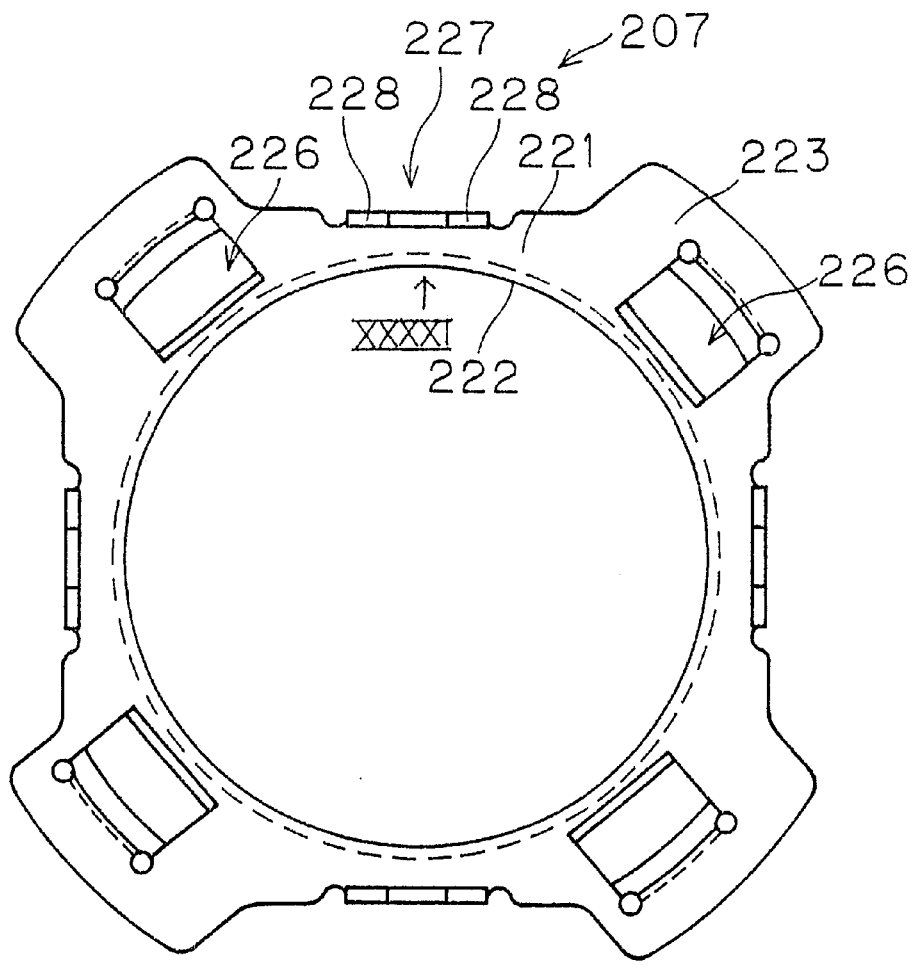
FIG. 40 is a plan view of a first sub plate in accordance with the present invention.

The first sub-plate 207 is disposed between the hub flange 18 and the clutch plate 31. As shown in FIG. 40, the first sub-plate 207 is a disk-shaped (or annular) member. More specifically, the first sub-plate 207 is a member made of a sheet metal. The first sub-plate 207 is mainly comprised of an annular portion 221. A cylindrical portion 222 is formed so as to project towards the engine side of the annular portion 221. The inner circumferential surface of the annular portion 221 contacts the outer circumferential surface of the cylindrical portion 59 so as to rotate relatively against the hub flange 18. That is, the position of the first sub-plate 207 in the radius direction with respect to the hub flange 18 is determined by the cylindrical portion 222. Also, the cylindrical portion 97 of the bushing 93 contacts the outer circumferential surface of the cylindrical portion 222.

A plurality of projections 223 are formed at the annular portion 221 of the first sub-plate 207 in equal distance from each other in the rotational direction. The projection 223 extends from the annular portion 221 in the radius direction. Each of the projections 223 is formed so as to correspond to the third window bores 230. There are cut-and-lift portions 226 formed at the annular portion 221 towards the projection 223. The cut-and-lift portions 226 support the both ends of the spring 206 in the rotational direction and in the radium direction and one end (engine side) of the spring 206 in the axial direction. Also, a part of the cut-and-lift portion 226 contacts the clutch plate 31 from the transmission side.

Figure 41:
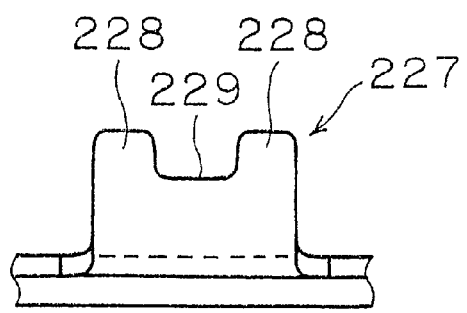
FIG. 41 is a partial edge elevational view of a first sub plate as viewed along an arrow XXXXI of FIG. 40.

Referring to FIG. 40, a plurality of lugs 227 are formed between each of the projections 223 on the outer circumference of the annular portion 221. Each of the lugs 227 is bent from the outer circumference of the annular portion 221 and extends towards the axial direction (the transmission side.) As shown in FIG. 41, two nails 228 extend in the axial direction are formed at the lug 227 on both sides in the rotational direction. It can be said that a cutout 229 is formed at the end of the lug 227 by the two nails 228.

The lugs 227 are plate-shaped portions which are formed together with the annular portion 221 of the first sub-plate 207. Thus, the thickness of the lug 227 is equal to that of the annular portion 221. Both sides of the lug 227 face the radius direction.

Next, the second sub-plate 208 of the present invention will be described. The second sub-plate 208 is a disk-shaped (or annular) member which is disposed between the hub flange 18 and the retaining plate 32. More specifically, the second sub-plate 208 is disposed in the axial direction between the hub flange 18 and the fixing plate 20. Similar to the first sub-plate 207, the second sub-plate 208 is made of a metal sheet. Although the outer diameter of the second sub-plate 208 is almost the same as that of the first sub-plate 207, the inner diameter of the second sub-plate 208 is smaller than that of the first sub-plate 207. That is, the inner circumferential portion of the second sub-plate 208 extends more to the inner circumferential side as compared with the first sub-plate 207.

Figure 39:
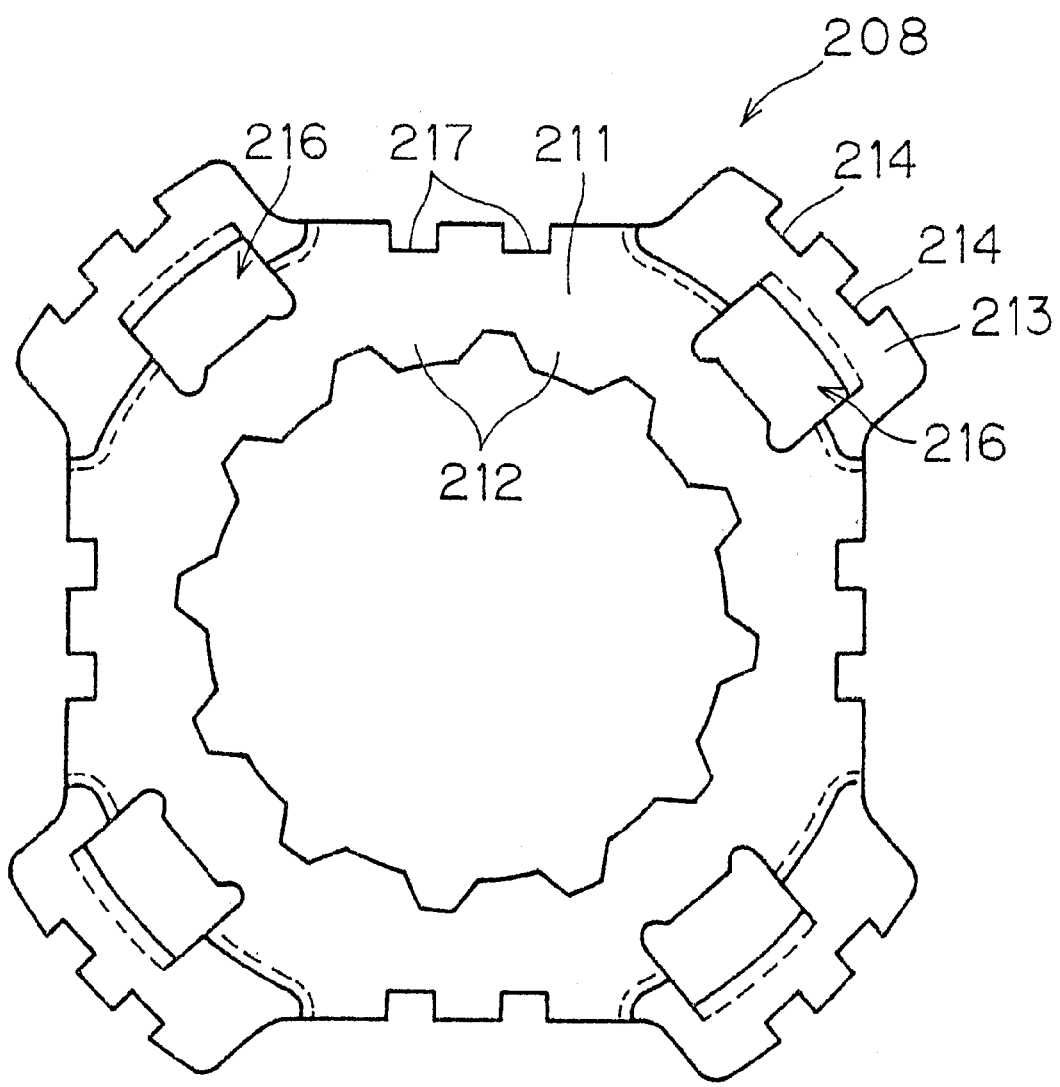
FIG. 39 is a side elevational view of a second sub plate in accordance with the present invention.
Figure 42:
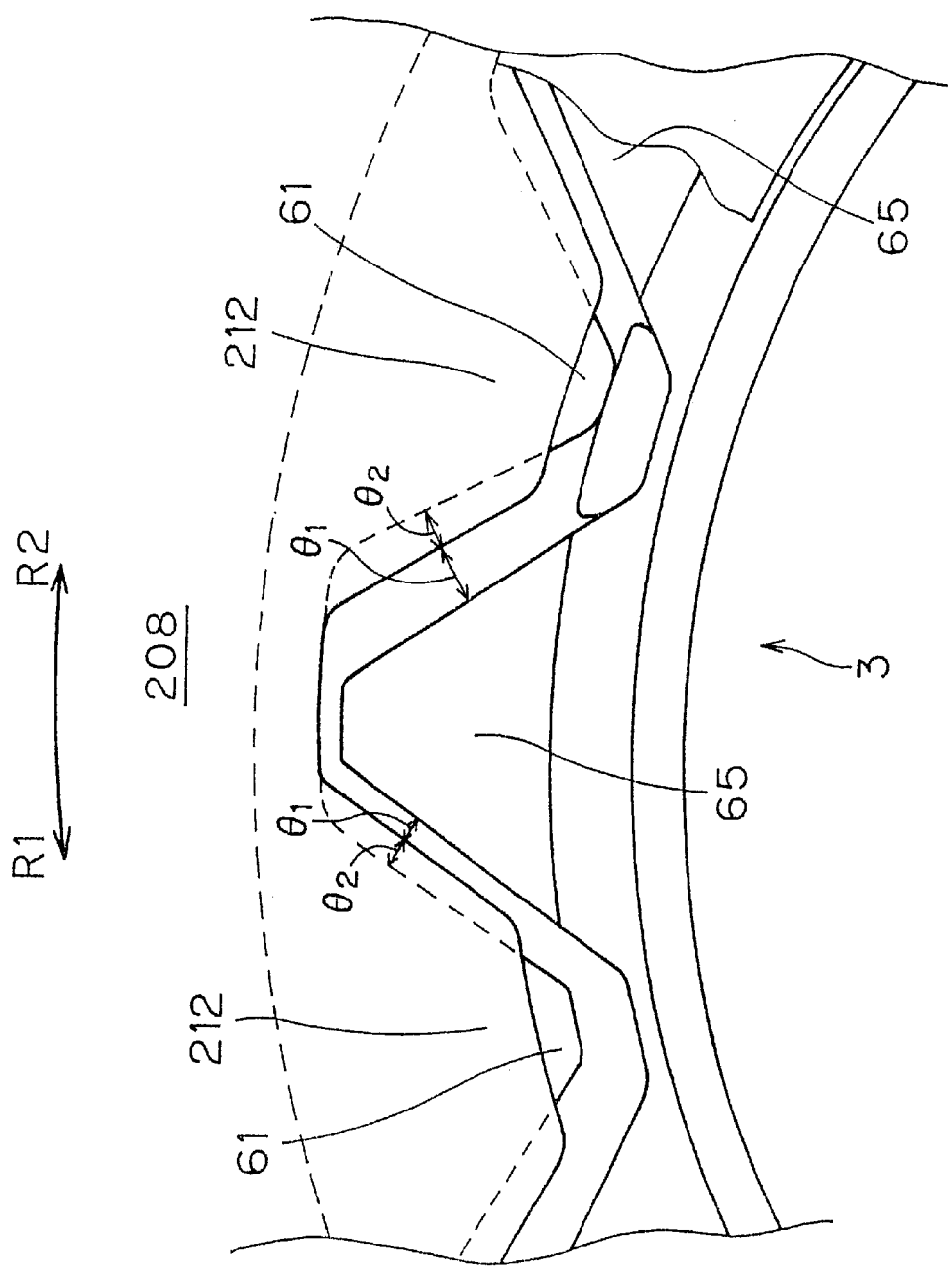
FIG. 42 is a partial side elevational view of second sub plate and hub to show an engagement therebetween.

As shown in FIG. 39, the second sub-plate 208 is mainly comprised of an annular portion 211. A plurality of internal teeth 212 which extend in the radius direction are formed on the inner circumferential edge of the annular portion 211. The internal teeth 212 are arranged so as to correspond to the internal teeth 61 of the hub flange 18 in the axial direction. The length of the internal teeth 212 in the rotational direction is longer than that of the internal teeth 61. As shown in FIG. 42, both ends of the internal teeth 212 in the rotational direction are arranged to be outside, in the radius direction, of both ends of the internal teeth 61. Similar to the internal teeth 61, the internal teeth 212 are disposed between the external teeth 65 in the rotational direction. A gap of $\theta_1$, is secured between both ends of the external teeth 65 and the internal teeth 212 in the rotational direction. Also, a gap of $\theta_1 + \theta_2$ is secured between both ends of the external teeth 65 and the end surface of the internal teeth 61 in the rotational direction.

A plurality of projections 213, each of which extends in the radius direction, are formed on the annular portion 211. These projections 213 are arranged in equal distance between each other in the rotational direction. Each of the projections 213 corresponds to the respective third window bore 230. A window portion 216 is formed on a portion corresponds to the respective projection 213. There is a through-hole in the window portion 216 in the axial direction and supports both ends of the spring 206 in the rotational direction and in the radius direction and one end (transmission side) of the spring 206 in the axial direction. First engage portions 214 are formed at the outer circumferential edge in the radius direction of each of the projections 213. As shown in FIG. 39, the first engage portions 214 are two cutout portions. The nails 75 of the fixing plate 20 engage with the first engage portions 214. In this manner, the second sub-plate 208 rotates together with the fixing plate 20. The nails 75 may be moved a predetermined distance in the radius direction with respect to the first engage portions 214. Also, the nails 75 are movable in the axial direction with respect to the first engage portions 214.

Figure 33:
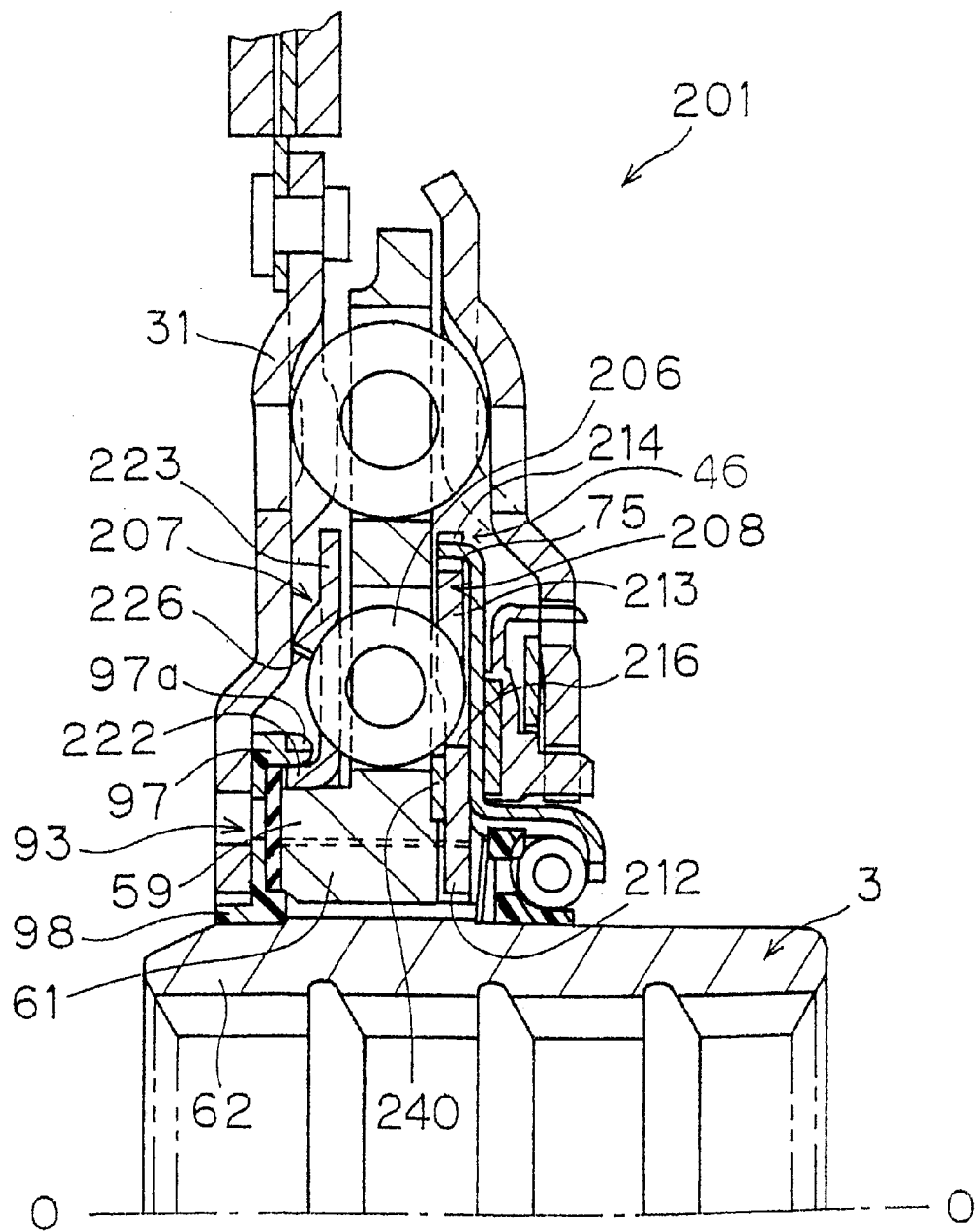
FIG. 33 is a cross sectional view of a clutch or dampening disk assembly as viewed along section line XXXIII-O of FIG. 32.
Figure 34:
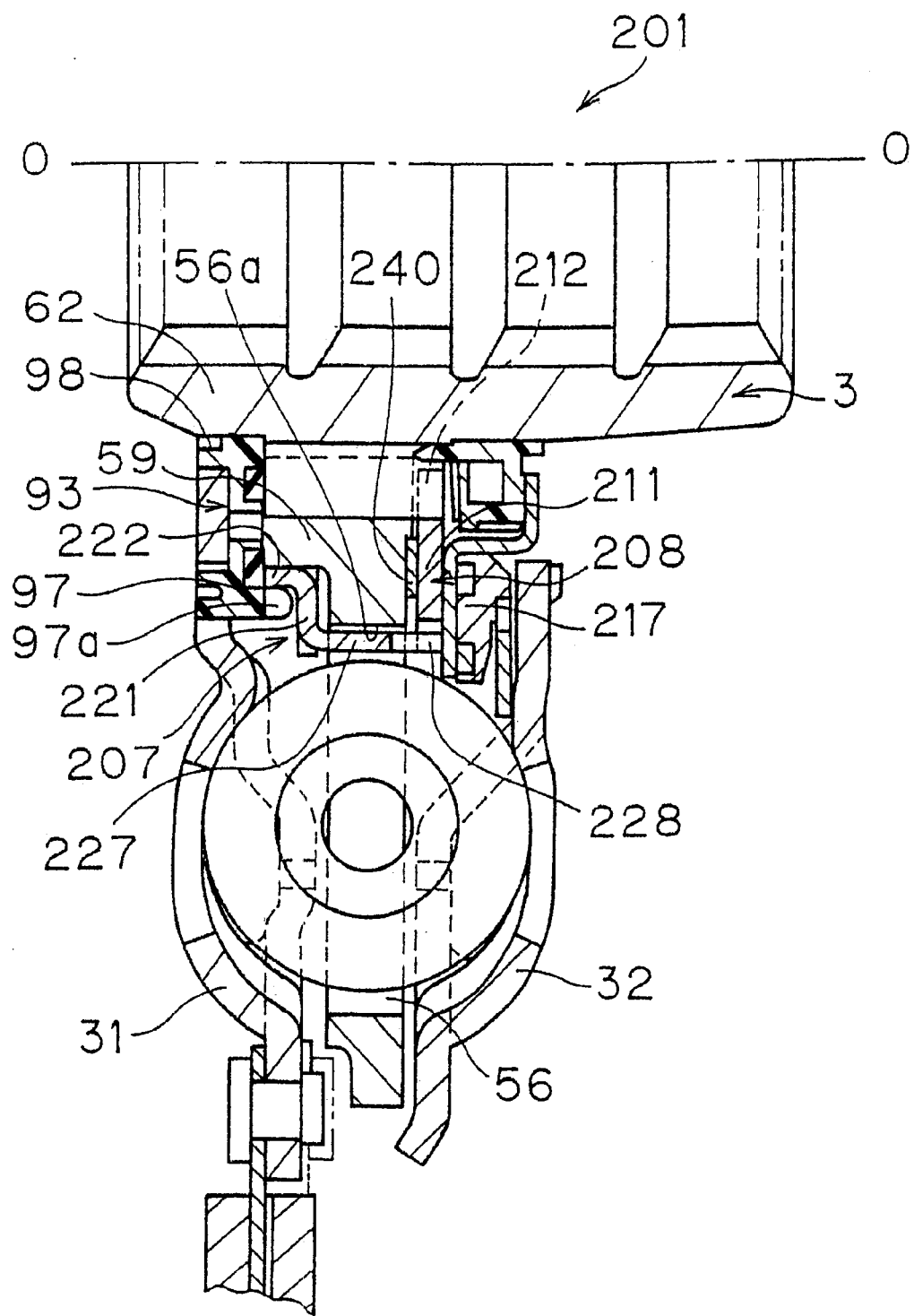
FIG. 34 is a cross sectional view of a clutch or dampening disk assembly as viewed along section line XXXIV-O of FIG. 32.
Figure 35:
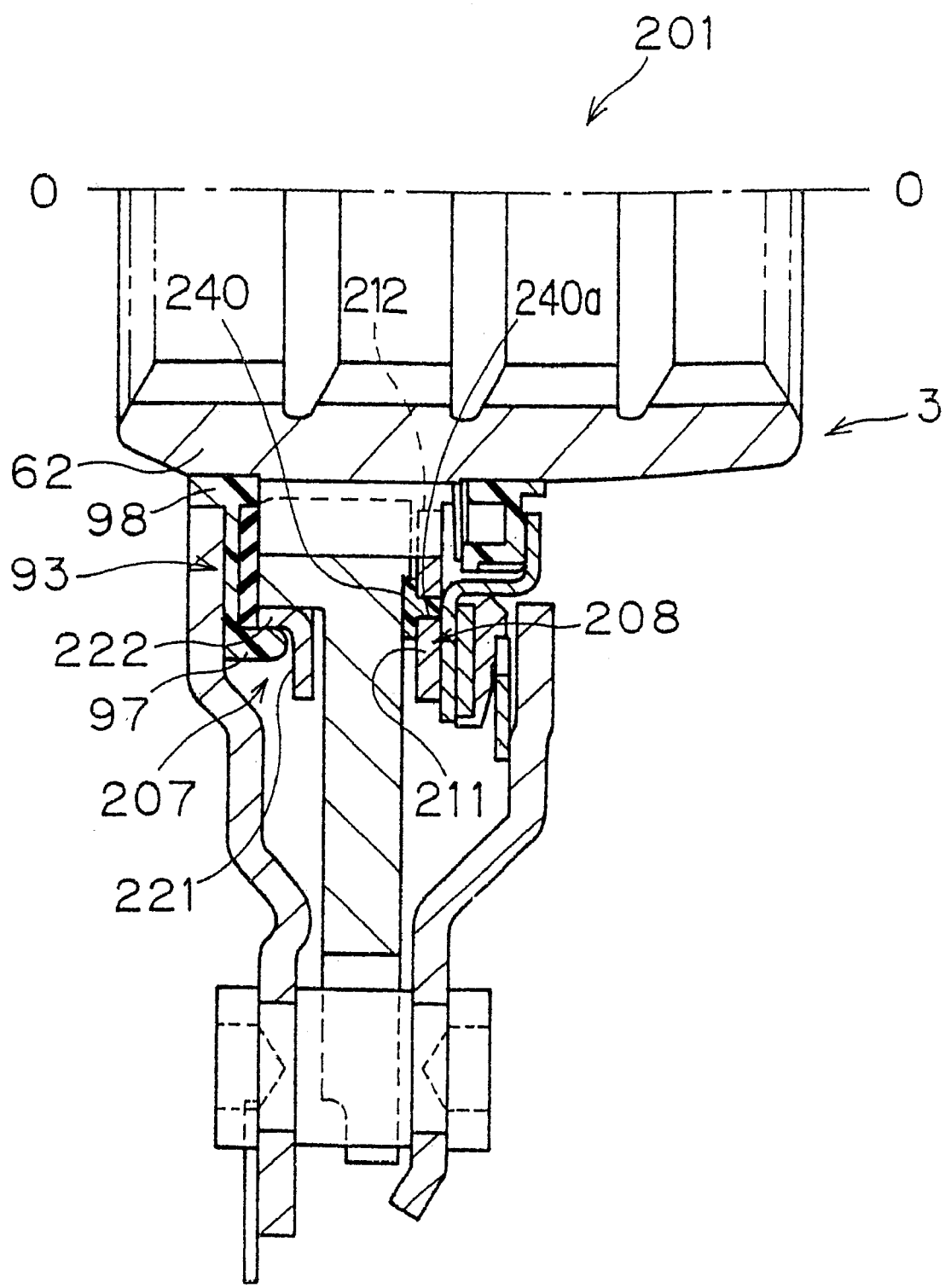
FIG. 35 is a cross sectional view of a clutch or dampening disk assembly as viewed along section line XXXV-O of FIG. 32.
Figure 36:
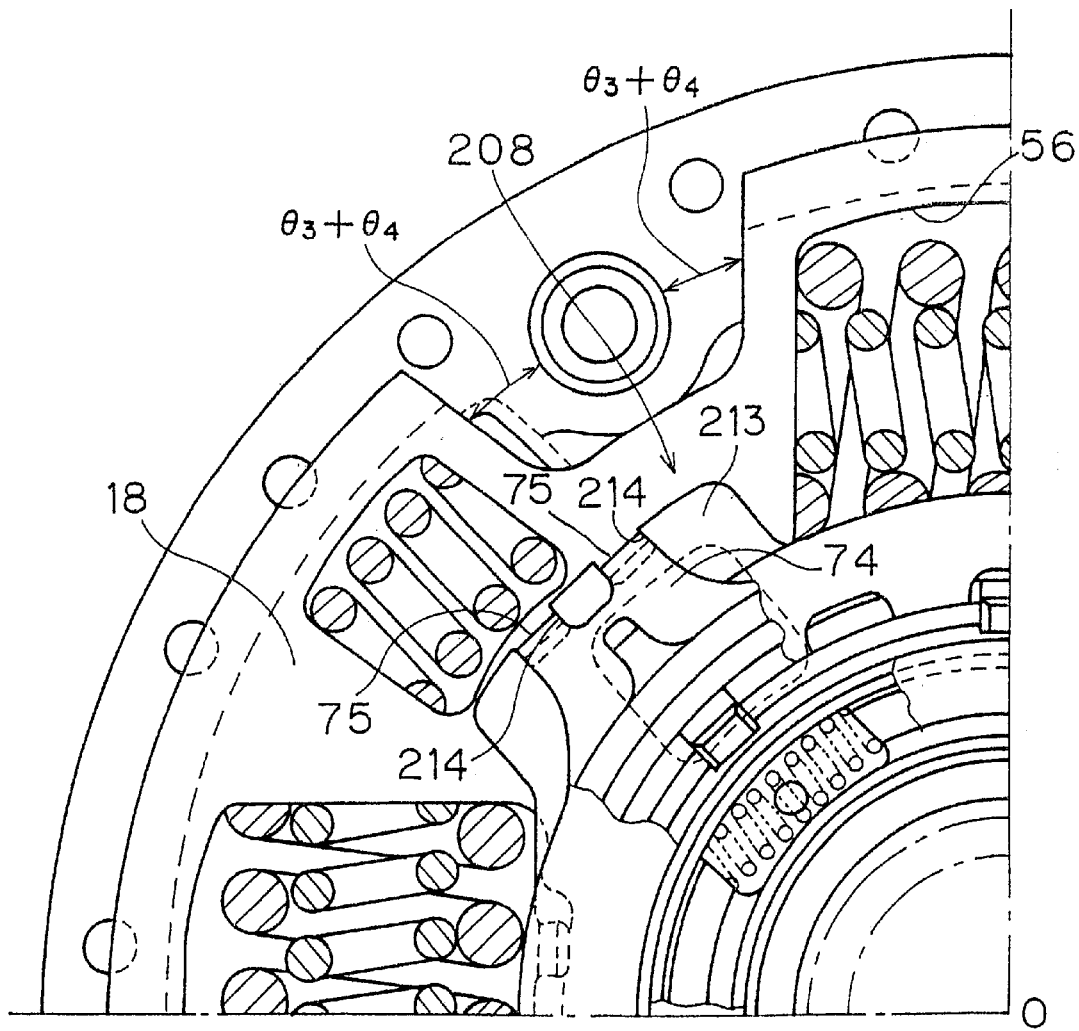
FIG. 36 is an enlarged, partial cross sectional view of a clutch or dampening disk assembly illustrated in FIGS. 32–35.
Figure 37:
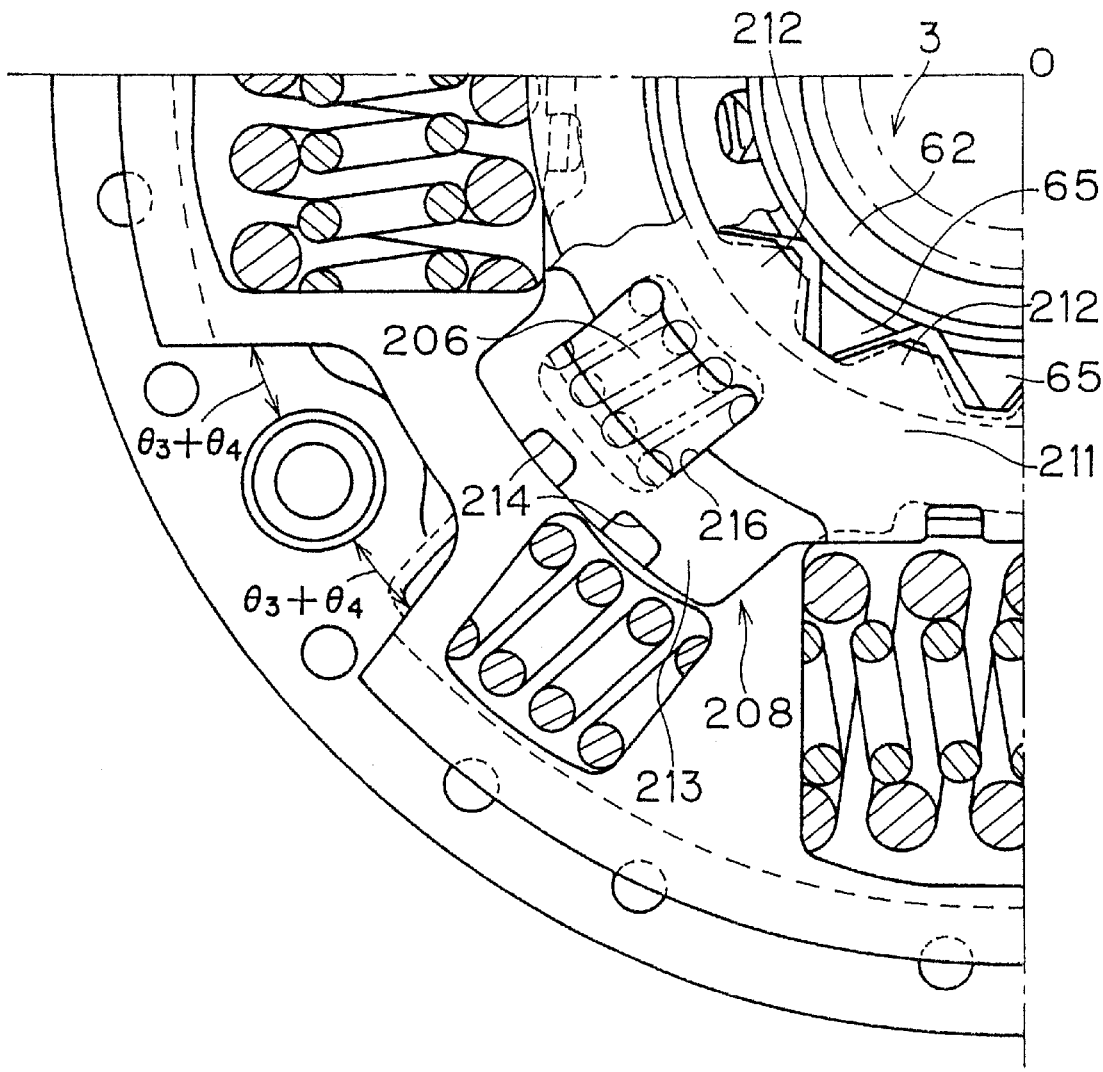
FIG. 37 is an enlarged, partial cross sectional view of a clutch or dampening disk assembly illustrated in FIGS. 32–36.
Figure 44:
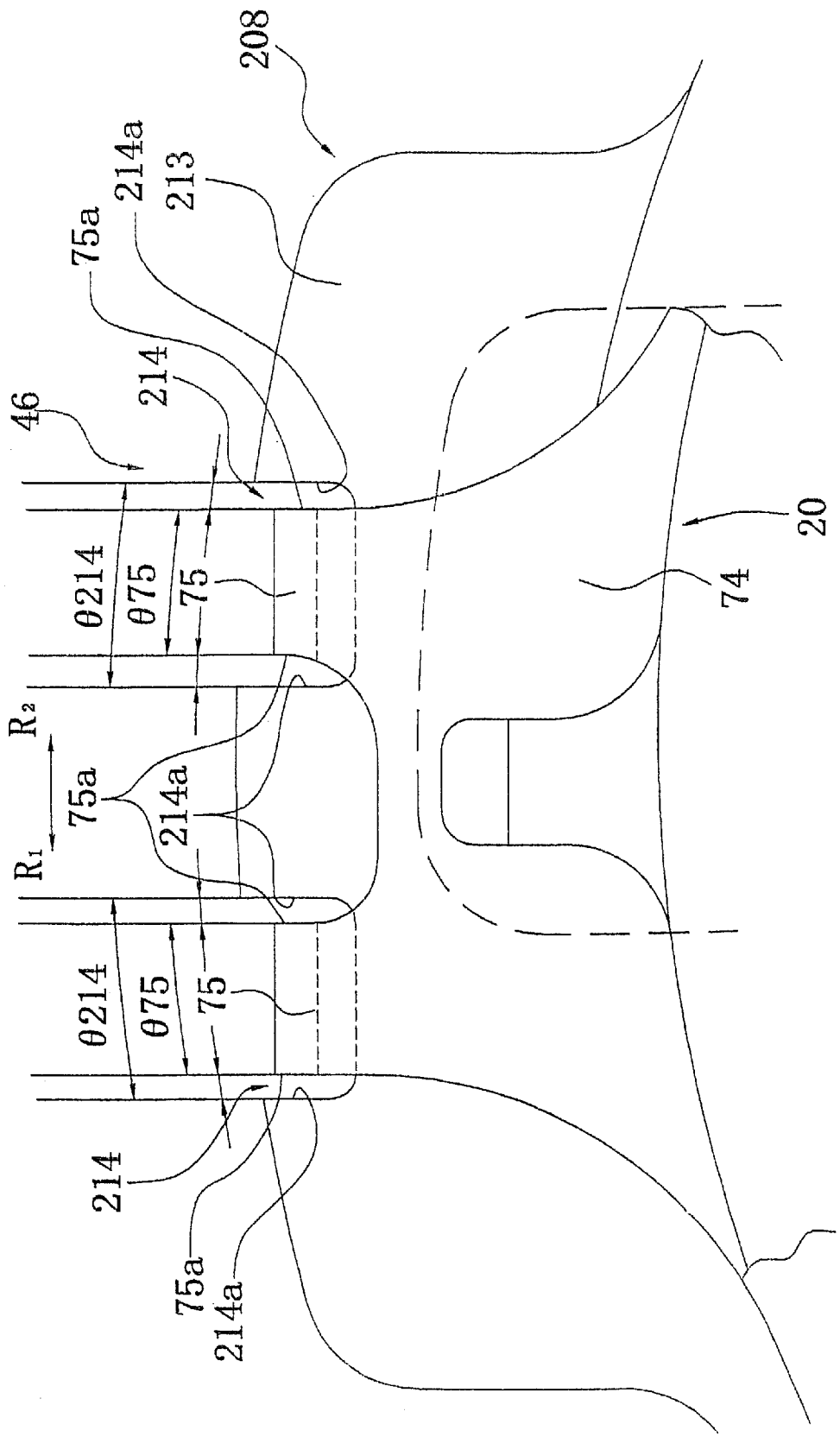
FIG. 44 a partial plan view for explaining a second gap mechanism in accordance with a fifth embodiment of the present invention.

The engagement of the nails 75 with the first engage portions 214 forms the second gap mechanism 46 which prevents the first large friction mechanism 8 from operating against small torsion vibration within the higher torsion angular range. As shown in FIG. 33, the second gap mechanism 46 is formed between the fixing plate 20 and the second sub-plate 208. With reference to FIG. 44, the angle $\theta 75$ of the nail 75 of the fixing plate 20 in the rotational direction is smaller than the angle $\theta 214$ of the first engage portion 214 of the second sub-plate 208 in the rotational direction. The difference between these two rotational angles, the gap $\theta_{AC}$, forms the second gap mechanism 46. The gap $\theta_{AC}$ is about 2–4 degree. Referring to FIG. 44, the first end 75a of each nail 75 and the R1 end 214a of each first engage portion 214 form a gap $\theta_{AC1}$, whereas the second end 75b of each nail 75 and the second end 214b of each first engage portion 214 form a gap $\theta_{AC2}$. Gap $\theta_{AC}$ is equal to the sum of gap $\theta_{AC1}$ and gap $\theta_{AC2}$.

In this embodiment, since both the second sub-plate 208, which functions as a stopper in the second gap mechanism 46, and the fixing plate 20 are made of metals, they are not significantly deformed under high temperature condition. Accordingly, the angle $\theta_{AC}$ of the second gap mechanism 46 is stabilized.

Second engage portions 217 are formed at the outer circumferential edge of the annular portion 211 between each of the projections 213 in the rotational direction. As shown in FIG. 39, the second engage portions 217 are two cutout portions and the respective nail 228 of the first sub-plate is engaged with it. As a result, the first sub-plate 207 and the second sub-plate 208 rotate together. Each of the nails 228 may be moved a predetermined distance in the radius direction with respect to the second engage portions 217.

The transmission side of the annular portion 211 of the second sub-plate 208 contacts the fixing plate 20. The fixing plate 20 is pressed by the cone spring towards the engine side and the second sub-plate 208 is urged towards the engine side by the fixing plate 20. The hub flange 18 supports the second sub-plate 208 in the axial direction in terms of a washer 240 which is disposed between the annular portion 211 and the inner circumferential portion of the hub flange 18. The washer 240 is made of resin.

The lug 227 extends through the cutout 56a which is formed at the inner circumferential edge of the second window bore 56. Accordingly, since the portion which rotates the first sub-plate 207 together with the second sub-plate 208 extends through the bore which is already present, it is not necessary to form a new hole or slit. Also, a gap of greater than angle $\theta_2$ is secured between the lug 227 and the cutout 56a.

In this embodiment, since the first sub-plate 207 is engaged with the second sub-plate 208 by the plate-shaped lug 227, it is possible to significantly reduce the space which is required for an engagement performed by conventional sub-pins. Especially, since the lug 227 has a plate shape and its width in the radius direction is equal to the width of the plate, it is possible to secure the space in the radius direction significantly as compared with prior art. Also, since the lug 227 is small in the radius direction in the second window bore 56, the diameter of the first spring 16 does not become smaller. Moreover, since the lug 227 is disposed on the innermost of the second window bore 56, it is hardly being interfered by the first spring 16. Further, since the lug 227 is integrally formed with the first sub-plate 207, it is possible to reduce the number of manufacturing parts as compared with conventional sub-pin structures.

Next, function of the bushing 93 will be described with reference to FIGS. 20 through 22. As shown in FIGS. 20–22, the friction bushing 93 is mainly comprised of a plurality of annular portions 94 which are made of resin. The annular portion 94 is a disk-shaped member which has a predetermined width in the radius direction and its width in the axial direction is thin. A cylindrical portion 98 which projects towards the engine side in the axial direction (i.e., the first axial side) is formed at the inner peripheral edge of the annular portion 94. The inner peripheral surface of the cylindrical portion 98 contacts or is in proximity to the outer peripheral surface of the boss 62 of the hub 3 so as to allow a relative rotation therebetween. A cylindrical portion 97 which projects towards the transmission side in the axial direction (i.e., the second axial side) is formed at the outer peripheral edge of the annular portion 94. The inner peripheral surface of the cylindrical portion 97 contacts or is in proximity to the outer peripheral surface of the cylindrical portion 222 so as to allow a relative rotation therebetween.

The bushing 93 supports the clutch plate 31 and the retaining plate 32 together with itself by the cylindrical portion 98 so as to rotate relatively against the boss 62 of the hub 3 in the radius direction. Also, the bushing 93 supports the hub flange 18 by the cylindrical portion 97 so as to rotate relatively against the boss 62 of the hub 3 in the radius direction. The cylindrical portion 97 directly supports the cylindrical portion 59 in the first embodiment whereas it supports the cylindrical portion 59 via the cylindrical portion 222 of the first sub-plate 207 in the second embodiment.

As described above, the bushing 93 aligns the three plates (the plates 31, 32 and the hub flange 18), which are placed outer circumferential side of the boss 62 of the hub 3, relative to the boss 62.

Figure 46:
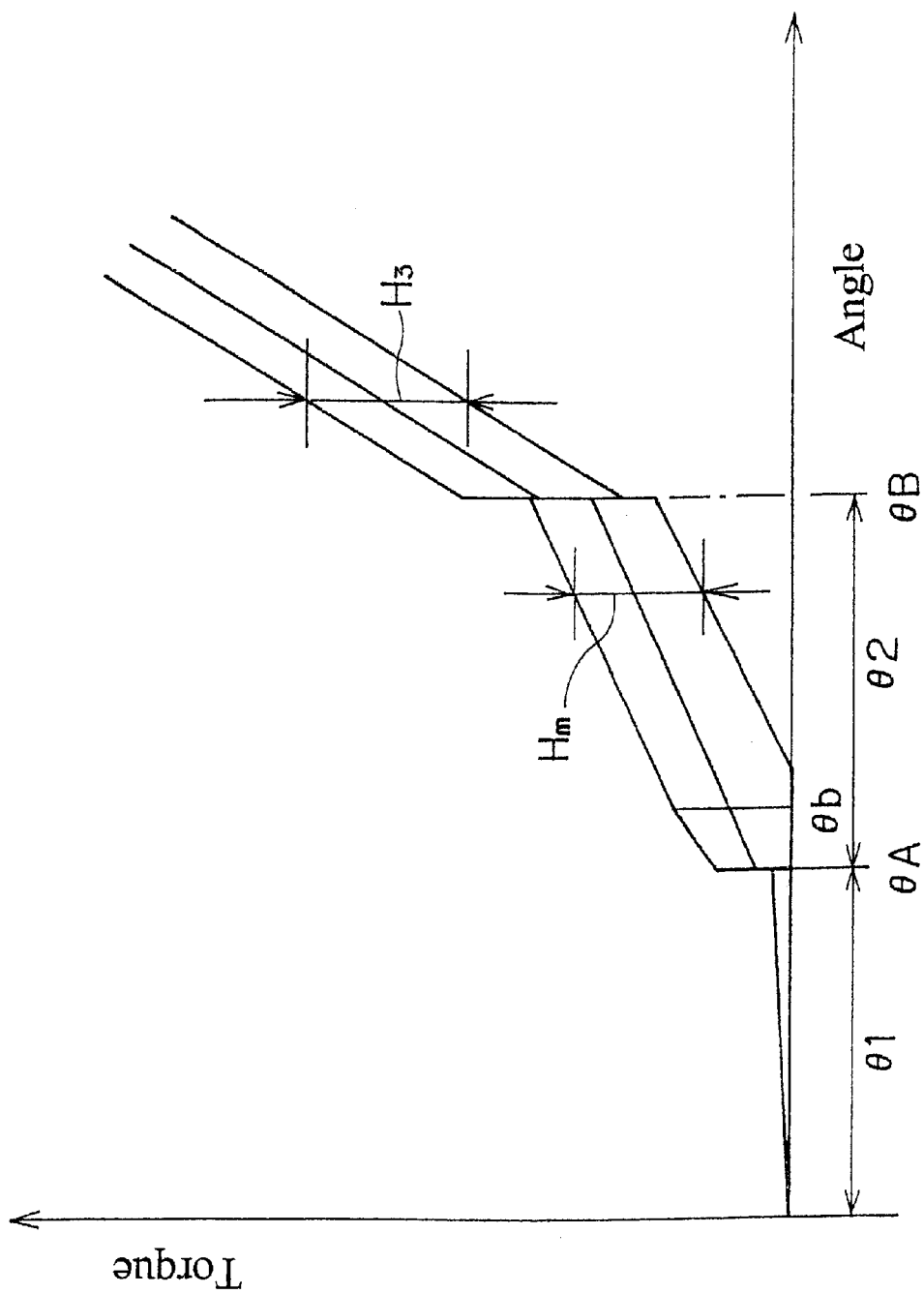
FIG. 46 shows a torsion characteristic curve of the clutch or dampening disk assembly in accordance with the present invention.

Next, operation of the clutch disk assembly 201 will be explained using a torsion characteristic diagram shown in FIG. 46. Here, operation in which the hub 3 is rotated in the R2 direction relative to the input rotary body 2 which is fixed to another member will be described. The second spring 21 having the least rigidity is compressed in the smaller torsion angular range and friction is generated at the second small friction mechanism 10. As a result, low rigidity, low hysteresis torque characteristic is obtained within angle θA. When the torsion angular range exceeds θA, the second spring 21 is not compressed any further and the spring 206 is compressed in the rotational direction. At this time, slide occurs in the second friction mechanism 8 and hysteresis torque greater than that of the first-step is generated. If the torque generated by the spring 206 in this second-step exceeds the sum of the initial torque of the first spring 16 and the hysteresis torque (i.e., torque based on the resistant force which is generated at friction portions when a load is applied to the first spring 16 by the spring 206), the first spring 16 is compressed and slide occurs in the second large friction mechanism 39 which is arranged in a line with the first spring 16. Accordingly, hysteresis torque becomes greater in the half-way of the second-step. When the torsion angular range reaches θB and the internal teeth 61 contact the external teeth 65, the spring 206 is not compressed any further. That is, only the first spring 16 is compressed. If the torsion angular range becomes greater than that, the spring 17 is compressed together with the first spring 16 in a line.

As explained above, since the spring 206 in the second-step and the first spring 16 in the third-step are arranged so as to be operated in series, hysteresis torque becomes greater in the half-way of the second-step.

More specifically, only the spring 206 is mainly compressed at the initial stage of the second-step and middle rigidity, middle hysteresis torque (H2) is generated. After the torsion angular range reaches angle θB, since the first spring 16 and the spring 206 are compressed in series, the rigidity becomes higher than the first-step but lower than the initial stage of the second step. However, since the spring 206 is compressed, slide occurs at the bushing 93 and the cylindrical portion 59 and intermediate hysteresis torque (Hm), which is greater than the torque at the initial stage of the second-step, is generated. In this embodiment, the range of the intermediate hysteresis torque (Hm) occupies the majority (about 80%) of the second-step. If the torsion angular range exceeds angle θB, the spring 206 is not compressed any further and only the first spring 16 is compressed. Accordingly, higher rigidity is obtained in the third-step as compared with the second-step. Also, high hysteresis torque (H3) generated in the third-step is greater than hysteresis torque (H2, Hm) generated in the second-step.

It is obvious from the above description that the intermediate torque (Hm), which is generated when the first spring 16 and the spring 206 are compressed in series, is higher than hysteresis torque (H2), which is generated when only the first spring 16 is compressed, but is lower than high hysteresis torque (H3), which is generated when only the spring 206 is compressed. As a result, hysteresis torque does not change rapidly at angle θB which is the beginning of the third-step (or a boundary between the second-step and the third-step.) In prior art, hysteresis torque changes rapidly from H2 to H3 at angle θB, and its variation level is high. Also, hysteresis torque does not change rapidly at θA, which is the beginning of the second-step (or a boundary between the first-step and the second-step.)

According to the torsion characteristics as described above, a jumping phenomenon is hardly generated against vibration during idling, which operates over the entire (i.e., positive and negative) first-step. More specifically, since intermediate hysteresis torque (Hm) is obtained within the second-step, absorption of vibration is carried out comfortably.

According to the clutch disk assembly 1 according to the present invention, the torsion angular range of angle θA of the first-step applies to the smaller torsion angular range, and the torsion angular range greater than angle θB of the third and fourth-steps applies to the higher torsion angular range. The torsion angular range between angle θA and angle θB applies to an intermediate thereof.

The dampening mechanism or the dampening disk assembly according to the present invention is not limited to a clutch disk assembly and may be applied to other dampers such as a damper for a flywheel and a damper for a torque converter.

EFFECT OF THE INVENTION

According to the dampening disk assembly of the present invention, since the intermediate mechanism is comprised of the first intermediate member and the second intermediate member and the predetermined gap is provided with at least one of between the first intermediate member and the second intermediate member in the rotational direction and between the second intermediate member and the intermediate disk plate member in the rotational direction, it is possible, by selecting the location of the gap, to change the member against which the second intermediate member slides when small torsion vibration is generated. As a result, hysteresis torque of different levels may be obtained when respective friction coefficients between the second intermediate member and a respective member are different.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A dampening disk assembly, comprising:

first and second input disk plate members fixedly coupled to each other and spaced apart from each other in an axial direction to form a space therebetween;

a hub disposed on inner circumferential sides of said first and second input disk plate members;

an intermediate disk plate member disposed on an outer circumferential side of said hub and located in said space between said first and second input disk plate members;

a first friction member disposed between said second input disk plate member and said intermediate disk plate member to generate a first friction, said first friction member movably coupled to said second input disk plate member in the axial direction;

a first urging member axially biasing said first friction member and said second input disk plate member to provide resiliency in the axial direction;

an intermediate mechanism axially disposed between said first friction member and said intermediate disk plate member in the axial direction, said intermediate mechanism including a first intermediate member and a second intermediate member, said first intermediate member being disposed to contact said first friction member in the axial direction, and said second intermediate member being disposed between said first intermediate member and said intermediate disk plate member in the axial direction to transmit torque between said first intermediate member and said intermediate disk plate member;

a first elastic member elastically coupling said intermediate mechanism with said hub in a rotational direction and arranged to bring about low rigidity within a lower torsion angular range of torsion characteristics; and a second elastic member elastically coupling said first and second input disk plate members with said intermediate disk plate member in the rotational direction and arranged to bring about high rigidity within a higher torsion angular range of torsion characteristics, a first predetermined gap being operatively disposed in the rotational direction between said second intermediate member and at least one of said first intermediate member and said intermediate disk plate member, said first predetermined gap arranged to prevent said first friction member and said intermediate mechanism from sliding against each other in response to small torsion vibrations within said higher torsion angular range.

2. A dampening disk assembly as set forth in claim 1, wherein said first intermediate member and said second intermediate member have a friction coefficient therebetween that is different from a friction coefficient formed between said intermediate disk plate member and said second intermediate member.

3. A dampening disk assembly as set forth in claim 1, wherein said hub includes a set of first teeth, and said intermediate disk plate member includes a set of second teeth that operatively engages said first teeth after a predetermined amount of relative rotation between said hub and said intermediate disk plate member.

4. A dampening disk assembly as set forth in claim 1, further comprising a third elastic member elastically coupling said first and second input disk plate members with said intermediate disk plate member in the rotational direction and arranged to at least partially operate in parallel with said second elastic member.

5. A dampening disk assembly as set forth in claim 4, further comprising a fourth elastic member elastically coupling said second intermediate member and said intermediate disk plate member in the rotational direction.

6. A dampening disk assembly as set forth in claim 1, further comprising a second friction member disposed between said first input disk plate member and said intermediate disk plate member, said second friction member movably engaging said first input disk plate member in the axial direction.

7. A dampening disk assembly comprising:

first and second input disk plate members fixedly coupled to each other and spaced apart from each other in an axial direction to form a space therebetween;

a hub disposed on inner circumferential sides of said first and second input disk plate members;

an intermediate disk plate member disposed on an outer circumferential side of said hub and located in said space between said first and second input disk plate members;

a first friction member disposed between said second input disk plate member and said intermediate disk plate member to generate a first friction, said first friction member movably coupled to said second input disk plate member in the axial direction;

a first urging member axially biasing said first friction member and said second input disk plate member to provide resiliency in the axial direction;

an intermediate mechanism axially disposed between said first friction member and said intermediate disk plate member in the axial direction, said intermediate mechanism including a first intermediate member and a second intermediate member, said second intermediate member being constructed of resin, said first intermediate member being disposed to contact said first friction member in the axial direction, and said second intermediate member being disposed between said first intermediate member and said intermediate disk plate member in the axial direction to transmit torque between said first intermediate member and said intermediate disk plate member;

a first elastic member elastically coupling said intermediate mechanism with said hub in a rotational direction and arranged to bring about low rigidity within a lower torsion angular range of torsion characteristics; and a second elastic member elastically coupling said first and second input disk plate members with said intermediate disk plate member in the rotational direction and arranged to bring about high rigidity within a higher torsion angular range of torsion characteristics, a first predetermined gap being operatively disposed in the rotational direction between said second intermediate member and at least one of said first intermediate member and said intermediate disk plate member, said first predetermined gap adapted to prevent said first friction member and said intermediate mechanism from sliding against each other in response to small torsion vibrations within said higher torsion angular range.

8. A dampening disk assembly as set forth in claim 7, wherein
said first predetermined gap is operatively disposed between said first intermediate member and said second intermediate member in the rotational direction and a second predetermined gap is operatively disposed between said second intermediate member and said intermediate disk plate member in the rotational direction.

9. A dampening disk assembly as set forth in claim 7, wherein
said first intermediate member and said second intermediate member have a friction coefficient therebetween that is different from a friction coefficient formed between said intermediate disk plate member and said second intermediate member.

10. A dampening disk assembly as set forth in claim 9, wherein
said first predetermined gap is operatively disposed between said first intermediate member and said second intermediate member in the rotational direction and a second predetermined gap is operatively disposed between said second intermediate member and said intermediate disk plate member in the rotational direction.

11. A dampening disk assembly comprising:
first and second input disk plate members fixedly coupled to each other and spaced apart from each other in an axial direction to form a space therebetween;
a hub disposed on inner circumferential sides of said first and second input disk plate members;
an intermediate disk plate member disposed on an outer circumferential side of said hub and located in said space between said first and second input disk plate members;
a first friction member disposed between said second input disk plate member and said intermediate disk plate member to generate a first friction, said first friction member movably coupled to said second input disk plate member in the axial direction;
a first urging member axially biasing said first friction member and said second input disk plate member to provide resiliency in the axial direction;
an intermediate mechanism axially disposed between said first friction member and said intermediate disk plate member in the axial direction, said intermediate mechanism including a first intermediate member and a second intermediate member, said first intermediate member being disposed to contact said first friction member in the axial direction, and said second intermediate member being disposed between said first intermediate member and said intermediate disk plate member in the axial direction to transmit torque between said first intermediate member and said intermediate disk plate member;
a first elastic member elastically coupling said intermediate mechanism with said hub in a rotational direction and arranged to bring about low rigidity within a lower torsion angular range of torsion characteristics; and
a second elastic member elastically coupling said first and second input disk plate members with said intermediate disk plate member in the rotational direction and arranged to bring about high rigidity within a higher torsion angular range of torsion characteristics,
a first predetermined gap being operatively disposed in the rotational direction between said second intermediate member and at least one of said first intermediate member and said intermediate disk plate member, said first predetermined gap adapted to prevent said first friction member and said intermediate mechanism from sliding against each other in response to small torsion vibrations within said higher torsion angular range, said first predetermined gap being operatively disposed between said first intermediate member and said second intermediate member in the rotational direction and a second predetermined gap being operatively disposed between said second intermediate member and said intermediate disk plate member in the rotational direction.

12. A dampening disk assembly as set forth in claim 11, wherein
said first intermediate member and said second intermediate member have a friction coefficient therebetween that is different from a friction coefficient formed between said intermediate disk plate member and said second intermediate member.

13. A dampening disk assembly comprising:
first and second input disk plate members fixedly coupled to each other and spaced apart from each other in an axial direction to form a space therebetween;
a hub disposed on inner circumferential sides of said first and second input disk plate members;
an intermediate disk plate member disposed on an outer circumferential side of said hub and located in said space between said first and second input disk plate members;
a first friction member disposed between said second input disk plate member and said intermediate disk plate member to generate a first friction, said first friction member movably coupled to said second input disk plate member in the axial direction;
a first urging member axially biasing said first friction member and said second input disk plate member to provide resiliency in the axial direction, said first urging member being axially disposed between said first friction member and said second input disk plate member;
an intermediate mechanism axially disposed between said first friction member and said intermediate disk plate member in the axial direction, said intermediate mechanism including a first intermediate member and a second intermediate member, said first intermediate member being disposed to contact said first friction member in the axial direction, and said second intermediate member being disposed between said first intermediate member and said intermediate disk plate member in the axial direction to transmit torque between said first intermediate member and said intermediate disk plate member;
a first elastic member elastically coupling said intermediate mechanism with said hub in a rotational direction and arranged to bring about low rigidity within a lower torsion angular range of torsion characteristics; and
a second elastic member elastically coupling said first and second input disk plate members with said intermediate disk plate member in the rotational direction and arranged to bring about high rigidity within a higher torsion angular range of torsion characteristics,
a first predetermined gap being operatively disposed in the rotational direction between said second intermediate member and at least one of said first intermediate member and said intermediate disk plate member, said first predetermined gap adapted to prevent said first friction member and said intermediate mechanism from sliding against each other in response to small torsion vibrations within said higher torsion angular range.

14. A dampening disk assembly comprising:

first and second input disk plate members fixedly coupled to each other and spaced apart from each other in an axial direction to form a space therebetween;

a hub disposed on inner circumferential sides of said first and second input disk plate members;

an intermediate disk plate member disposed on an outer circumferential side of said hub and located in said space between said first and second input disk plate members;

a first friction member disposed between said second input disk plate member and said intermediate disk plate member to generate a first friction, said first friction member movably coupled to said second input disk plate member in the axial direction;

a second friction member disposed between said first input disk plate member and said intermediate disk plate member, said second friction member movably engaging said first input disk plate member in the axial direction;

a first urging member axially biasing said first friction member and said second input disk plate member to provide resiliency in the axial direction;

an intermediate mechanism axially disposed between said first friction member and said intermediate disk plate member in the axial direction, said intermediate mechanism including a first intermediate member and a second intermediate member, said first intermediate member being disposed to contact said first friction member in the axial direction, and said second intermediate member being disposed between said first intermediate member and said intermediate disk plate member in the axial direction to transmit torque between said first intermediate member and said intermediate disk plate member;

a first elastic member elastically coupling said intermediate mechanism with said hub in a rotational direction and arranged to bring about low rigidity within a lower torsion angular range of torsion characteristics; and a second elastic member elastically coupling said first and second input disk plate members with said intermediate disk plate member in the rotational direction and arranged to bring about high rigidity within a higher torsion angular range of torsion characteristics, said first urging member being arranged to axially urge said first and second friction members, said intermediate disk plate member and said first and second intermediate members together, a first predetermined gap being operatively disposed in the rotational direction between said second intermediate member and at least one of said first intermediate member and said intermediate disk plate member, said first predetermined gap adapted to prevent said first friction member and said intermediate mechanism from sliding against each other in response to small torsion vibrations within said higher torsion angular range.

15. A dampening disk assembly comprising:

first and second input disk plate members fixedly coupled to each other and spaced apart from each other in an axial direction to form a space therebetween;

a hub disposed on inner circumferential sides of said first and second input disk plate members;

an intermediate disk plate member disposed on an outer circumferential side of said hub and located in said space between said first and second input disk plate members;

a first friction member disposed between said second input disk plate member and said intermediate disk plate member to generate a first friction, said first friction member movably coupled to said second input disk plate member in the axial direction;

a first urging member axially biasing said first friction member and said second input disk plate member to provide resiliency in the axial direction;

an intermediate mechanism axially disposed between said first friction member and said intermediate disk plate member in the axial direction, said intermediate mechanism including a first intermediate member and a second intermediate member, said first intermediate member being disposed to contact said first friction member in the axial direction, and said second intermediate member being disposed between said first intermediate member and said intermediate disk plate member in the axial direction to transmit torque between said first intermediate member and said intermediate disk plate member;

a first elastic member elastically coupling said intermediate mechanism with said hub in a rotational direction and arranged to bring about low rigidity within a lower torsion angular range of torsion characteristics;

a second elastic member elastically coupling said first and second input disk plate members with said intermediate disk plate member in the rotational direction and arranged to bring about high rigidity within a higher torsion angular range of torsion characteristics; and a second friction member disposed between said hub and said first intermediate member with a second urging member arranged to axially urge an axially facing friction surface of said second friction member against an axially facing friction surface of said first intermediate member to generate a second friction when said hub rotates relative to said first intermediate member during elastic deformation of said first elastic member, a first predetermined gap being operatively disposed in the rotational direction between said second intermediate member and at least one of said first intermediate member and said intermediate disk plate member, said first predetermined gap adapted to prevent said first friction member and said intermediate mechanism from sliding against each other in response to small torsion vibrations within said higher torsion angular range.

16. A dampening disk assembly as set forth in claim 15, wherein said hub includes a set of first teeth, and said intermediate disk plate member includes a set of second teeth that operatively engages said first teeth after a predetermined amount of relative rotation between said hub and said intermediate disk plate member.

17. A dampening disk assembly as set forth in claim 15, further comprising a third friction member disposed between said first input disk plate member and said intermediate disk plate member, said third friction member movably engaging said first input disk member in the axial direction.

18. A dampening disk assembly as set forth in claim 17, wherein said first urging member is arranged to axially urge said first and third friction members, said intermediate disk plate member and said first and second intermediate members together.

* * * * *